US006763452B1

(12) United States Patent
Hohensee et al.

(10) Patent No.: US 6,763,452 B1
(45) Date of Patent: Jul. 13, 2004

(54) MODIFYING PROGRAM EXECUTION BASED ON PROFILING

(75) Inventors: Paul H. Hohensee, Nashua, NH (US); John S. Yates, Jr., Needham, MA (US); Korbin S. Van Dyke, Sunol, CA (US); David L. Reese, Westborough, MA (US); Stephen C. Purcell, Mountain View, CA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/339,797

(22) Filed: Jun. 24, 1999

Related U.S. Application Data

(63) Continuation of application No. 09/322,443, filed on May 28, 1999, and a continuation-in-part of application No. 09/239,194, filed on Jan. 28, 1999.

(51) Int. Cl.[7] .................................................. G06F 9/00
(52) U.S. Cl. ......................... 712/227; 712/220; 703/22
(58) Field of Search ................................. 712/227, 220, 712/226, 229, 203, 23, 32, 34, 210, 216; 703/14, 15, 16, 17, 22, 23, 26, 28

(56) References Cited

U.S. PATENT DOCUMENTS

| | | | |
|---|---|---|---|
| 3,544,969 A | 12/1970 | Rakoczi | 340/172.5 |
| 3,781,823 A | 12/1973 | Senese | 340/172.5 |
| 4,084,235 A | 4/1978 | Hirtle | 364/200 |
| 4,455,602 A | 6/1984 | Baxter | 364/200 |
| 4,514,803 A | 4/1985 | Agnew | 364/200 |
| 4,575,797 A | 3/1986 | Gruner | 364/200 |
| 4,750,112 A | 6/1988 | Jones | 364/200 |
| 4,779,187 A | 10/1988 | Letwin | |
| 4,812,975 A | 3/1989 | Adachi | 364/300 |
| 5,115,500 A | 5/1992 | Larsen | |
| 5,155,835 A | 10/1992 | Belsan | |

(List continued on next page.)

FOREIGN PATENT DOCUMENTS

| | | | | |
|---|---|---|---|---|
| EP | 0 324 308 | 7/1989 | ............ | G06F/9/30 |
| WO | WO 96/24895 | 8/1996 | ............ | G06F/9/22 |
| WO | WO 97/50031 | 12/1997 | ........... | G06F/9/455 |
| WO | WO 98/13740 | 4/1998 | | |
| WO | WO 98/28689 | 7/1998 | ........... | G06F/11/00 |
| WO | WO 98/38575 | 9/1998 | ........... | G06F/11/00 |
| WO | WO 98/59292 | 12/1998 | ........... | G06F/9/45 |
| WO | WO 99/03037 | 1/1999 | ........... | G06F/11/00 |
| WO | WO 99/08188 | 2/1999 | ........... | G06F/11/00 |
| WO | WO 99/08191 | 2/1999 | ........... | G06F/12/00 |

OTHER PUBLICATIONS

Burroughs, Preliminary Edition, B 1700 Systems Reference Manual, Burroughs Corporation (1972).

(List continued on next page.)

*Primary Examiner*—Henry W. H. Tsai
(74) *Attorney, Agent, or Firm*—David E. Boundy; Willkie Farr & Gallagher LLP

(57) ABSTRACT

A method and a multiprocessor computer for execution of the method. A first CPU has a general register file, an instruciton pipeline, and profile circuitry. The profile circuitry is operatively interconnected and under common hardware control with the instruction pipeline. The profile circuitry and instruction pipeline are cooperatively interconnected to detect the occurrence of profileable events occurring in the instruction pipeline. The profile circuitry is operable without software intervention to effect recording of profile information describing the profileable events into the general register file, without first capturing the information into a main memory of the computer. The recording is essentially concurrent with the occurrence of the profileable events. A second CPU is configured to analyze the generated profile data, while the execution and profile data generation continue on the first CPU, and to control the execution of the program on the first CPU based at least in part on the analysis of the collected profile data.

36 Claims, 32 Drawing Sheets

U.S. PATENT DOCUMENTS

| | | | |
|---|---|---|---|
| 5,241,638 A | 8/1993 | Mork | 711/207 |
| 5,241,664 A | 8/1993 | Ohba | |
| 5,301,287 A | 4/1994 | Herrell | |
| 5,307,504 A | 4/1994 | Robinson | 395/800 |
| 5,335,331 A | 8/1994 | Murao | |
| 5,361,340 A | 11/1994 | Kelly | |
| 5,404,476 A * | 4/1995 | Kadaira | 711/207 |
| 5,432,795 A | 7/1995 | Robinson | 371/19 |
| 5,454,117 A | 9/1995 | Puziol | 395/800 |
| 5,481,684 A | 1/1996 | Richter | 395/375 |
| 5,481,693 A | 1/1996 | Blomgren | 395/375 |
| 5,483,647 A * | 1/1996 | Yu et al. | 713/100 |
| 5,487,156 A | 1/1996 | Popescu | 712/217 |
| 5,491,827 A | 2/1996 | Holtey | 711/163 |
| 5,515,518 A | 5/1996 | Stiles | 395/375 |
| 5,542,059 A | 7/1996 | Blomgren | 395/375 |
| 5,542,109 A | 7/1996 | Blomgren | 395/800 |
| 5,560,013 A | 9/1996 | Scalzi | 717/138 |
| 5,568,646 A | 10/1996 | Jaggar | |
| 5,574,927 A | 11/1996 | Scantlin | 395/800 |
| 5,590,309 A | 12/1996 | Chencinski | 395/472 |
| 5,598,546 A | 1/1997 | Blomgren | 395/385 |
| 5,608,886 A | 3/1997 | Blomgren | 395/586 |
| 5,619,666 A | 4/1997 | Coon et al. | |
| 5,628,016 A | 5/1997 | Kukol | 395/705 |
| 5,636,366 A | 6/1997 | Robinson | 395/490 |
| 5,638,525 A | 6/1997 | Hammond | 395/385 |
| 5,652,869 A | 7/1997 | Herdeg | 395/500 |
| 5,657,474 A | 8/1997 | Taine | 711/163 |
| 5,659,679 A | 8/1997 | Alpert | 395/183.1 |
| 5,664,159 A | 9/1997 | Richter | 395/500 |
| 5,673,407 A | 9/1997 | Poland | 395/375 |
| 5,678,032 A | 10/1997 | Woods | 395/500 |
| 5,685,009 A | 11/1997 | Blomgren | 395/800 |
| 5,715,421 A | 2/1998 | Akiyama | |
| 5,721,927 A | 2/1998 | Baraz | 395/705 |
| 5,732,238 A | 3/1998 | Sarkozy | 711/135 |
| 5,742,780 A | 4/1998 | Caulk | 395/382 |
| 5,751,982 A | 5/1998 | Morley | 395/800 |
| 5,754,878 A | 5/1998 | Asghar | 395/800 |
| 5,768,500 A * | 6/1998 | Agrawal et al. | 714/47 |
| 5,774,287 A | 6/1998 | Leonhardt | |
| 5,774,686 A | 6/1998 | Hammond | 395/385 |
| 5,781,750 A | 7/1998 | Blomgren et al. | 395/500 |
| 5,781,758 A | 7/1998 | Morley | 395/500 |
| 5,781,792 A | 7/1998 | Asghar | 395/800.35 |
| 5,784,640 A | 7/1998 | Asghar | 395/800.35 |
| 5,790,824 A | 8/1998 | Asghar | 395/385 |
| 5,794,068 A | 8/1998 | Asghar | 395/800.35 |
| 5,796,939 A | 8/1998 | Berc et al. | 395/184.01 |
| 5,802,272 A | 9/1998 | Sites et al. | 395/183.21 |
| 5,802,373 A | 9/1998 | Yates | 717/139 |
| 5,805,877 A | 9/1998 | Black | 395/586 |
| 5,812,864 A * | 9/1998 | McCoy et al. | 703/26 |
| 5,815,720 A | 9/1998 | Buzbee | 717/158 |
| 5,819,064 A * | 10/1998 | Razdan et al. | 703/27 |
| 5,822,578 A | 10/1998 | Frank | 395/591 |
| 5,832,205 A | 11/1998 | Kelly | 395/185.06 |
| 5,838,962 A | 11/1998 | Larson | 395/586 |
| 5,838,978 A | 11/1998 | Buzbee | 395/705 |
| 5,842,017 A | 11/1998 | Hookway | 395/707 |
| 5,847,955 A | 12/1998 | Mitchell | |
| 5,870,763 A | 2/1999 | Lomet | 707/202 |
| 5,884,057 A | 3/1999 | Blomgren | 395/375 |
| 5,901,308 A | 5/1999 | Cohn | |
| 5,903,760 A | 5/1999 | Farber | 395/707 |
| 5,905,855 A | 5/1999 | Klaiber | 395/183.07 |
| 5,920,721 A | 7/1999 | Hunter | 395/705 |
| 5,930,509 A | 7/1999 | Yates | 395/707 |
| 5,935,220 A | 8/1999 | Lumpkin | |
| 5,949,415 A | 9/1999 | Lin | 345/335 |
| 5,958,047 A | 9/1999 | Panwar | 712/237 |
| 5,958,061 A | 9/1999 | Kelly | 714/1 |
| 5,968,162 A | 10/1999 | Yard | 712/203 |
| 5,999,736 A | 12/1999 | Gupta | |
| 6,000,028 A | 12/1999 | Chernoff | 712/226 |
| 6,002,872 A | 12/1999 | Alexander | 717/127 |
| 6,003,038 A | 12/1999 | Chen | 707/103 |
| 6,005,551 A | 12/1999 | Osborne | |
| 6,006,029 A | 12/1999 | Bianchi | 395/500.45 |
| 6,006,277 A * | 12/1999 | Talati et al. | 709/313 |
| 6,011,908 A | 1/2000 | Wing | 395/182.17 |
| 6,014,735 A | 1/2000 | Chennupaty | 712/210 |
| 6,021,265 A | 2/2000 | Nevill | |
| 6,021,484 A | 2/2000 | Park | 712/41 |
| 6,021,489 A | 2/2000 | Poplingher | 712/239 |
| 6,026,478 A | 2/2000 | Dowling | |
| 6,029,004 A | 2/2000 | Bortnikov | |
| 6,031,992 A | 2/2000 | Cmelik | 395/705 |
| 6,032,247 A | 2/2000 | Asghar | 712/35 |
| 6,035,393 A | 3/2000 | Glew | 712/237 |
| 6,044,220 A | 3/2000 | Breternitz | 717/139 |
| 6,044,221 A | 3/2000 | Gupta | |
| 6,052,771 A | 4/2000 | Heller | 712/34 |
| 6,070,009 A | 5/2000 | Dean | |
| 6,076,144 A | 6/2000 | Peled | 711/125 |
| 6,081,665 A | 6/2000 | Nilsen et al. | 395/705 |
| 6,081,890 A | 6/2000 | Datta | 713/1 |
| RE36,766 E | 7/2000 | Krauskopf | 711/203 |
| 6,091,897 A | 7/2000 | Yates | 395/708 |
| 6,092,188 A | 7/2000 | Corwin | 712/239 |
| 6,115,809 A | 9/2000 | Mattson | 712/239 |
| 6,119,204 A | 9/2000 | Chang | 711/141 |
| 6,141,683 A | 10/2000 | Kraml | 709/220 |
| 6,154,857 A | 11/2000 | Mann | |
| 6,157,970 A | 12/2000 | Gafken | |
| 6,163,764 A | 12/2000 | Dulong et al. | |
| 6,175,957 B1 | 1/2001 | Ju | |
| 6,205,545 B1 | 3/2001 | Shah | 712/237 |
| 6,212,493 B1 * | 4/2001 | Huggins et al. | 703/22 |
| 6,219,774 B1 | 4/2001 | Hammond et al. | |
| 6,226,789 B1 | 5/2001 | Tye | |
| 6,233,678 B1 | 5/2001 | Bala | 712/240 |
| 6,237,073 B1 | 5/2001 | Dean | |
| 6,240,526 B1 | 5/2001 | Petivan | |
| 6,253,215 B1 | 6/2001 | Agesen | |
| 6,256,728 B1 | 7/2001 | Witt | 712/236 |
| 6,304,948 B1 | 10/2001 | Motoyama | 711/162 |
| 6,308,321 B1 * | 10/2001 | Schooler | 717/132 |
| 6,336,135 B1 | 1/2002 | Niblett | 709/215 |
| 6,351,784 B1 | 2/2002 | Neal | |
| 6,351,844 B1 | 2/2002 | Bala | 717/128 |
| 6,353,924 B1 | 3/2002 | Ayers | 717/128 |
| 6,363,336 B1 | 3/2002 | Banning | 703/26 |
| 6,374,369 B1 | 4/2002 | O'Donnell | |
| 6,397,379 B1 | 5/2002 | Yates | |
| 6,405,327 B1 | 6/2002 | Sipple | |
| 6,463,582 B1 | 10/2002 | Lethin | |
| 6,470,442 B1 | 10/2002 | Arimilli | 712/32 |
| 6,470,492 B2 | 10/2002 | Bala | |
| 6,473,846 B1 | 10/2002 | Melchior | 711/170 |
| 6,477,683 B1 | 11/2002 | Killian | |
| 6,480,862 B1 | 11/2002 | Gall | |
| 6,496,922 B1 | 12/2002 | Borrill | |
| 6,557,094 B2 | 4/2003 | Pechanek | 712/209 |
| 6,560,693 B1 | 5/2003 | Puzak | 712/207 |

OTHER PUBLICATIONS

Burroughs, B 1700 Systems Micro Implementation Language (MIL) Reference Manual, Burroughs Corporation (1973).

Anton Chernoff, et al., FX! 32, A Profile–Directed Binary Translator, IEEE Micro, vol. 18, No. 2 pp. 56–64 (Mar./Apr. 1998).

T.M. Conte, et al., "Accurate and practical profile–driven compilation using the profile buffer," Proceedings of the 29$^{th}$ Annual International Symposium on Microarchitecture, Paris, France, pp. 36–45, (Dec. 1996).

T.M. Conte, et al., "Hardware based profiling: An effective technique for porfile–driven optimization," International Journal of Parallel Programming, vol. 24, No. 2 (Feb. 1996).

T.M. Conte, et al., "Using branch handling hardware to support profile–driven optimization," Proceedings of the 27$^{th}$ Annual International Symposium on Microarchitecture San Jose, CA (Dec. 1994).

J.S. Cox et al., "Commercializing profile–driven optimization." Proceedings of the 28$^{th}$ Hawaii International Conference on System Sciences, vol. 1 Maui, HI, pp. 221–228 (Jan. 1995).

Digital Equipment Corp., White Paper: How DIGITAL FX!32 Works (Sep. 1997) http://www.digital.com/semiconductor/amt/fx32/fx–white.htm.

Ebcioglu and Altman, IBM Research Report, DAISY: Dynamic Compilation for 100% Architectural Compatibility, IBM Research Division (1996).

Ronald M. Guffin, Microdiagnostics for the Standard Computer MLP–900 Processor, IEEE Transactions on Computers, vol. C–20 No. 7, pp. 803–808 (Jul. 1971).

Linley Gwennap, MDR Technical Library Special Report, Intel's Merced and IA–64 Technology and Market Forecast, IA–64 Software Model—Chapter 3 excerpt Microprocessor Report, MicroDesign Resources (Jul. 20, 1998).

Linley Gwennap, MDR Technical Library Special Report, Intel's Merced and IA–64: Technology and Market Forecast, Executive Summary, Microprocessor Report, MicroDesign Resources (Jul. 20, 1998).

Linley Gwennap, First Merced Patent Surfaces, Intel Document Reveals Processors With Dual Instruction Sets, Microprocessor Report, MicroDesign Resources (Jul. 20, 1998).

R.E. Hank, et al., Proceedings of the 28$^{th}$ Annual International Symposium on Microarchitecture, pp. 158–168 (Dec. 1995).

Raymond J. Hookway, et al., Combining Emulation and Binary Translation (Aug. 28, 1997) http://www.digital.com/info/DTJP01HM.HTM.

Harold W. Lawson, Jr., et al., Functional Characteristics of a Multilingual Processor, IEEE Transactions on Computers, vol. C–20, No. 7, pp. 732–742 (Jul., 1971).

K.N.P. Menezes, "Hardware–based profiling for program optimization," Ph.D. thesis, Department of Electrical and Computer Engineering, North Carolina State University, Raleigh, North Carolina (1997).

Nanodata Corporation, QM–1 Hardware level User's Manual (1975).

Nanodata Corporation, QM–2 Processor (1976).

Robert F. Rosin, Contemporary Concepts of Microprogramming and Emulation, Computing Surveys, vol. 1 No. 4, pp. 197–212 (Dec. 1969).

Robert F. Rosin, An Environment for Research in Microprogramming and Emulation, Communications of the ACM, vol. 15, No. 8, pp. 748–760 (Aug. 1972).

Standard Computer Corp., IC–9000 Central Processing Unit—Principles of Operation (undated—possibly 1969).

W.T. Wilner, Design of the Burroughs B1700, Fall Joint Computer Conference, pp. 489–497 (1972).

W.T. Wilner, Burroughs B1700 Memory Utilization, Fall Joint Computer Conference, pp. 579–586 (1972).

Linda Geppert et al., Transmeta's Magic Show, IEEE Spectrum, vol. 37, No. 5, pp. 26–33 (May 2000).

Compaq Computer Corp., Compiler Writer's Guide for the Alpha 21264 (1999).

Intel Corporation, Intel Architecture Software Developer's Manual, *passim* (1997).

Kavi et al., A Performability Model for Soft Real–Time Systems, IEEE Jan. 1994.

Dean, ProfileMe: Hardware Support for Instruction–Level Profiling on Out–of–Order Processors, IEEE 1997, pp. 292–302.

Kim and Tyson: Analyzing the Working Set Characteristics of Branch Execution, IEEE 1998.

Larus and Schnarr: EEL: Machine–Independent Executable Editing, ACM Sigplan, 1995.

Lipasti and Shen: Exceeding the Dataflow Limit via Value Prediction, IEEE, 1996.

Veen: Dataflow Machine Architecture, ACM Computing Surveys vol. 18 No. 4 pp. 365–396 (Dec. 1986).

* cited by examiner

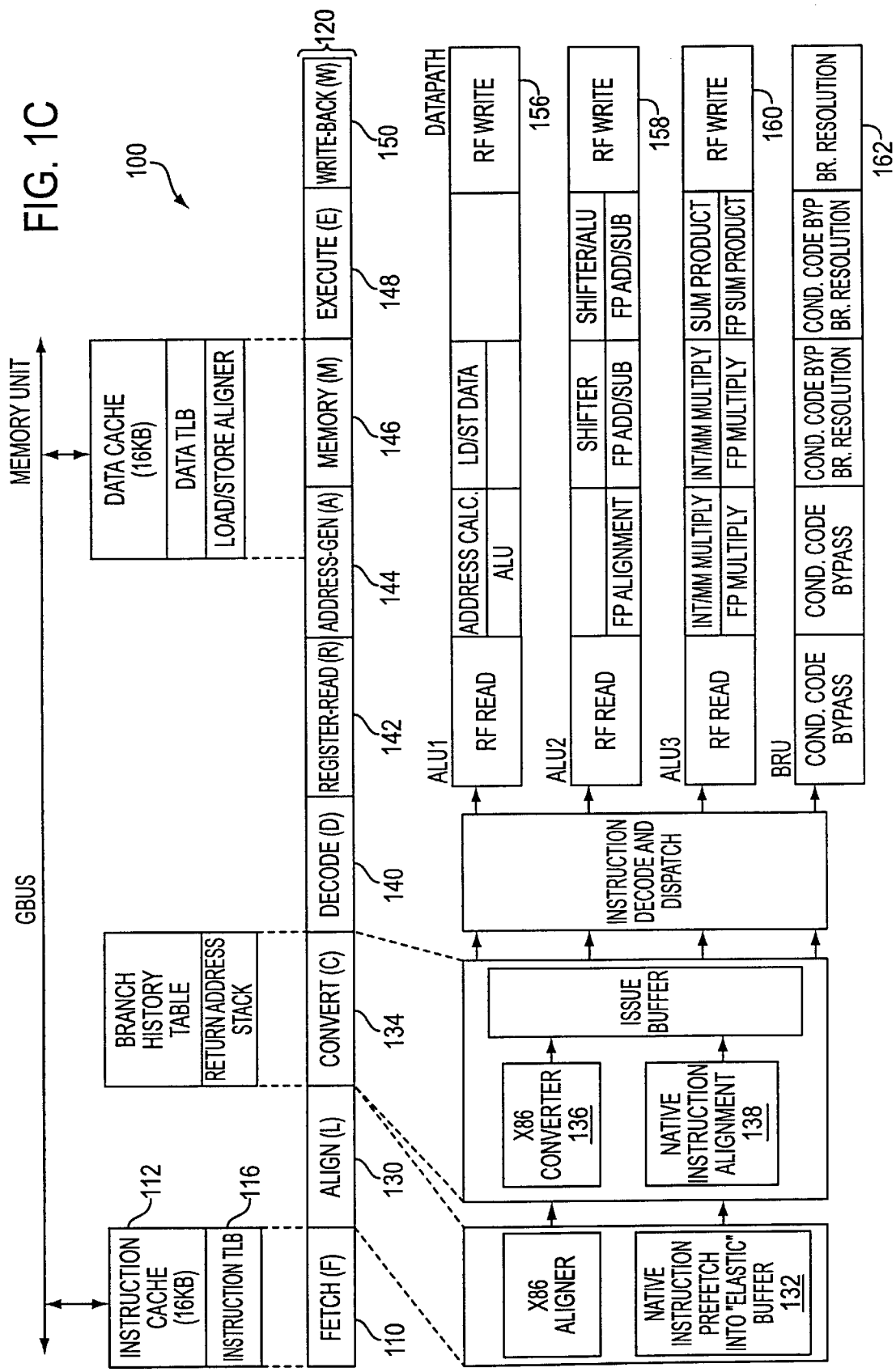

| I-TLB PROPERTY BITS | DECODED PROPERTY VALUES | | PROTECTED INTERPRETATION | INSTRUCTIONS SENT TO: | COLLECT PROFILE TRACE-PACKETS? | PROBE FOR TRANSLATED CODE | I/O MEMORY REFERENCE EXCEPTIONS |
|---|---|---|---|---|---|---|---|
| | ISA 194 | CC 200 | | | | | |
| 00 | TAP | TAP | NO | NATIVE CODE OBSERVING NATIVE RISCy CALLING CONVENTIONS | NATIVE DECODER | NO | NO | FAULT IF SEG.tio |
| 01 | TAP | x86 | NO | NATIVE CODE OBSERVING x86 CALLING CONVENTIONS | NATIVE DECODER | NO | NO | FAULT IF SEG.tio |
| 10 | x86 | x86 | NO | x86 CODE, UNPROTECTED - TAXI PROFILE COLLECTION ONLY | x86 HW CONVERTER | IF ENABLED | NO | TRAP IF PROFILING |
| 11 | x86 | x86 | YES | x86 CODE, PROTECTED - TAXI CODE MAY BE AVAILABLE | x86 HW CONVERTER | IF ENABLED | BASED ON I-TLB PROBE ATTRIBUTES | TRAP IF PROFILING |

| TRANSITION (SOURCE => DEST) ISA & CC PROPERTY VALUES | HANDLER ACTION |
|---|---|
| 00 => 00 | NO TRANSITION EXCEPTION |
| 00 => 01 | VECT_xxx_X86_CC EXCEPTION - HANDLER CONVERTS FROM NATIVE TO x86 CONVENTIONS |
| 00 => 1x | VECT_xxx_X86_CC EXCEPTION - HANDLER CONVERTS FROM NATIVE x86 CONVENTIONS, SETS UP EXPECTED EMULATOR AND PROFILING STATE |
| 01 => 00 | VECT_xxx_TAP_CC EXCEPTION - HANDLER CONVERTS FROM x86 TO NATIVE CONVENTIONS |
| 01 => 01 | NO TRANSITION EXCEPTION |
| 01 => 1x | VECT_X86_ISA EXCEPTION [CONDITIONAL BASED ON PCW.X86_ISA_ENABLE FLAG] - SETS UP EXPECTED EMULATOR AND PROFILING STATE |
| 1x => 00 | VECT_xxx_TAP_CC EXCEPTION - HANDLER CONVERTS FROM x86 TO NATIVE CONVENTIONS |
| 1x => 01 | VECT_TAP_ISA EXCEPTION [CONDITIONAL BASED PCW.TAP_ISA_ENABLE FLAG] - NO CONVENTION CONVERSION NECESSARY |
| 1x => 10 | NO TRANSITION EXCEPTION - [PROFILE COMPLETE POSSIBLE, PROBE POSSIBLE] |
| 1x => 11 | NO TRANSITION EXCEPTION - [PROFILE COMPLETE POSSIBLE, PROBE NOT POSSIBLE] |

FIG. 2B

| NAME | DESCRIPTION | TYPE |
|---|---|---|
| VECT_call_X86_CC | PUSH ARGS, RETURN ADDRESS, SET UP x86 STATE | FAULT ON TARGET INSTRUCTION |
| VECT_jump_X86_CC | SET UP x86 STATE | FAULT ON TARGET INSTRUCTION |
| VECT_ret_no_fp_X86_CC | RETURN VALUE TO EAX:EDX, SET UP x86 STATE | FAULT ON TARGET INSTRUCTION |
| VECT_ret_fp_X86_CC | RETURN VALUE TO x86 FP STACK, SET UP x86 STATE | FAULT ON TARGET INSTRUCTION |
| VECT_call_TAP_CC | x86 STACK ARGS, RETURN ADDRESS TO REGISTERS | FAULT ON TARGET INSTRUCTION |
| VECT_jump_TAP_CC | x86 STACK ARGS TO REGISTERS | FAULT ON TARGET INSTRUCTION |
| VECT_ret_no_fp_TAP_CC | RETURN VALUE TO RV0 | FAULT ON TARGET INSTRUCTION |
| VECT_ret_any_TAP_CC | RETURN TYPE UNKNOWN, SETUP RV0 AND RVDP | FAULT ON TARGET INSTRUCTION |

FIG. 2C

X86-to Tapestry transition exception handler    320

```
// This handler is entered under the following conditions:
// 1. An x86 caller invokes a native function
// 2. An x86 function returns to a native caller
// 3. x86 software returns to or resumes an interrupted native function following
//    an external asynchronous interrupt, a processor exception, or a context switch
                                                    321
dispatch on the two least-significant bits of the destination address   {
   case"00"      // calling a native subprogram
      // copy linkage and stack frame information and call parameters from the memory
      // stack to the analogous Tapestry registers
                                                    323
         LR ← [SP++]       // set up linkage register
         AP ← SP           // address of first argument  324
         SP ← SP - 8       // allocate return transfer argument area  326     }  322
         SP ← SP & (-32)   // round the stack pointer down to a 0 mod 32 boundary  327
         XD ← 0            // inform callee that caller uses X86 calling conventions  328
   case "01"     // resuming an X86 thread suspended during execution of a native routine
      if the redundant copies of the save slot number in EAX and EDX do not match or if      } 371
         the redundant copies of the timestamp in EBX:ECX and ESI:EDI do not match {
         // some form of bug or thread corruption has been detected
         goto TAPESTRY_CRASH_SYSTEM( thread-corruption-error-code )  372
      }
      save the EBX:ECX timestamp in a 64-bit exception handler temporary register  } 373
         (this will not be overwritten during restoration of the full native context)
      use save slot number in EAX to locate actual save slot storage  374                     370
      restore full entire native context (includes new values for all x86 registers)  375
      if save slot's timestamp does not match the saved timestamp {  376
         // save slot has been reallocated; save slot exhaustion has been detected
         goto TAPESTRY_CRASH_SYSTEM( save-slot-overwritten-error-code )  377
      }
      free the save slot   378
   case"10"      // returning from X86 callee to native caller, result already in registers
      RV0<63:32> ← edx<31:00>     // in case result is 64 bits  333
      convert the FP top-of-stack value from 80 bit X86 form to 64-bit form in RVDP  334      332
      SP ← ESI                    // restore SP from time of call  337
   case"11"      // returning from X86 callee to native caller, load large result from memory
      RV0..RV3 ← load 32 bytes from [ESI-32] // (guaranteed naturally aligned)  330          329
      SP ← ESI                    // restore SP from time of call  337
}
EPC ← EPC & -4      // reset the two low-order bits to zero  336
RFE  338
```

FIG. 3H

```
Tapestry-to-X86 transition exception handler
    // This handler is entered under the following conditions:
    // 1. a native caller invokes an x86 function
    // 2. a native function returns to an x86 caller
    switch on XD<3:0> {        ~341

XD_RET_FP:                    // result type is floating point
            FO/FI ← FINFLATE.de( RVDP)    // X86 FP results are 80 bits
            SP ← from RXA save            // discard RXA, pad, args
            FPCW ← image after FINIT & push  // FP stack has 1 entry
            goto EXIT XD_RET_WRITEBACK:              // store result to @RVA, leave RVA in eax
            RVA ← from RXA save           // address of result area
            copy decode(XD<8:4>) bytes from RV0..RV3 to [RVA]
            eax ← RVA                     // X86 expects RVA in eax
            SP ← from RXA save            // discard RXA, pad, args
            FPCW ← image after FINIT      // FP stack is empty
            goto EXIT XD_RET_SCALAR:         // result in eax:eda
            edx<31:00> ← eax<63:32>       // in case result is 64 bits
            SP ← from RXA save            // discard RXA, pad, args
            FPCW ← image after FINIT      // FP stack is empty
            goto EXIT XD_CALL_HIDDEN_TEMP:   // allocate 32 byte aligned hidden temp  _343
            esi ← SP                      // stack cut back on return
            SP ← SP - 32                  // allocate max size temp    } 344
            RVA ← SP                      // RVA consumed later by RR
            LR<1:0> ← "11"                // flag address for return & reload
            goto CALL_COMMON                                              345 default:               // remaining XD_CALL_xxx encodings
            esi ← SP                      // stack cut back on return
            LR<1:0> ← "10"                // flag address for return   343
    CALL_COMMON:                                                        346
            interpret XD to push and/or reposition args   347
            [--SP] ← LR                   // push LR as return address
    EXIT:                                                               } 348
            setup emulator context and profiling ring buffer pointer
    }
    RFE  349                              // to original target
}
```

FIG. 31 interrupt/exception handler of Tapestry operating system:
    // Control vectors here when a synchronous exception or asynchronous interrupt is to be
    // exported to / manifested in an x86 machine.

// The interrupt is directed to something within the virtual X86, and thus there is a possibility
    // that the X86 operating system will context switch. So we need to distinguish two cases:
    //   either the running process has only X86 state that is relevant to save, or
    //   there is extended state that must be saved and associated with the current machine context
    //      (e.g., extended state in a Tapestry library call in behalf of a process managed by X86 OS)
    if execution was interrupted in the converter – EPC.ISA == X86 {
            // no dependence on extended/native state possible, hence no need to save any     ⎱ 351
            goto EM86_Deliver_Interrupt( interrupt-byte )
    } else if EPC.Taxi_Active {
            // A Taxi translated version of some X86 code was running. Taxi will rollback to an
            // x86 instruction boundary. Then, if the rollback was induced by an asynchronous external
            // interrupt, Taxi will deliver the appropriate x86 interrupt. Else, the rollback was induced
            // by a synchronous event so Taxi will resume execution in the converter, retriggering the    ⎬ 353
            // exception but this time with EPC.ISA == X86
            goto TAXi_Rollback( asynchronous-flag, interrupt-byte )
    } else if EPC.EM86 {
            // The emulator has been interrupted. The emulator is coded to allow for such
            // conditions and permits re-entry during long running routines (e.g. far call through a gate)    ⎬ 354
            // to deliver external interrupts
            goto EM86_Deliver_Interrupt( interrupt-byte )
    } else {
            // This is the most difficult case - the machine was executing native Tapestry code on
            // behalf of an X86 thread. The X86 operating system may context switch. We must save
            // all native state and be able to locate it again when the x86 thread is resumed.
                   ⎡361
            allocate a free save slot; if unavailable free the save slot with oldest timestamp and try again
            save the entire native state (both the X86 and the extended state)     ⎱ 362
            save the X86 EIP in the save slot                                                          ⎭      ⎡363
            overwrite the two low-order bits of EPC with "01" (will become X86 interrupt EIP)  ⎠          ⎬ 360
            store the 64-bit timestamp in the save slot, in the X86 EBX:ECX register pair (and,  ⎱ 364
                    for further security, store a redundant copy in the X86 ESI:EDI register pair) ⎭
            store the a number of the allocated save slot in the X86 EAX register (and, again for ⎱ 365
                    further security, store a redundant copy in the X86 EDX register)                      ⎭
            goto EM86_Deliver_Interrupt( interrupt-byte )
    }                                                                   ⎣369

FIG. 3J

```
typedef struct {
    save_slot_t *   newer,          // pointer to next-most-recently-allocated save slot ⎫ 379c
    save_slot_t *   older;          // pointer to next-older save slot                   ⎭
    unsigned int64  epc;            // saved exception PC/IP                          ⎫
    unsigned int64  pcw;            // saved exception PCW (program control word)     ⎬ 356  ⎫ 355
    unsigned int64  registers[63];  // save the 63 writeable general registers        ⎭      ⎬
    ...                             // other words of Tapestry context                       ⎪
    timestamp_t     timestamp;      // timestamp to detect buffer overrun                    ⎪
    int             save_slot_ID;   // ID number of the save slot  ⎺⎺ 358                    ⎪
    boolean         save_slot_is_full; // full / empty flag ⎺⎺ 357                           ⎭
} save_slot_t;                                                  ⎺⎺ 359 save_slot_t *   save_slot_head;    // pointer to the head of the queue ⎺⎺
save_slot_t *   save_slot_tail;    // pointer to the tail of the queue ⎺⎺ 379a
                                                                        ⎺⎺ 379b system initialization
    reserve several pages of unpaged memory for save slots
```

FIG. 3K

| SOURCE | CODE 402 | EVENT | REUSE EVENT CODE (PROFILEABLE EVENT 414 / 416) | (INITIATE PACKET 418) | (PROBEABLE EVENT 610) | PROBE EVENT BIT- ITLB PROBE ATTRIBUTE OR EMULATOR PROBE (612) |
|---|---|---|---|---|---|---|
| 410 { RFE (CONTEXT AT POINT ENTRY) 412 | 0.0000 | DEFAULT (x86 TRANSPARENT) EVENT, REUSE ALL CONVERTER VALUES | YES | | NO | REUSE EVENT CODE |
| | 0.0001 | SIMPLE x86 INSTRUCTION COMPLETION (REUSE EVENT CODE) | YES | | NO | REUSE EVENT CODE |
| | 0.0010 | PROBE EXCEPTION FAILED | YES | | NO | REUSE EVENT CODE |
| | 0.0011 | PROBE EXCEPTION FAILED, RELOAD PROBE TIMER | YES | | NO | REUSE EVENT CODE |
| | 0.0100 | FLUSH EVENT | NO | NO | NO | NO . |
| | 0.0101 | SEQUENTIAL; EXECUTION ENVIRONMENT CHANGED - FORCE EVENT | NO | YES | NO | NO . |
| | 0.0110 | FAR RET | NO | YES | YES | NO . |
| | 0.0111 | IRET | NO | YES | NO | NO . |
| | 0.1000 | FAR CALL | NO | YES | YES | YES FAR CALL |
| | 0.1001 | FAR JMP | NO | YES | YES | NO . |
| | 0.1010 | SPECIAL; EMULATOR EXECUTION, SUPPLY EXTRA INSTRUCTION DATA | NO | YES | NO | NO . |
| | 0.1011 | ABORT PROFILE COLLECTION | NO | NO | NO | NO . |
| | 0.1100 | x86 SYNCHRONOUS/ ASYNCHRONOUS INTERRUPT W/PROBE (GRP 0) | NO | YES | YES | YES EMULATOR PROBE |
| | 0.1101 | x86 SYNCHRONOUS/ASYNCHRONOUS INTERRUPT (GRP 0) | NO | YES | YES | NO . |
| | 0.1110 | x86 SYNCHRONOUS/ASYNCHRONOUS INTERRUPT W/PROBE (GRP 1) | NO | YES | YES | YES EMULATOR PROBE |
| | 0.1111 | x86 SYNCHRONOUS/ASYNCHRONOUS INTERRUPT (GRP 1) | NO | YES | YES | NO . |
| 404 { CONVERTER (NEAR EDGE ENTRY) | 1.0000 | IP-RELATIVE JNZ FORWARD (OPCODE: 75, 0F 85) | NO | YES | YES | NO . |
| | 1.0001 | IP-RELATIVE JNZ BACKWARD (OPCODE: 75, 0F 85) | NO | YES | YES | YES JNZ |
| | 1.0010 | IP-RELATIVE CONDITIONAL JUMP FORWARD - (JCC, JCXZ, LOOP) | NO | YES | YES | NO . |
| | 1.0011 | IP-RELATIVE CONDITIONAL JUMP BACKWARD - (JCC, JCXZ, LOOP) | NO | YES | YES | YES COND JUMP |
| | 1.0100 | IP-RELATIVE, NEAR JMP FORWARD (OPCODE: E9, EB) | NO | YES | YES | NO . |
| | 1.0101 | IP-RELATIVE, NEAR JMP BACKWARD (OPCODE: E9, EB) | NO | YES | YES | YES NEAR JUMP |
| | 1.0110 | RET/RET IMM16 (OPCODE C3, C2 /W) | NO | YES | YES | NO . |
| | 1.0111 | IP-RELATIVE, NEAR CALL (OPCODE: E8) | NO | YES | YES | YES NEAR CALL |
| | 1.1000 | REPE/REPNE CMPS/SCAS (OPCODE: A6, A7, AE, AF) | NO | YES | NO | NO . |
| | 1.1001 | REP MOVS/STOS/LDOS (OPCODE: A4, A5, AA, AB, AC, AD) | NO | YES | NO | NO . |
| | 1.1010 | INDIRECT NEAR JMP (OPCODE: FF /4) | NO | YES | YES | NO . |
| | 1.1011 | INDIRECT NEAR CALL (OPCODE: FF /2) | NO | YES | YES | YES NEAR CALL |
| | 1.1100 | LOAD FROM I/O MEMORY (TLB.ASI !=0) (NOT USED IN T1) | NO | YES | NO | NO . |
| | 1.1101 | AVAILABLE FOR EXPANSION | NO | NO | NO | NO . |
| | 1.1110 | DEFAULT CONVERTER EVENT; SEQUENTIAL 406 | NO | NO | NO | NO . |
| | 1.1111 | NEW PAGE (INSTRUCTION ENDS ON LAST BYTE OF A PAGE FRAME OR STRADDLES ACROSS A PAGE FRAME BOUNDARY) 408 | NO | YES | NO | NO . |

FIG. 4B

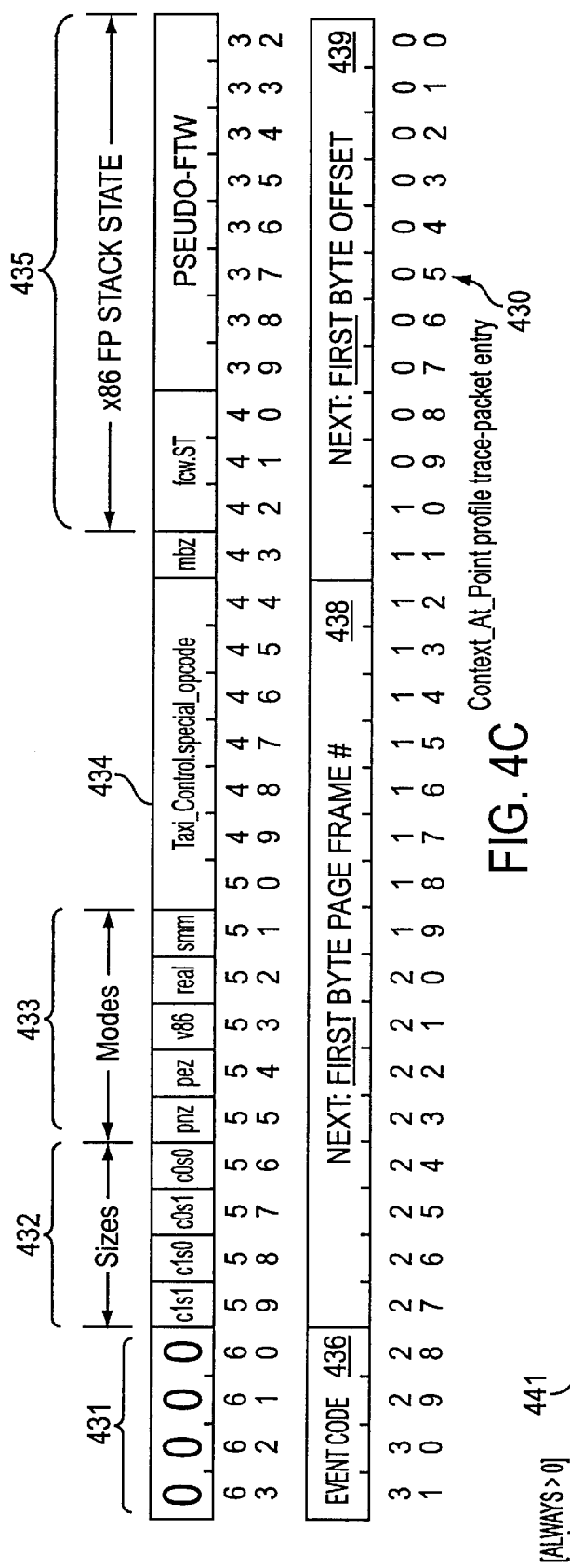

MODIFYING PROGRAM EXECUTION BASED ON PROFILING

This application is a continuation U.S. applications Ser. No. 09/322,443, filed May 28, 1999 and a C-I-P of Ser. No. 09/239,134, filed Jan. 28, 1999, which are incorporated herein by reference.

BACKGROUND

The invention relates to execution of instructions for a computer of a first computer architecture on a computer of a second, different architecture.

Each instruction for execution by a computer is represented as a binary number stored in the computer's memory. Each different architecture of computer represents instructions differently. For instance, when a given instruction, a given binary number, is executed by an IBM System/360 computer, an IBM System/38, an IBM AS/400, an IBM PC, and an IBM PowerPC, the five computers will typically perform five completely different operations, even though all five are manufactured by the same company. This correspondence between the binary representation of a computer's instructions and the actions taken by the computer in response is called the Instruction Set Architecture (ISA).

A program coded in the binary ISA for a particular computer family is often called simply "a binary." Commercial software is typically distributed in binary form. The incompatibility noted in the previous paragraph means that programs distributed in binary form for one architecture generally do not run on computers of another. Accordingly, computer users are extremely reluctant to change from one architecture to another, and computer manufacturers are narrowly constrained in modifying their computer architectures.

A computer most naturally executes programs coded in its native ISA, the ISA of the architectural family for which the computer is a member. Several methods are known for executing binaries originally coded for computers of another, non-native, ISA. In hardware emulation, the computer has hardware specifically directed to executing the non-native instructions. Emulation is typically controlled by a mode bit, an electronic switch: when a non-native binary is to be executed, a special instruction in the emulating computer sets the mode bit and transfers control to the non-native binary. When the non-native program exits, the mode bit is reset to specify that subsequent instructions are to be interpreted in the native ISA. Typically, in an emulator, native and non-native instructions are stored in different address spaces. A second alternative uses a simulator (also sometimes known as an "interpreter"), a program running on the computer that models a computer of the non-native architecture. A simulator sequentially fetches instructions of the non-native binary, determines the meaning of each instruction in turn, and simulates its effect in a software model of the non-native computer. Again, a simulator typically stores native and non-native instructions in distinct address spaces. (The terms "emulation" and "simulation" are not as uniformly applied throughout the industry as might be suggested by the definitions implied here.) In a third alternative, binary translation, a translator program takes the non-native binary (either a whole program or a program fragment) as input, and processes it to produce as output a corresponding binary in the native instruction set (a "native binary") that runs directly on the computer.

Typically, an emulator is found in a newer computer for emulation of an older computer architecture from the same manufacturer, as a transition aid to customers. Simulators are provided for the same purpose, and also by independent software vendors for use by customers who simply want access to software that is only available in binary form for a machine that the customer does not own. By whatever technique, non-native execution is slower than native execution, and a non-native program has access to only a portion of the resources available to a native program.

Known methods of profiling the behavior of a computer or of a computer program include the following. In one known profiling method, the address range occupied by a program is divided into a number of ranges, and a timer goes off from time to time. A software profile analyzer figures out the address at which the program was executing, and increments a counter corresponding to the range that embraces the address. After a time, the counters will indicate that some ranges are executed a great deal, and some are barely executed at all. In another known profiling method, counters are generated into the binary text of a program by the compiler. These compiler-generated counters may count the number of times a given region is executed, or may count the number of times a given execution point is passed or a given branch is taken.

SUMMARY

In general, in a first aspect, the invention features a computer with an instruction processor designed to execute instructions of first and second instruction sets, a memory for storage of a program, a table of entries corresponding to the pages, a switch, a transition handler, and a history record. The memory is divided into pages for management by a virtual memory manager. The program is coded in instructions of the first and second instruction sets and uses first and second data storage conventions. The switch is responsive to a first flag value stored in each table entry, and controls the instruction processor to interpret instructions under, alternately, the first or second instruction set as directed by the first flag value of the table entry corresponding to an instruction's memory page. The transition handler is designed to recognize when program execution has transferred from a page of instructions using the first data storage convention to a page of instructions using the second data storage convention, as indicated by second flag values stored in table entries corresponding to the respective pages, and in response to the recognition, to adjust a data storage configuration of the computer from the first storage convention to the second data storage convention. The history record is designed to provide to the transition handler a record of a classification of a recently-executed instruction.

In a second aspect, the invention features a method, and a computer for performance of the method. Instruction data are fetched from first and second regions of a single address space of the memory of a computer. The instructions of the first and second regions are coded for execution by computer of first and second architectures or following first and second data storage conventions, respectively. The memory regions have associated first and second indicator elements, the indicator elements each having a value indicating the architecture or data storage convention under which instructions from the associated region are to be executed. When execution of the instruction data flows from the first region to the second, the computer is adapted for execution in the second architecture or convention.

In a third aspect, the invention features a method, and a computer for performance of the method. Instructions are stored in pages of a computer memory managed by a virtual memory manager. The instruction data of the pages are coded for execution by, respectively, computers of two different architectures and/or under two different execution conventions. In association with pages of the memory are stored corresponding indicator elements indicating the architecture or convention in which the instructions of the pages are to be executed. Instructions from the pages are executed in a common processor, the processor designed, responsive to the page indicator elements, to execute instructions in the architecture or under the convention indicated by the indicator element corresponding to the instruction's page.

In a fourth aspect, the invention features a microprocessor chip. An instruction unit of the chip is configured to fetch instructions from a memory managed by the virtual memory manager, and configured to execute instructions coded for first and second different computer architectures or coded to implement first and second different data storage conventions. The microprocessor chip is designed (a) to retrieve indicator elements stored in association with respective pages of the memory, each indicator element indicating the architecture or convention in which the instructions of the page are to be executed, and (b) to recognize when instruction execution has flowed from a page of the first architecture or convention to a page of the second, as indicted by the respective associated indicator elements, and (c) to alter a processing mode of the instruction unit or a storage content of the memory to effect execution of instructions in accord with the indicator element associated with the page of the second architecture or convention.

In a fifth aspect, the invention features a method, and a microprocessor capable of performing the method. A section of computer object code is executed twice, without modification of the code section between the two executions. The code section materializes a destination address into a register and is architecturally defined to directly transfer control indirectly through the register to the destination address. The two executions materialize two different destination addresses, and the code at the two destinations is coded in two different instruction sets.

In a sixth aspect, the invention features a method and a computer for the performance of the method. Control-flow instructions of the computer's instruction set are classified into a plurality of classes. During execution of a program on the computer, as part of the execution of instructions of the instruction set, a record is updated to record the class of the classified control-flow instruction most recently executed.

In a seventh aspect, the invention features a method and a computer for the performance of the method. A control-transfer instruction is executed that transfers control from a source execution context to a destination instruction for execution in a destination execution context. Before executing the destination instruction, the storage context of the computer is adjusted to reestablish under the destination execution context the logical context of the computer as interpreted under the source execution context. The reconfiguring is determined, at least in part, by a classification of the control-transfer instruction.

In general, in an eighth aspect, the invention features a method of operating a computer. Concurrent execution threads are scheduled by a pre-existing thread scheduler of a computer. Each thread has an associated context, the association between a thread and a set of computer resources of the context being maintained by the thread scheduler. Without modifying the thread scheduler, an association is maintained between one of the threads and an extended context of the thread through a context change induced by the thread scheduler, the extended context including resources of the computer beyond those resources whose association with the thread is maintained by the thread scheduler.

In a ninth aspect, the invention features a method of operating a computer. An entry exception is established, to be raised on each entry to an operating system of a computer at a specified entry point or on a specified condition. A resumption exception is established, to be raised on each resumption from the operating system following on a specified entry. On detecting a specified entry to the operating system from an interrupted process of the computer, the entry exception is raised and serviced. The resumption exception is raised and serviced, and control is returned to the interrupted process.

In a tenth aspect, the invention features a method of operating a computer. Without modifying an operating system of the computer, an entry handler is established for execution at a specified entry point or on a specified entry condition to the operating system. The entry handler is programmed to save a context of an interrupted thread and to modify the thread context before delivering the modified context to the operating system. Without modifying the operating system, an exit handler is established for execution on resumption from the operating system following an entry through the entry handler. The exit handler is programmed to restore the context saved by a corresponding execution of the entry handler.

In an eleventh aspect, the invention features a method of operating a computer. During invocation of a service routine of a computer, a linkage return address passed, the return address being deliberately chosen so that an attempt to execute an instruction from the return address on return from the service routine will cause an exception to program execution. On return from the service routine, the chosen exception is raised. After servicing the exception, control is returned to a caller of the service routine.

Particular embodiments of the invention may include one or more of the following features. The regions may be pages managed by a virtual memory manager. The indications may be stored in a virtual address translation entry, in a table whose entries are associated with corresponding virtual pages, in a table whose entries are associated with corresponding physical page frames, in entries of a translation look-aside buffer, or in lines of an instruction cache. The code at the first destination may receive floating-point arguments and return floating-point return values using a register-based calling convention, while the code at the second destination receives floating-point arguments using a memory-based stack calling convention, and returns floating-point values using a register indicated by a top-of-stack pointer.

The two architectures may be two instruction set architectures, and the instruction execution hardware of the computer may be controlled to interpret the instructions according to the two instruction set architectures according to the indications. A mode of execution of the instructions may be changed without further intervention when execution flows from the first region to the second, or the mode may be changed by an exception handler when the computer takes an exception when execution flows from the first region to the second. One of the regions may store an off-the-shelf operating system binary coded in an instruction set non-native to the computer.

The two conventions may be first and second calling conventions, and the computer may recognize when program execution has transferred from a region using the first calling convention to a region using the second calling convention, and in response to the recognition, the data storage configuration of the computer will be adjusted from the first calling convention to the second. One of the two calling conventions may be a register-based calling convention, and the other calling convention may be a memory stack-based calling convention. There may be a defined mapping between resources of the first architecture and resources of the second, the mapping assigning corresponding resources of the two architectures to a common physical resource of a computer when the resources serve analogous functions in the calling conventions of the two architectures. The configuration adjustment may include altering a bit representation of a datum from a first representation to a second representation, the alteration of representation being chosen to preserve the meaning of the datum across the change in execution convention. A rule for copying data from the first location to the second may be determined, at least in part, by a classification of the instruction that transferred execution to the second region, and/or by examining a descriptor associated with the location of execution before the recognized execution transfer.

A first class of instructions may include instructions to transfer control between subprograms associated with arguments passed according to a calling convention, and a second class of instructions may include branch instructions whose arguments, if any, are not passed according to the calling convention. One of the execution contexts may be a register-based calling convention, and the other execution context may be a memory stack-based calling convention. The rearrangement may reflect analogous execution contexts under the two data storage conventions, the rearranging process being determined, at least in part, by the instruction classification record. In some of the control-flow instructions, the classification may be encoded in an immediate field of instructions, the immediate field having no effect on the execution of the instruction in which it is encoded, except to update the class record. In some of the control-flow instructions, the classification may be statically determined by the opcode of the instructions. In some of the control-flow instructions, the classification may be dynamically determined with reference to a state of processor registers and/or general registers of the computer. In some of the control-flow instructions, the classification may be dynamically determined based on a full/empty status of a register indicated by a top-of-stack pointer, the register holding a function result value. The rearranging may be performed by an exception handler, the handler being selected by an exception vector based at least in part on the source data storage convention, the destination data storage convention, and the instruction classification record. Instructions of the instruction set may be classified as members of a don't-care class, so that when an instruction of the don't-care class is executed, the record is left undisturbed to indicate the class of the classified instruction most recently executed. The destination instruction may be an entry point to an off-the-shelf binary for an operating system coded in an instruction set non-native to the computer.

The operating system may be an operating system for a computer architecture other than the architecture native to the computer. The computer may additionally execute an operating system native to the computer, and each exception may be classified for handling by one of the two operating systems. A linkage return address for resumption of the thread may be modified to include information used to maintain the association. At least some of the modified registers may be overwritten by a timestamp. The entry exception handler may alter at least half of the data registers of the portion of a process context maintained in association with the process by the operating system before delivering the process to the operating system, a validation stamp being redundantly stored in at least one of the registers, and wherein at least some of the modified registers are overwritten by a value indicating the storage location in which at least the portion of the thread context is saved before the modifying. The operating system and the interrupted thread may execute in different instruction set architectures of the computer. During servicing the entry exception, a portion of the context of the computer may be saved, and the context of an interrupted thread may be altered before delivering the interrupted thread and its corresponding context to the operating system. When the thread scheduler and the thread execute in different execution modes of the computer, the steps to maintain the association between the thread and the context may be automatically invoked on a transition from the thread execution mode to the thread scheduler execution mode. The thread context may be saved in a storage location allocated from a pool of storage locations managed by a queuing discipline in which empty storage locations in which a context is to be saved are allocated from the head of the queue, recently-emptied storage locations for reuse are enqueued at the head of the queue, and full storage locations to be saved are queued at the tail of the queue. A calling convention for the thread execution mode may require the setting of a register to a value that specifies actions to be taken to convert operands from one form to another to conform to the thread scheduler execution mode. Delivery of an interrupt may be deferred by a time sufficient to allow the thread to reach a checkpoint, or execution of the thread may be rolled back to a checkpoint, the checkpoints being points in the execution of the thread where the amount of extended context, being the resources of the thread beyond those whose resource association with the thread is maintained by the thread scheduler, is reduced. The linkage return address may be selected to point to a memory page having a memory attribute that raises the chosen exception on at attempt to execute an instruction from the page. The service routine may be an interrupt service routine of an operating system for a computer architecture other than the architecture native to the computer, the service routine may be invoked by an asynchronous interrupt, and the caller may be coded in the instruction set native to the architecture.

Particular embodiments of the invention may offer one or more of the following advantages. A program produced for a computer of an old architecture can be executed on a computer of a new architecture. The old binary can be executed without any modification. Old binaries can be mixed with new—for instance, a program coded for an old architecture can call library routines coded in the new instruction set, or vice-versa. Old libraries and new libraries may be freely mixed. New and old binaries may share the same address space, which improves the ability of new and old binaries to share common data. Alternatively, an old binary can be run in a protected separate address space on a new computer, without sharing any data with any new binary. A caller need not be aware of the ISA in which the callee is coded, avoiding the burden of explicitly saving and restoring context. The invention reduces software complexity: software need not make explicit provision for all possible entries and exits from all possible modes and mixtures of binaries. The pipelines for processing old instructions and new instructions can share pieces of the implementation, reducing the cost of supporting two instruction sets. A new computer can fully model an older computer, with no reliance on any software convention that may be imposed by any particular software product, allowing the new computer to run any program for the old computer, including varying off-the-shelf operating systems. Because translated target code is tracked in association with the physical pages of the source code, even if the physical pages are mapped at different points in the virtual address spaces, a single translation will be reused for all processes. This is particularly advantageous in the case of shared libraries.

In general, in a twelfth aspect, the invention features a method and a computer. A computer program executes in a logical address space of a computer, with an address translation circuit translating address references generated by the program from the program's logical address space to the computer's physical address space. Profile information is recorded that records physical memory addresses referenced during an execution interval of the program.

In general, in a thirteenth aspect, a program is executed on a computer, the program referring to memory by virtual address. Concurrently with the execution of the program, profile information is recorded describing memory references made by the program, the profile information recording physical addresses of the profiled memory references.

In general, in a fourteenth aspect, the invention features a computer with an instruction pipeline, a memory access unit, an address translation circuit, and profile circuitry. The instruction pipeline and memory access unit are configured to execute instructions in a logical address space of a memory of the computer. The address translation circuit translates address references generated by the program from the program's logical address space to the computer's physical address space. The profile circuitry is cooperatively interconnected with the instruction pipeline and is configured to detect, without compiler assistance for execution profiling, occurrence of profileable events occurring in the instruction pipeline, and cooperatively interconnected with the memory access unit to record profile information describing physical memory addresses referenced during an execution interval of the program.

Embodiments of the invention may include one or more of the following features. The recorded physical memory references may include addresses of binary instructions referenced by an instruction pointer, and at least one of the recorded instruction references may record the event of a sequential execution flow across a page boundary in the address space. The recorded execution flow across a page boundary may occur within a single instruction. The recorded execution flow across a page boundary may occur between two instructions that are sequentially adjacent in the logical address space. At least one of the recorded instruction references may be a divergence of control flow consequent to an external interrupt. At least one of the recorded instruction references may indicate the address of the last byte of an instruction executed by the computer during the profiled execution interval. The recorded profile information may record a processor mode that determines the meaning of binary instructions of the computer. The recorded profile information may record a data-dependent change to a full/empty mask for registers of the computer. The instruction pipeline may be configured to execute instructions of two instruction sets, a native instruction set providing access to substantially all of the resources of the computer, and a non-native instruction set providing access to a subset of the resources of the computer. The instruction pipeline and profile circuitry may be further configured to effect recording of profile information describing an interval of the execution of an operating system coded in the non-native instruction set.

In general, in a sixteenth aspect, the invention features a method. A program is executed on a computer. Profile information is recorded concerning the execution of the program, the profile information recording of the address of the last byte of at least one instruction executed by the computer during a profiled interval of the execution.

In general, in a seventeenth aspect, the invention features a method. A program is executed on a computer, without the program having been compiled for profiled execution, the program being coded in an instruction set in which an interpretation of an instruction depends on a processor mode not expressed in the binary representation of the instruction. Profile information is recorded describing an interval of the program's execution and processor mode during the profiled interval of the program, the profile information being efficiently tailored to annotate the profiled binary code with sufficient processor mode information to resolve mode-dependency in the binary coding.

In general, in an eighteenth aspect, the invention features a computer with an instruction pipeline and profile circuitry. The instruction pipeline is configured to execute instructions of the computer. The profile circuitry is configured to detect and record, without compiler assistance for execution profiling, profile information describing a sequence of events occurring in the instruction pipeline, the sequence including every event occurring during a profiled execution interval that matches time-independent selection criteria of events to be profiled, the recording continuing until a predetermined stop condition is reached, and is configured to detect the occurrence of a predetermined condition to commence the profiled execution interval after a non-profiled interval of execution.

In general, in a nineteenth aspect, the invention features a method and a computer with circuitry configured for performance of the method. During a profiled interval of an execution of a program on a computer, profile information is recorded describing the execution, without the program having been compiled for profiled execution, the program being coded in an instruction set in which an interpretation of an instruction depends on a processor mode not expressed in the binary representation of the instruction, the recorded profile information describing at least all events occurring during the profiled execution interval of the two classes: (1) a divergence of execution from sequential execution; and (2) a processor mode change that is not inferable from the opcode of the instruction that induces the processor mode change taken together with a processor mode before the mode change instruction. The profile information further identifies each distinct physical page of instruction text executed during the execution interval.

Embodiments of the invention may include one or more of the following features. The profiled execution interval is commenced at the expiration of a timer, the recorded profile describing a sequence of events including every event that matches time-independent selection criteria of events to be profiled, the recording continuing until a predetermined stop condition is reached. A profile entry is recorded for later analysis noting the source and destination of a control flow event in which control flow of the program execution diverges from sequential execution. The recorded profile information is efficiently tailored to identify all bytes of object code executed during the profiled execution interval, without reference to the binary code of the program. A profile entry describing a single profileable event explicitly describes a page offset of the location of the event, and inherits a page number of the location of the event from the immediately preceding profile entry. Profile information records a sequence of events of the program, the sequence including every event during the profiled execution interval that matches time-independent criteria of profileable events to be profiled. The recorded profile information indicates ranges of instruction binary text executed by the computer during a profiled interval of the execution, the ranges of executed text being recorded as low and high boundaries of the respective ranges. The recorded high boundaries record the last byte of the range. The captured profile information comprises subunits of two kinds, a first subunit kind describing an instruction interpretation mode at an instruction boundary, and a second subunit kind describing a transition between processor modes. During a non-profiled interval of the program execution, no profile information is recorded in response to the occurrence of profileable events matching predefined selection criteria for profileable events. The profile circuitry is designed to record a timestamp describing a time of the recorded events. The profile circuitry is designed to record an event code describing the class of each profileable event recorded. A number of bits used to record the event code is less than $\log_2$ of the number of distinguished event classes.

In general, in a twentieth aspect the invention features a method. While executing a program on a computer, the occurrence of profileable events occurring in the instruction pipeline is detected, and the instruction pipeline is directed to record profile information describing the profileable events essentially concurrently with the occurrence of the profileable events, the detecting and recording occurring under control of hardware of the computer without software intervention.

In general, in a twenty-first aspect, the invention features a computer that includes an instruction pipeline and profile circuitry. The instruction pipeline includes an arithmetic unit and is configured to execute instructions received from a memory of the computer and the profile circuitry. The profile circuitry is common hardware control with the instruction pipeline. The profile circuitry and instruction pipeline are cooperatively interconnected to detect the occurrence of profileable events occurring in the instruction pipeline, the profile circuitry operable without software intervention to effect recording of profile information describing the profileable events essentially concurrently with the occurrence of the profileable events.

In general, in a twenty-second aspect, the invention features first and second CPU's. The first CPU is configured to execute a program and generate profile data describing the execution of the program. The second CPU is configured to analyze the generated profile data, while the execution and profile data generation continue on the first CPU, and to control the execution of the program on the first CPU based at least in part on the analysis of the collected profile data.

In general, in a twenty-third aspect, the invention features a method. While executing a program on a computer, the computer using registers of a general register file for storage of instruction results, the occurrence of profileable events occurring in the instruction pipeline is detected. Profile information is recorded describing the profileable events into the general register file as the profileable events occur, without first capturing the information into a main memory of the computer.

In general, in a twenty-fourth aspect, the invention features a computer that includes a general register file of registers, an instruction pipeline and profile circuitry. The instruction pipeline includes an arithmetic unit and is configured to execute instructions fetched from a memory cache of the computer, and is in data communication with the registers for the general register file for storage of instruction results. The profile circuitry is operatively interconnected with the instruction pipeline and is configured to detect the occurrence of profileable events occurring in the instruction pipeline, and to capture information describing the profileable events into the general register file as the profileable events occur, without first capturing the information into a main memory of the computer.

In general, in a twenty-fifth aspect, the invention features a computer. The instruction pipeline is configured to execute instructions of the computer. The profile circuitry is implemented in the computer hardware, and is configured to detect, without compiler assistance for execution profiling, the occurrence of profileable events occurring in the instruction pipeline, and to direct recording of profile information describing the profileable events occurring during an execution interval of the program. Profile control bits implemented in the computer hardware have values that control a resolution of the operation of the profile circuitry. A binary translator is configured to translate programs coded in a first instruction set architecture into instructions of a second instruction set architecture. A profile analyzer is configured to analyze the recorded profile information, and to set the profile control bits to values to improve the operation of the binary translator.

Embodiments of the invention may include one or more of the following features. At least a portion of the recording is performed by instructions speculatively introduced into the instruction pipeline. The profile circuitry is interconnected with the instruction pipeline to direct the recording by injection of an instruction into the pipeline, the instruction controlling the pipeline to cause the profileable event to be materialized in an architecturally-visible storage register of the computer. An instruction of the computer, having a primary effect on the execution the computer not related to profiling, has an immediate field for an event code encoding the nature of a profiled event and to be recorded in the profile information, the immediate field having no effect on computer execution other than to determine the event code of the profiled event. Instances of the instruction have an event code that leaves intact an event code previously determined by other event monitoring circuitry of the computer. The profiled information includes descriptions of events whose event codes were classified by instruction execution hardware, without any explicit immediate value being recorded in software. The instruction pipeline and profile circuitry are operatively interconnected to effect injection of multiple instructions into the instruction pipeline by the profile circuitry on the occurrence of a single profileable event. The instruction pipeline and profile circuitry are operatively interconnected to effect speculative injection of the instruction into the instruction pipeline by the profile circuitry. A register pointer of the computer indicates a general register into which to record the profile information, and an incrementer is configured to increment the value of the register pointer to indicate a next general register into which to record next profile information, the incrementing occurring without software intervention. A limit detector is operatively interconnected with the register pointer to detect when a range of registers available for collecting profile information is exhausted, and a store unit is operatively interconnected with the limit detector of effect storing the profile information from the general registers to the main memory of the computer when exhaustion is detected. The profile circuitry comprises a plurality of storage registers arranged in a plurality of pipeline stages, information recorded in a given pipeline stage being subject to modification as a corresponding machine instruction progresses through the instruction pipeline. When an instruction fetch of an instruction causes a miss in a translation look aside buffer (TLB), the fetch of the instruction triggering a profileable event, the TLB miss is serviced, and the corrected state of the TLB is reflected in the profile information recorded for the profileable instruction. The profile control bits include a timer interval value specifying a frequency at which the profile circuitry is to monitor the instruction pipeline for profileable events. The profile circuitry comprises a plurality of storage registers arranged in a plurality of pipeline stages, information recorded in a given pipeline stage is subject to modification as a corresponding machine instruction progresses through the instruction pipeline.

Particular embodiments of the invention may feature one or more of the following advantages. The profile data may be used in a "hot spot" detector, that identifies portions of the program as frequently executed. Those frequently-executed portions can then be altered, either by a programmer or by software, to run more quickly. The profile data may be used by a binary translator to resolve ambiguities in the binary coding of instructions. The information generated by the profiler is complete enough that the hot spot detector can be driven off the profile, with no need to refer to the instruction text itself. This reduces cache pollution. Ambiguities in the X86 instruction text (the meaning of a given set of instructions that cannot be inferred from the instruction text, for instance the operand size information from the segment descriptors) are resolved by reference to the profile information. The information collected by the profiler compactly represents the information needed by the hot spot detector and the binary translator, with relatively little overhead, thereby reducing cache pollution. The profiler is integrated into the hardware implementation of the computer, allowing it to run fast, with little delay on a program—the overhead of profiling is only a few percent of execution speed.

The above advantages and features are of representative embodiments only, and are presented only to assist in understanding the invention. It should be understood that they are not to be considered limitations on the invention as defined by the claims, or limitations on equivalents to the claims. For instance, some pairs of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

DESCRIPTION OF THE DRAWING

FIGS. 1a, 1b, 1c, 1d and 3a are block diagrams of a computer system.

FIG. 2a is a table relating the meaning of several bits of the PSW of FIG. 1e.

FIGS. 2b and 2c are tables relating the actions of exception handlers.

FIGS. 3b, 3c, 3d, 3e, 3f, 3l, 3m, 3n and 3o are block diagrams showing program flow through memory.

FIGS. 3g, 3h, 3i, 3j, and 6c are flow diagrams.

FIG. 3k shows data declarations.

FIG. 4b is a table of profiling event codes and their meaning.

FIGS. 4c, 4d, and 6a show data structures.

DESCRIPTION

The description is organized as follows.

Figure 1A:
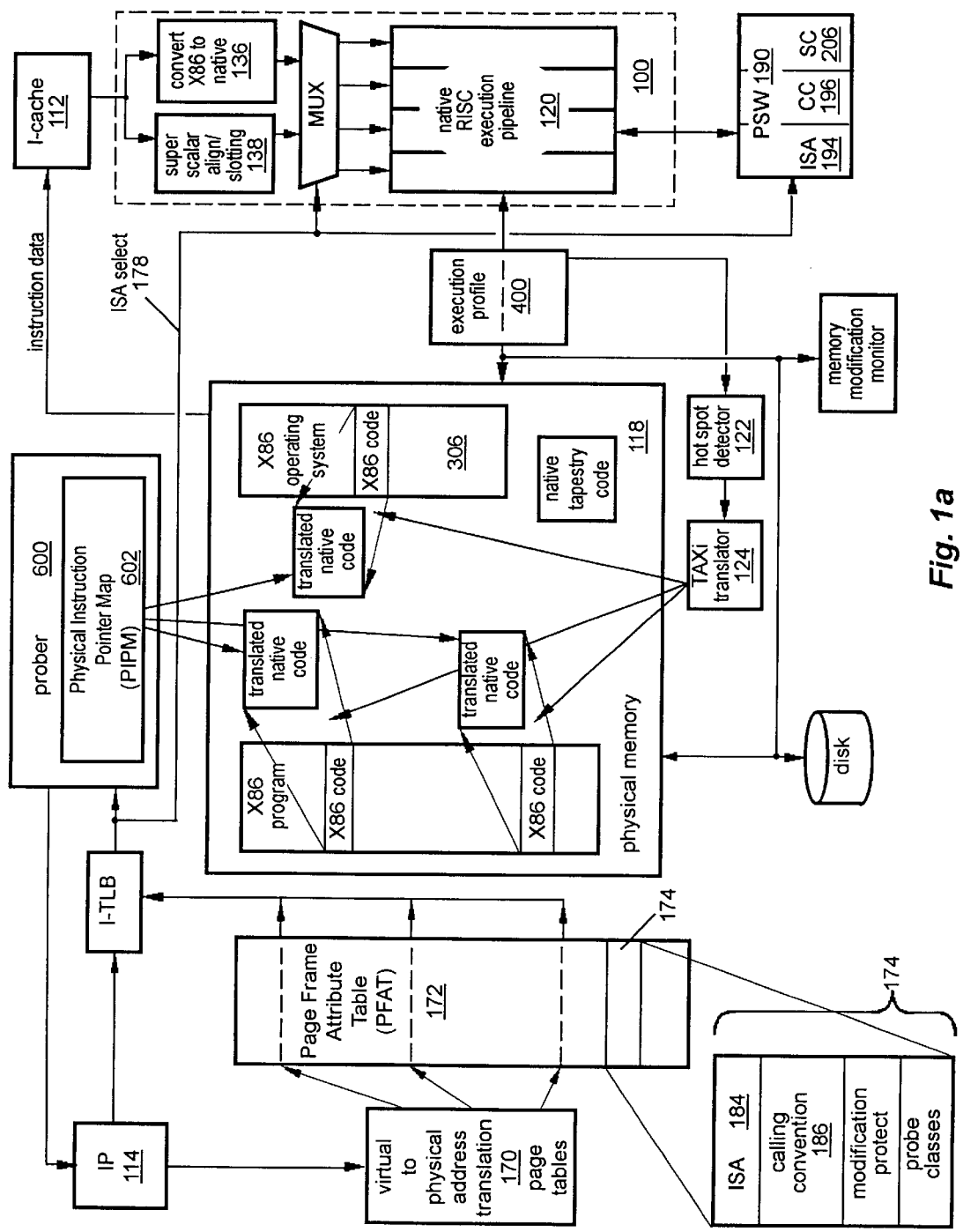
Figure 1B:
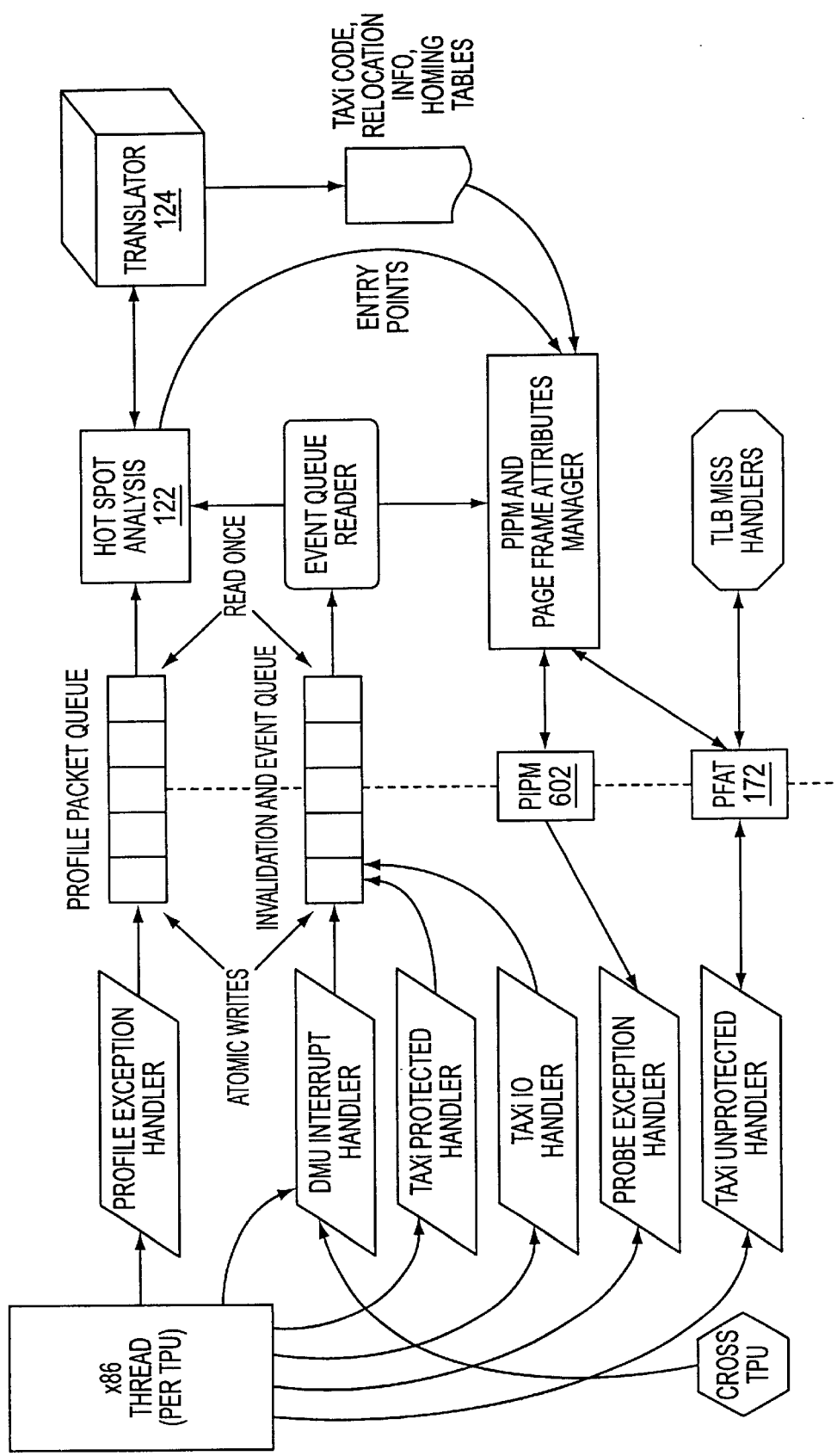

I. Overview of the Tapestry system, and features of general use in several aspects of the invention
   A. System overview
   B. The Tapestry instruction pipeline
   C. Address translation as a control point for system features
   D. Overview of binary translation, TAXi and the converter safety net
   E. System-wide controls
   F. The XP bit and the unprotected exception
II. Indicating the instruction set architecture (ISA) for program text
III. Saving Tapestry processor context in association with an X86 thread
   A. Overview
   B. Subprogram Prologs
   C. X86-to-Tapestry transition handler
   D. Tapestry-to-X86 transition handler
   E. Handling ISA crossings on interrupts or exceptions in the Tapestry operating system
   F. Resuming Tapestry execution from the X86 operating system
   G. An example
   H. Alternative embodiments
IV. An alternative method for managing transitions from one ISA to the other
   A. Indicating the calling convention (CC) for program text
   B. Recording Transfer of Control Semantics and Reconciling Calling Conventions
V. Profiling to determine hot spots for translation
   A. Overview of profiling
   B. Profileable events and event codes
   C. Storage form for profiled events
   D. Profile information collected for a specific example event—a page straddle
   E. Control registers controlling the profiler
   F. The profiler state machine and operation of the profiler
   G. Determining the five-bit event code from a four-bit stored form
   H. Interaction of the profiler, exceptions, and the XP protected/unprotected page property
   I. Alternative embodiments
VI. Probing to find a translation
   A. Overview of probing
   B. Overview of statistical probing
   C. Hardware and software structures for statistical probing
   D. Operation of statistical probing
   E. Additional features of probing
   F. Completing execution of TAXi code and returning to the X86 code G. The interaction of probing and profiling VII. Validating and invalidating translated instructions I. Overview of the Tapestry System, and Features of General Use in Several Aspects of the Invention A. System overview Referring to FIGS. 1a, 1b and 1c, the invention is embodied in the Tapestry product of Chromatic Research, Inc. of Sunnyvale, Calif. Tapestry is fast RISC processor 100, with hardware and software features that provide a correct implementation of an Intel X86-family processor. ("X86" refers to the family including the 8086, 80186, . . . 80486, Pentium, and Pentium Pro. The family is described in Intel Architecture Software Developer's Manual, Vol. 1–3, Intel Corp. (1997)) Tapestry fully implements the X86 architecture, in particular, a full Pentium with MMX extensions, including memory management, with no reliance on any software convention imposed, for instance, by a Microsoft or IBM operating system. A Tapestry system will typically be populated by two to four processors (only one of which is shown in FIGS. 1a, 1b and 1c), interconnected as symmetric shared memory multiprocessors.

Tapestry processor 100 fetches (stage 110) instructions from instruction cache (I-cache) 112, or from memory 118, from a location specified by IP (instruction pointer, generally known as the PC or program counter in other machines) 114, with virtual-to-physical address translation provided by I-TLB (instruction translation look-aside buffer) 116. The instructions fetched from I-cache 112 are executed by a RISC execution pipeline 120. In addition to the services provided by a conventional I-TLB, I-TLB 116 stores several bits 182, 186 that choose an instruction environment in which to interpret the fetched instruction bytes. One bit 182 selects an instruction set architecture (ISA) for the instructions on a memory page. Thus, the Tapestry hardware can readily execute either native instructions or the instructions of the Intel X86 ISA. This feature is discussed in more detail in section II, infra.

The execution of a program encoded in the X86 ISA is typically slower than execution of the same program that has been compiled into the native Tapestry ISA. Profiler 400 records details of the execution flow of the X86 program. Profiling is discussed in greater detail in section V, infra. Hot spot detector 122 analyzes the profile to find "hot spots," portions of the program that are frequently executed. When a hot spot is detected, a binary translator 124 translates the X86 instructions of the hot spot into optimized native Tapestry code, called "TAXi code." During emulation of the X86 program, prober 600 monitors the program flow for execution of X86 instructions that have been translated into native code. When prober 600 detects that translated native Tapestry code exists corresponding to the X86 code about to be executed, and some additional correctness predicates are satisfied, prober 600 redirects the IP to fetch instructions from the translated native code instead of from th, X86 code. Probing is discussed in greater detail in section VI, infra. The correspondence between X86 code and translated native Tapestry code is maintained in PIPM (Physical Instruction Pointer Map) 602.

Because the X86 program text may be modified while under execution, the system monitors itself to detect operations that may invalidate a previous translation of X86 program text. Such invalidating operations include self-modifying code, and (direct memory access (DMA) transfers. When such an operation is detected, the system invalidates any native Tapestry translation that may exist corresponding to the potentially-modified X86 text. Similarly, any other captured or cached data associated with the modified X86 data is invalidated, for instance profile data. These validity-management mechanisms are discussed in greater detail in sections I.F and VII, infra.

The system does not translate instructions stored in non-DRAM memory, for instance ROM BIOS for I/O devices, memory-mapped control registers, etc.

Storage for translated native Tapestry code can also be release d and reclaimed under a replacement policy, for instance least-recently-used (LRU) or first-in first-out (FIFO).

A portion of the X86 program may be translated into native Tapestry code multiple times during a single execution of the program. Typically, the translation is performed on one processor of the Tapestry multiprocessor while the execution is in progress on another.

For several years, Intel and others have implemented the X86 instruction set using a RISC execution core, though the RISC instruction set has not been exposed for use by programs. The Tapestry computer takes three new approaches. First, the Tapestry machine exposes both the native RISC instruction set and the X86 instruction set, so that a single program can be coded in both, with freedom to call back and forth between the two. This approach is enabled by ISA bit 180, 182 control on converter 136, and context saving in the exception handler (see sections II and III, infra), or in an alternative embodiment, by ISA bit 180, 182, calling convention bit 200, semantic context record 206, and the corresponding exception handlers (see section IV, infra). Second, an X86 program may be translated into native RISC code, so that X86 programs can exploit many more of the speed opportunities available in a RISC instruction set. This second approach is enabled by profiler 400, prober 600, binary translator, and certain features of the memory manager (see sections V through VII, infra). Third, these two approaches cooperate to provide an additional level of benefit.

Most of the features discussed in this disclosure are under a global control, a single bit in a processor control register named "PP_enable" (page properties enabled). When this bit is zero, ISA bit 180, 182 is ignored and instructions are interpreted in Tapestry native mode, profiling is disabled, and probing is disabled.

B. The Tapestry instruction pipeline

Referring to FIG. 1c, a Tapestry processor 100 implements an 8- or 9-stage pipeline. Stage 1 (stage 110) fetches a line from I-cache 112. Stages 2 (Align stage 130) and 3 (Convert stage 134, 136, 138) operate differently in X86 and native Tapestry modes. In native mode, Align stage 130 runs asynchronously from the rest of the pipeline, prefetching data from the I-cache 112 into elastic prefetch buffer 132. In X86 mode, Align stage 130 partially decodes the instruction stream in order to determine boundaries between the variable length X86 instructions, and presents integral X86 instructions to Convert stage 134. During X86 emulation, stage 3, Convert stage 134, 136 decodes each X86 instruction and converts 136 it into a sequence of native Tapestry instructions. In decomposing an X86 instruction into native instructions, converter 136 can issue one or two Tapestry instructions per cycle. Each Tapestry processor 100 has four parallel pipelined functional units 156, 158, 160, 162 to implement four-way superscalar issue of the last five stages of the pipeline. In native mode, convert stage 134, 138 determines up to four independent instructions that can be executed concurrently, and issues them downstream to the four superscalar execution pipelines. (In other machine descriptions, this is sometimes called "slotting," deciding whether sufficient resources and functional units are available, and which instruction is to be issued to which functional unit.) The Decode 140, Register-read 142, Address-Generate 144, Memory 146, Execute 148, and Write-back 150 stages are conventional RISC pipeline stages.

Converter 136 decodes each X86 instruction and decomposes it into one or more simple Tapestry instructions. The simple instructions are called the "recipe" for the X86 instruction.

Referring to Table 1, when X86 converter 136 is active, there is a fixed mapping between X86 resources and Tapestry resources. For instance, the EAX, EBX, ECX, EDX, ESP and EBP registers of the X86 architecture are mapped by converter hardware 136 to registers R48, R49, R50, R51, R52 and R53, respectively, of the Tapestry physical machine. The eight floating-point registers of the X86, split into a 16-bit sign and exponent, and a 64-bit fraction, are mapped to registers R32–47. The X86 memory is mapped to the Tapestry memory, as discussed in section I.C, infra.

The use of the registers, including the mapping to X86 registers, is summarized in Table 1. The "CALL" column describes how the registers are used to pass arguments in the native Tapestry calling convention. (Calling conventions are discussed in detail in sections III.A, III.B, and IV, infra.) The "P/H/D" column describes another aspect of the Tapestry calling convention, what registers are preserved across calls (if the callee subprogram modifies a register, it must save the register on entry and restore it on exit), which are half-preserved (the low-order 32 bits are preserved across calls, but the upper 32 bits may be modified), and which are destroyable. The "X86 p/d" column shows whether the low-order 32 bits of the register, corresponding to a 32-bit X86 register, is preserved or destroyed by a call. The "Converter," "Emulator" and "TAXi" columns show the mapping between Tapestry registers and X86 registers under three different contexts. For registers r32–r47, "hi" in the X86 columns indicates that the register holds a 16-bit sign and exponent portion of an X86 extended-precision floating-point value, and "lo" indicates the 64-bit fraction.

| | Tap CALL | Tap P/H/D | Description | X86 p/d | X86 Converter | X86 Emulator | TAXi |
|---|---|---|---|---|---|---|---|
| r63 | | P | — | | — | — | — |
| r62 | | P | — | | — | — | — |
| r61 | | P | — | | — | — | — |
| r60 | | P | — | | — | — | — |
| r59 | | P | — | | — | — | — |
| r58 | | P | — | | — | — | — |
| r57 | | P | — | | — | — | — |
| r56 | | P | — | | — | — | — |
| r55 | | H | X86 code will preserve only low 32 bits | p | edi | edi | edi |
| r54 | | H | X86 code will preserve only low 32 bits | p | esi | esi | esi |
| r53 | [FP] | H | must be Frame-Pointer if stack frame has variable size. | p | ebp | ebp | ebp |
| r52 | SP | H | stack pointer | p | esp | esp | esp |
| r51 | RV3 | D | if(192 bits < size <= 256 bits) fourth 64 bits of function result | d | ebx | ebx | ebx |
| r50 | RV2 | D | X86_fastcall 2nd arg; if (128 bits <size <= 256 bits) third 64 bits of function result | d | edx | edx | edx |
| r49 | THIS RV1 | D | X86_fastcall 1st arg; "thiscall" object address (unadorned C++ non-static method); if (64 bits < size <= 256 bits) second 64 bits of function result | d | ecx | ecx | ecx |
| r48 | RV0 | D | X86 function result first 64 bits of function result (unless it is DP floating-point) | d | eax | eax | eax |
| r47 | P15 | D | parameter register 15 | | f7-hi | f7-hi | f7-hi |
| r46 | P14 | D | parameter register 14 | | f7-lo | f7-lo | f7-lo |
| r45 | P13 | D | parameter register 13 | | f6-hi | f6-hi | f6-hi |
| r44 | P12 | D | parameter register 12 | | f6-lo | f6-lo | f6-lo |
| r43 | P11 | D | parameter register 11 | | f5-hi | f5-hi | f5-hi |
| r42 | P10 | D | parameter register 10 | | f5-lo | f5-lo | f5-lo |
| r41 | P9 | D | parameter register 9 | | f4-hi | f4-hi | f4-hi |
| r40 | P8 | D | parameter register 8 | | f4-lo | f4-lo | f4-lo |
| r39 | P7 | D | parameter register 7 | | f3-hi | f3-hi | f3-hi |
| r38 | P6 | D | parameter register 6 | | f3-lo | f3-lo | f3-lo |
| r37 | P5 | D | parameter register 5 | | f2-hi | f2-hi | f2-hi |
| r36 | P4 | D | parameter register 4 | | f2-lo | f2-lo | f2-lo |
| r35 | P3 | D | parameter register 3 | | f1-hi | f1-hi | f1-hi |
| r34 | P2 | D | parameter register 2 | | f1-lo | f1-lo | f1-lo |
| r33 | P1 | D | parameter register 1 | | f0-hi | f0-hi | f0-hi |
| r32 | P0 | D | parameter register 0 | | f0-lo | f0-lo | f0-lo |
| r31 | RVA, RVDP | D | address of function result memory temporary (if any); DP floating-point function result | | Prof15 | Prof15 | |
| r30 | | D | | | Prof14 | Prof14 | |
| r29 | | D | | | Prof13 | Prof13 | |
| r28 | | D | | | Prof12 | Prof12 | |
| r27 | | D | | | Prof11 | Prof11 | |
| r26 | | D | | | Prof10 | Prof10 | |
| r25 | | D | | | Prof9 | Prof9 | |
| r24 | | D | | | Prof8 | Prof8 | |
| r23 | | D | | | Prof7 | Prof7 | |
| r22 | | D | | | Prof6 | Prof6 | |
| r21 | | D | | | Prof5 | Prof5 | |
| r20 | | D | | | Prof4 | Prof4 | |
| r19 | | D | | | Prof3 | Prof3 | |

-continued

| Tap CALL | Tap P/H/D | Description | X86 p/d | X86 Converter | X86 Emulator | TAXI |
|---|---|---|---|---|---|---|
| r18 | | D | | | Prof2 | Prof2 | |
| r17 | | D | | | Prof1 | Prof1 | |
| r16 | | D | | | Prof0 | Prof0 | |
| r15 | XD | D | Cross-ISA transfer descriptor (both call and return) | | RingBuf | RingBuf | |
| r14 | | D | | | | CT10 | |
| r13 | | D | | | | CT9 | |
| r12 | | D | | | | CT8 | |
| r11 | | D | | | | CT7 | |
| r10 | | D | | | | CT6 | |
| r9 | | D | | | | CT5 | |
| r8 | | D | | | | CT4 | |
| r7 | GP | D | pointer to global static environment (per-image) | | CT3 | CT3 | |
| r6 | LR | D | linkage register | | CT2 | CT2 | |
| r5 | AP | D | argument list pointer (overflow arguments in memory) | | CT1 | CT1 | |
| r4 | AT | D | | | | AT | |
| r3 | | vol | volatile, may only be used in exception handlers | vol | vol | vol | vol |
| r2 | | vol | volatile, may only be used in exception handlers | vol | vol | vol | vol |
| r1 | | vol | volatile, may only be used in exception handlers | vol | vol | vol | vol |
| r0 | | n/a | always zero | n/a | n/a | n/a | n/a |

Figure 1D:
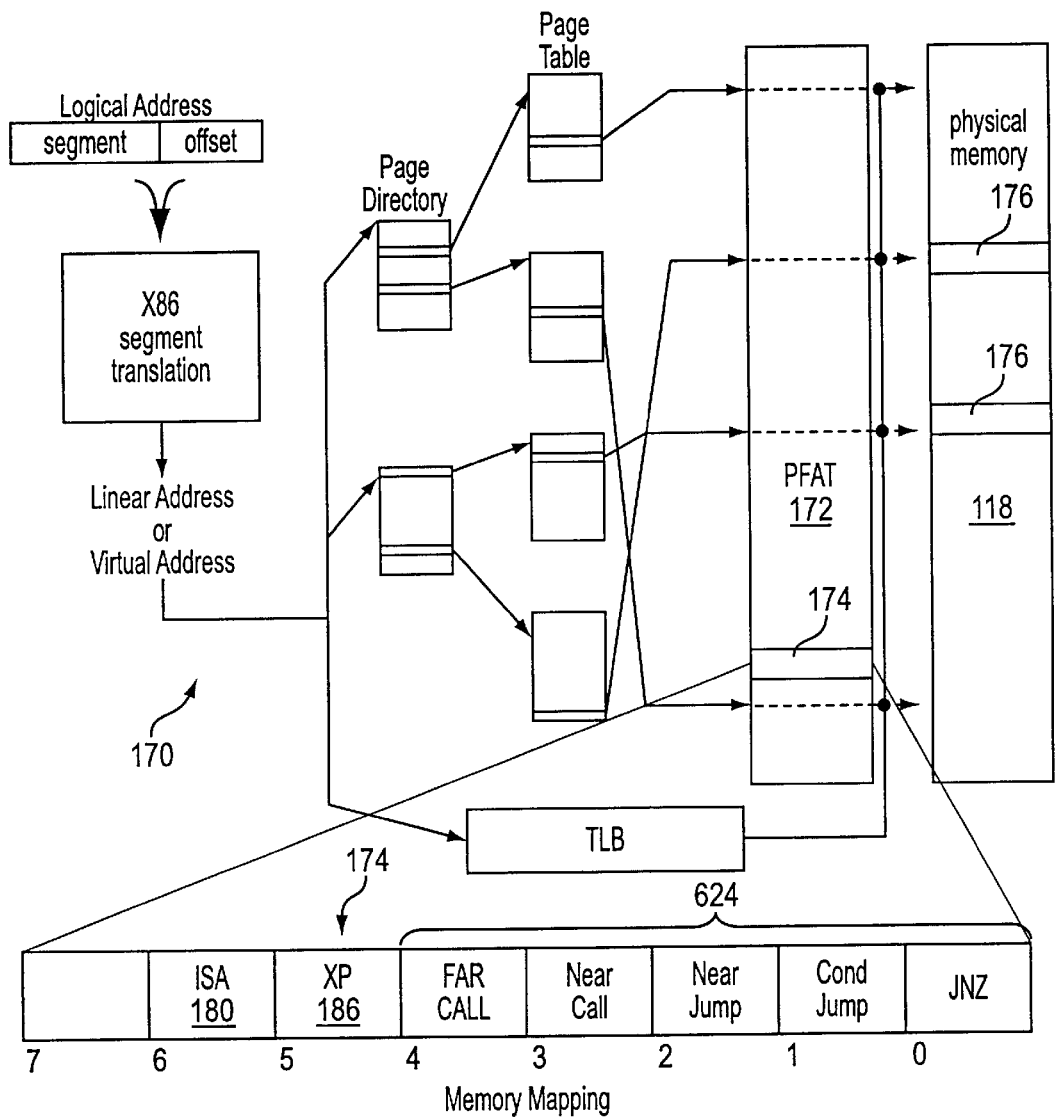

Tapestry supersets many features of the X86. For instance, the Tapestry page table format is identical to the X86 page table format; additional information about page frames is stored in a Tapestry-private table, the PFAT (page frame attribute table) 172, as shown in FIG. 1d. As will be shown in FIG. 1e, the Tapestry PSW (Program Status Word) 190 embeds the X86 PSW 192, and adds several bits.

The Tapestry hardware does not implement the entire X86 architecture. Some of the more baroque and less-used features are implemented in a software emulator (316 of FIG. 3a). The combination of hardware converter 136 and software emulator 316, however, yields a full and faithful implementation of the X86 architecture.

C. Address translation as a control point for system features

Referring to FIG. 1d, X86 address translation is implemented by Tapestry's native address translation. During X86 emulation, native virtual address translation 170 is always turned on. Even when the X86 is being emulated in a mode where X86 address translation is turned off, Tapestry address translation is turned on, to implement an identity mapping. By forcing every memory reference through the Tapestry address translation hardware, address translation becomes a convenient place for intercepting much of the activity of X86 converter 136, and controlling the converter's execution. Further, control information for many features of the invention is conveniently stored in tables associated with, or tables analogous to those conventionally used for, address translation and virtual memory management. These "hooks" into address translation allow the Tapestry processor and software to intervene to emulate portions of the X86 that have "strange" behavior, like VGA graphics hardware, control registers, memory mapped device controls, and parts of the X86 address space that are given special treatment by traditional Intel chip sets.

To avoid changing the meaning of any portion of storage that X86 programs might be using, even if that use is unconventional, the Tapestry processor does not store any of its information in the X86 address translation tables. Tapestry-specific information about pages is stored in structures created specifically for Tapestry emulation of the X86. These structures are not defined in the X86 architecture, and are invisible to the emulated X86 or any program executing on the X86. Among these structures are PFAT (page frame attribute table) 172. PFAT 172 is a table whose entries correspond to physical page frames and hold data for processing and managing those page frames, somewhat analogous to the PFN (page frame number) database of the VAX/VMS virtual memory manager (see, e.g., Lawrence Kenah and Simon Bate, VAX/VMS Internals and Data Structures, Digital Press, 1984, incorporated herein by reference). PFAT 172 has one 1-byte entry 174 corresponding to each physical page frame.

As will be discussed in sections II, IV, and V and VI, infra, PFAT entries 174 also include bits that control which ISA is used to decode the instructions of the corresponding page, which calling convention is used on the corresponding page, and to control probing.

D. Overview of binary translation, TAXi and the converter safety net

Referring again to FIGS. 1a and 1b, TAXi ("Tapestry accelerated execution," pronounced "taxi") is a binary translation system. TAXi marries two modes of execution, hardware converter 136 (with software assistance in the run-time system) that faithfully implements a gold standard implementation of the full X86 architecture, and a software binary translator 124 that translates X86 binaries to Tapestry native binaries, but optimizes the translated code by making certain optimistic assumptions that may violate correctness.

As a pre-existing X86 binary is executed in converter 136, hot spots (frequently-executed portions) in the X86 binary are recognized 122, and translated 124 on-the-fly into native Tapestry instructions. The hardware converter 136 (coupled with a software X86 emulator 316 for especially complex instructions) is necessarily slower than the translated code, because the X86 instructions must be executed in strict sequence. By translating complete hot spots of an X86 binary, as opposed to "translating" single instructions in converter 136, more optimization opportunities are exposed: X86 instructions can be decomposed into small data-independent Tapestry instructions, which in turn can be executed out of order, pipelined, or executed in parallel in the four superscalar pipelines (156, 158, 160, 162 of FIG. 1c).

Execution of X86 code is profiled. This profiling information is used to identify 122 the "hot spots" in the X86 program, the most-executed parts of the program, and thus the parts that can most benefit from translation into native Tapestry code. The hot spots in the X86 code are translated by translator 124 into native Tapestry code (TAXi code). As execution of the X86 program proceeds, execution is monitored to determine whether a translated equivalent exists for the X86 code about to be executed. If so, execution is transferred to the translated native Tapestry code.

TAXi translator 124 adopts a somewhat simplified view of the machine behavior; for instance, some X86 instructions are not translated. Translator 124 also takes an optimistic view. For instance, translator 124 assumes that there will be no floating-point exceptions or page faults, so that operations can be reordered or speculatively rescheduled without changing program behavior. Translator 124 also assumes that all memory references are to well-behaved memory. ("Well-behaved memory" is a memory from which a load will receive the data last stored at the memory location. Non-well-behaved memory is typified by memory-mapped device controllers, also called "I/O space," where a read causes the memory to change state, or where a read does not necessarily return the value most-recently written, or two successive reads return distinct data. For instance, binary translator 124 assumes that memory reads can be reordered. Translated native Tapestry code runs faster than converter 136, and is used when translation can be guaranteed to be correct, or when any divergence can be caught and corrected.

The execution of the TAXi code is monitored to detect violations of the optimistic assumptions, so that any deviation from correct emulation of the X86 can be detected. Either a pre-check can detect that execution is about to enter a region of translated code that can not be trusted to execute correctly, or hardware delivers an exception after the fact when the optimistic assumptions are violated. In either case, when correctness cannot be guaranteed, or for code that translator 124 does not know how to translate, execution of the translated native Tapestry code is aborted or rolled back to a safe check point, and execution is resumed in the hardware converter 136. The hardware converter 136 adopts the most conservative assumptions, guaranteeing in-order, gold standard correctness, and serves as a safety net for the less risk-averse binary translator 124.

This safety net paradigm allows binary translator 124 to be more aggressive, and makes development easier, because developers can focus on performance issues and leave correctness issues to be caught in the safety net.

Tapestry and TAXi implement a full X86 architecture. No concession is required from X86 software; indeed, any X86 operating system can run on Tapestry, including off-the-shelf operating systems not specially adapted for Tapestry. Tapestry and TAXi make no assumptions about operating system entities, such as processes, threads, virtual address spaces, address mappings. Thus, Tapestry and TAXi operate in terms of the physical memory of the virtual X86, not the X86 virtual or linear addresses. (The distinction between Intel's "virtual" addresses and "linear" addresses seldom arises in the context of this disclosure; thus, unless a fine distinction between the two is required, this disclosure uses the term "virtual address" to embrace both concepts.) For instance, library code that is shared between different processes at the operating system level, by using physical addresses, is automatically shared by TAXi processes because the physical memory is shared on the Tapestry implementation. Code shared by the operating system is shared even if it is mapped at different addresses in different processes. If the processes are actually sharing the same physical page, then TAXi will share the same translated code Buffers of translated code are recycled in a first-in-first-out (FIFO) order. Once a translated code buffer is marked for reclamation, it is not immediately discarded; rather it is marked available for reuse. If execution re-enters an available-for-reuse buffer before the contents are destroyed, the buffer is recycled to the head of the FIFO queue. In an alternative embodiment, whenever the buffer is entered, it is moved to the head of the FIFO queue; this approximates a least-recently-used (LRU) replacement policy.

A number of features of the TAXi system are tied to profiling. For instance, a region of code that is not profiled can never be identified as a hot spot, and thus will never be translated. Similarly, probing (see section VI, infra) is disabled for any region that is not profiled, because without a translation, a probe can never succeed. This invariant simplifies a number of design details, as will be discussed at various points infra.

E. System-wide controls

The PSW 190 has a Taxi_Active bit 198 that enables user-mode access to functionality that is otherwise disallowed in user mode. PSW.Taxi_Active 198 will be set true while a native Tapestry translation of an X86 program is being executed. When PSW.Taxi_Active 198 is true, a user-mode program may access the LDA/STA lock functionality of the X86, it has read and write access to all Tapestry processor registers, and it may access extended TRAP instruction vectors (specifically, to enable calling emulator functions). Further, X86-compatible semantics for extended precision floating-point operations is enabled.

A successful probe will set PSW.Taxi_Active 198 before it RFE's to the TAXi-translated code. When the TAXi-translated code completes execution, the process of returning to untranslated X86 code will clear PSW.Taxi_Active 198 before RFE-ing back to converter 136. If an exception occurs in the TAXi-translated code, then emulator 316 will be called to surface the exception back to the X86 virtual machine. Emulator 316 will check EPC.Taxi_Active 198 and return control to TAXi to restore the X86 machine context and RFE back to converter 136 to re-execute the X86 instruction.

F. The XP bit and the unprotected exception

Referring again to FIGS. 1a, 1b and 2a, TAXi translator 124 produces a translation of an X86 binary. The TAXi system as a whole represents a very complex cache, where the X86 code represents the slower memory level and the translated TAXi code represents the faster memory level. TAXi begins caching information at the time of profiling, because profiling records knowledge about what events occurred at what addresses, where the instruction boundaries were, etc. Further caching occurs when binary translator 124 translates X86 code into semantically equivalent Tapestry native code. In order not to violate the X86 architectural model, TAXi protects against execution of translated Tapestry native code that corresponds to stale X86 code, X86 code that has either disappeared or been modified. If the underlying primary datum (the X86 instruction text) is modified, whether by a memory write from the CPU, or by a DMA write from a device, the cached data (the profile describing the X86 code and the TAXi code generated from it) is invalidated, so that it will not be executed. Execution will revert to the X86 text, in its modified form. If the modified X86 text becomes a hot spot, it may be recognized 122 and retranslated 124.

Like an ordinary cache, the TAXi cache has a valid bit—the XP bit (184 in PIPM entry 640, 186 in the I-TLB, see FIGS. 1a, 1b). When a page of X86 is protected, that is, when its XP protected bit 184, 186 is One, there are two classes of event that invalidate the TAXi code associated with the X86 code. First, a Tapestry processor could do a store into one of the X86 pages. This could arise if the program uses self-modifying code, or if the program creates code in writeable storage (stack or heap) on the fly. Second, a DMA device could write onto the page, for instance, when a page of program text is paged in on a page fault. In either case, Tapestry generates an interrupt, and a handler for the interrupt resets the XP "valid" bit to indicate that any TAXi code corresponding to the X86 page cannot be reached by a probe (recall from section VI.D that probing is only enabled on X86 pages whose XP bit 184, 186 is One).

X86 code, and the validity of the "cached" translated native Tapestry code, is protected against modification by CPU writes XP write-protect bit 184, 186, and exception handlers that manage the protection of pages. Together, the flags and exceptions maintain a coherent translated Tapestry binary as a "cached" copy of the X86 program, while allowing the X86 program (whether encoded in its original X86 form or in translated native Tapestry form) to write to memory, even if that write implements self-modifying code. In either mode, the machine (either X86 converter 136 or the TAXi system) will faithfully execute the program's semantics. The protected and unprotected exceptions do not terminate processing in the manner of a conventional write-protect exception, but merely signal to the TAXi system that it must intervene to manage the validity of any TAXi code.

The write-protect bit is named "XP," originally an acronym for "extended property." Thus, when ISA bit (180 in PFAT 172, 182 in I-TLB) for a page indicates X86 ISA, the XP bit (184 in PIPM entry 640, 186 in the I-TLB) is interpreted to encode the modify-protect property for the page. XP bit 184, 186 controls the protection mechanism on a page-by-page granularity. The protection system for the machine as a whole is enabled and disabled by the Taxi_Control.unpr bit (bit <60>of the Taxi_Control register, 468 of FIG. 4g, see section V.E, infra).

Physical pages are divided for management between Tapestry operating system (312 of FIG 3a) and X86 operating system 306, and PFAT.ISA bit 180 for the pare (which is cached in the I-TLB.ISA bit 182) is set accordingly, Zero for Tapestry, One for X86. For all X86 pages, the XP bit (184 in PFAT 172, 186 in I-TLB 116) is cleared to Zero to indicate "unprotected." XP bit 184, 186 has no effect on Tapestry pages.

XP bit 184, 186 behaves somewhat analogously to a cache "dirty" bit. Four points of the analogy are explained below.

A write to a clean cache line makes the line dirty. Analogously, a write to an XP-protected 184, 186 page causes the page to go unprotected. If ISA bit 180, 182 is One and XP bit 184, 186 is One, then this is an X86 instruction page that is protected. Any store to the page is aborted and control is passed to the protected exception handler. The handler marks the page unprotected.

A write to a dirty cache line, or to an XP-unprotected 184, 186 page, induces no state change. If XP bit 184, 186 is Zero, then stores are allowed to complete.

A read from a clean cache line proceeds without further delay, because the data in the cache are current. Analogously, converter 136 execution of an instruction from an XP-protected 184, 186 page proceeds without delay, because if any translated TAXi code has been generated from the instructions on the page, the TAXi code is current, and the profiling (400, see section V, infra) and probing mechanisms will behave correctly.

A read from a dirty cache line forces updating of the line from another processor, because the data in the local cache are stale. Analogously, when converter 136 executes code from XP-unprotected 184, 186 page, and is about to write a profile trace-packet entry, with certain additional conditions, the machine takes an "unprotected" exception and vectors to the corresponding handler. The handler brings the TAXi code cache up to date with the original X86 instruction text. An unprotected exception is raised when an instruction is fetched from an unprotected X86 page (the page's I-TLB.ISA bit 182 is One, see section II, infra, and I-TLB.XP 186 bit is Zero), and Taxi_Control.unpr 468 is One and either of the following:

(1) a profile capture instruction is issued to start a new profile packet (Taxi_State.Profile_Active (482 of FIG. 4h) is Zero, Taxi_State.Profile_Request 484 is One, and Taxi_State.Event_Code_Latch 486, 487 contains an event code for which "initiate packet" 418 is True in FIG. 4b), or (2) when the first instruction in a converter recipe is issued and Taxi_State.Profile_Active 482 is One.

The state variables of this equation are explained in sections V.E and V.F and FIGS. 4g, 4h, 5a and 5b.

The unprotected exception handler looks up the physical page address of the fetched instruction from the EPC.EIP (the EPC is the native exception word (instruction pointer and PSW) pushed onto the stack by the exception, and EPC.EIP is the instruction pointer value), or from a TLB fault address processor register. The interrupt service routine sets the PFAT.XP bit 184 and I-TLB.XP bit 186 for the page to One, indicating that the page is protected. This information is propagated to the other Tapestry processors and DMU (DMA monitoring unit), 700 in a manner analogous to the handling of a "dirty" exception in a shared-memory multi-processor cache system. The exception handler may either abort the current profile packet (see section V.F, infra), or may put the machine in a context from which the profile packet can be continued. Then the exception handler returns to converter 136 to resume execution.

When Taxi_Control.unpr 468 is clear, no exception is generated and TAXi software is responsible for validating the profile packet and setting the "Protected" page attribute.

In an alternative embodiment, the unprotected exception handler aborts the current profile packet, and enqueues the identity of the page. Later, a lazy agent, analogous to a page purifier in a, virtual memory system, manipulates the PFAT.XP bit 184, I-TLB.XP bit 186, and DMU (DMA monitoring unit) to protect the page. When execution next enters the page, the page will be protected, and profiling proceeds in the normal course.

When Taxi_Control.unpr 468 is Zero, no exception is generated and TAXi software is responsible for validating the profile packet and setting the "Protected" page attribute.

Attempts to write to a protected page (for instance, by self-modifying code, or a write to a mixed text-and-data page) will be trapped, and the page will be set unprotected again.

Profiling is effectively disabled for unprotected pages, because an attempt to profile on an unprotected page, while Taxi_Control.unpr 468 is One, raises an unprotected exception, and the unprotected exception handler either makes the page protected, or aborts the profile packet. Turning off profiling for unprotected pages ensures that an unprotected page will not be recognized as a hot spot, and thus not translated. Conversely, if a page cannot be protected (for instance, the page is not the well-behaved memory of address space zero, but rather is mapped to an I/O bus), then any profile packet currently being collected is aborted. The implementation of this rule, and some limited exceptions, are discussed in section V.H, infra. Further details of the XP protection mechanism, and a second protection mechanism, for protecting pages against writes by DMA devices, is described in section VII, infra.

II. Indicating the Instruction Set Architecture (ISA) for Program Text

Referring to FIGS. 1a, 1b, 1c and 1d, a program is divided into regions 176, and each region has a corresponding flag 180. Flag 180 asserts 178 an ISA under which instruction decode unit 134, 136, 140 is to decode instructions from the corresponding region. For instance, the address space is divided into pages 176 (the same pages used for virtual memory paging), and ISA bit 180 in a page table entry (PTE) asserts the ISA to be used for the instructions of the page. When instructions are fetched from a page 176 whose ISA bit 180, 182 is a Zero, the instructions are interpreted as Tapestry native instructions and fed 138 by ISA select 178 directly to pipeline 120. When instructions are fetched from a page 176 whose ISA bit 180, 182 is a One, the instructions are fed under control of ISA select 178 to Convert stage 134, 136 of the pipeline, which interprets instructions as Intel X86 instructions. The regions need not be contiguous, either in virtual memory or in physical memory—regions of X86 text can be intermingled with regions of native Tapestry text, on a page-by-page basis.

A program written for one ISA can call library routines coded in either ISA. For instance, a particular program may use both a database management system and multimedia features. The multimedia services might be provided by libraries in optimized Tapestry native code. The database manager may be an off-the-shelf database system for the X86. The calling program, whether compiled for the X86 or for Tapestry, can readily call both libraries, and the combination will seamlessly cooperate.

In one embodiment, ISA bit is instantiated in two places, a master copy 180 and a cached copy 182 for fast access. The master copy is a single bit 180 in each entry 174 in PFAT 172. There is one PFAT entry 174 corresponding to each physical page of the memory 118, and the value of the value of ISA bit 180 in a given PFAT entry 174 controls whether Tapestry processor 100 will interpret instructions fetched from the corresponding page under the native instruction set architecture or as X86 instructions. On an I-TLB miss, the PTE from the Intel-format page tables is loaded into the I-TLB, as cached copy 182. The physical page frame number from the page table entry is used to index into PFAT 172, to find the corresponding PFAT entry 174, and information from the PFAT entry 174 is used to supplement the Intel-format I-TLB entry. Thus, by the time the bit is to be queried during an instruction fetch 110, the ISA bit 180 bit is in its natural location for such a query, I-TLB 116. Similarly, if the processor uses a unified instruction and data TLB, the page table and PFAT information are loaded into the appropriate entry in the unified TLB.

In alternative embodiments, ISA bit 180 may be located in the address translation tables, whether forward-mapped or reverse-mapped. This embodiment may be more desirable in embodiments that are less constrained to implement a pre-existing fixed virtual memory architecture, where the designers of the computer have more control over the multiple architectures to be implemented. In another alternative, ISA bit 180, 182 may be copied as a datum in I-cache 112.

When execution flows from a page of one ISA 180, 182 to a page of another (e.g., when the source of a control flow transfer is in one ISA and the destination is in the other), Tapestry detects the change, and takes a exception, called a "transition exception." The exception vectors the processor to one of two exception handlers, a Tapestry-to-X86 handler (340 of FIG. 3i) or an X86-to-Tapestry handler (320 of FIG. 3h), where certain state housekeeping is performed. In particular, the exception handler changes the ISA bit 194 in the EPC (the copy of the PSW that snapshots the state of the interrupted X86 process), so that the RFE (return from exception instruction) at the end of the transition exception handler 320, 340 will load the altered EPC.ISA bit 194 into the PSW. The content of the PSW.ISA bit 194 is the state variable that controls the actual execution of the processor 100, so that the changed ISA selection 178 takes effect when execution resumes. The PFAT.ISA copy 180 and I-TLB.ISA copy 182 are mere triggers for the exceptions. The exception mechanism allows the instructions in the old ISA to drain from the pipeline, reducing the amount of control circuitry required to effect the change to the new ISA mode of execution.

Because the Tapestry and X86 architectures share a common data representation (both little endian, 32-bit addresses, IEEE-754 floating-point, structure member alignment rules, etc.), the process can resume execution in the new ISA with no change required to the data storage state of the machine.

In an alternative embodiment, the execution of the machine is controlled by the I-TLB.ISA copy of the bit ISA bit 194, and the PSW.ISA copy 190 is a history bit rather than a control bit. When execution flows onto a page whose ISA bit 180, 182 does not match the ISA 180, 182 of the previous page, at the choice of the implementer, the machine may either take a transition exception, or "change gears" without taking a transition exception.

There is a "page properties enable" bit in one of the processor control registers. On system power-on, this bit is Zero, disabling the page properties. In this state, the PSW.ISA bit is manipulated by software to turn converter 136 on and off, and transition and probe exceptions are disabled. As system initialization completes, the bit is set to One, and the PFAT and TLB copies of the ISA bit control system behavior as described above.

III. Saving Tapestry Processor Context in Association with an X86 Thread

A. Overview

Figure 3A:
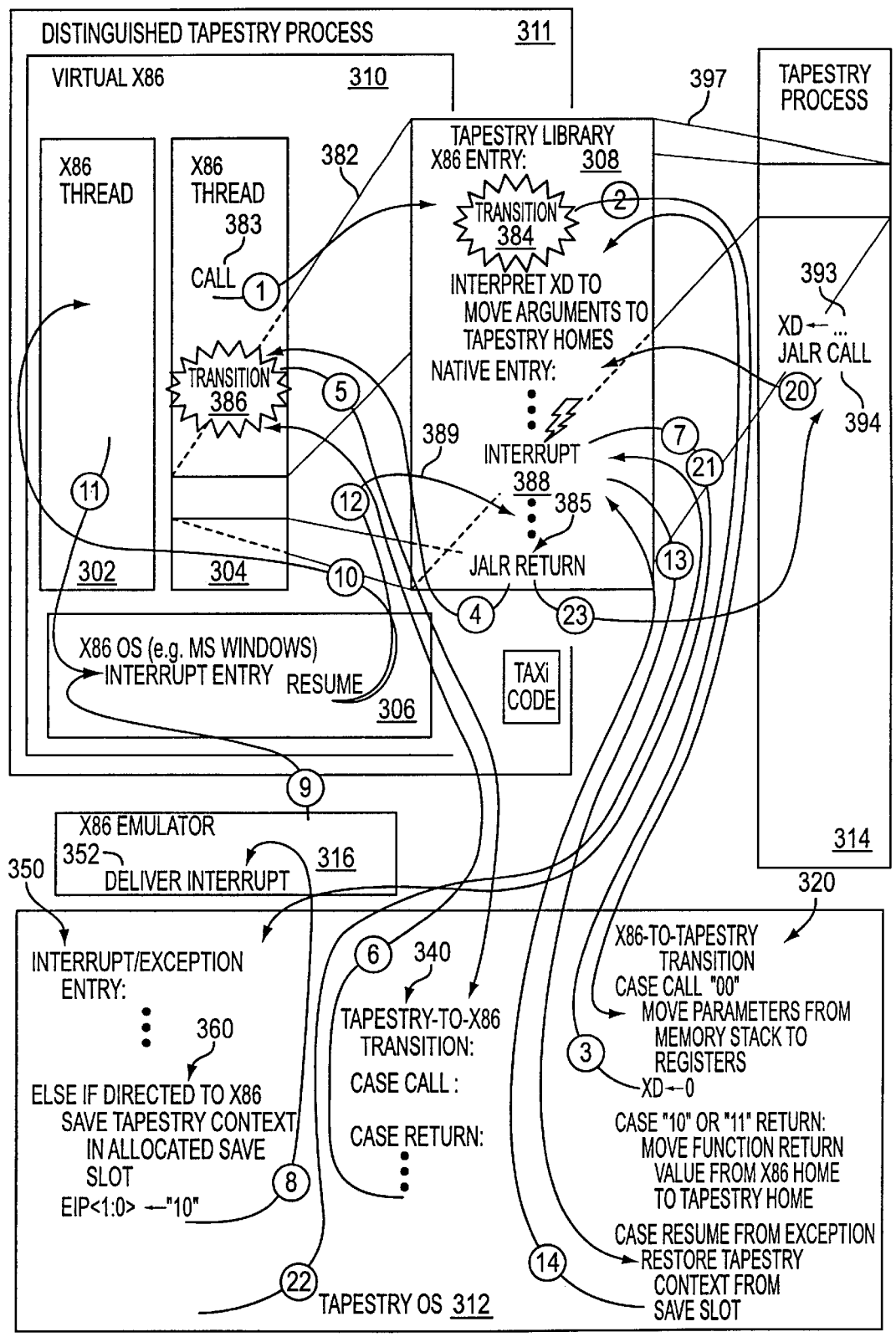
Figure 3B:
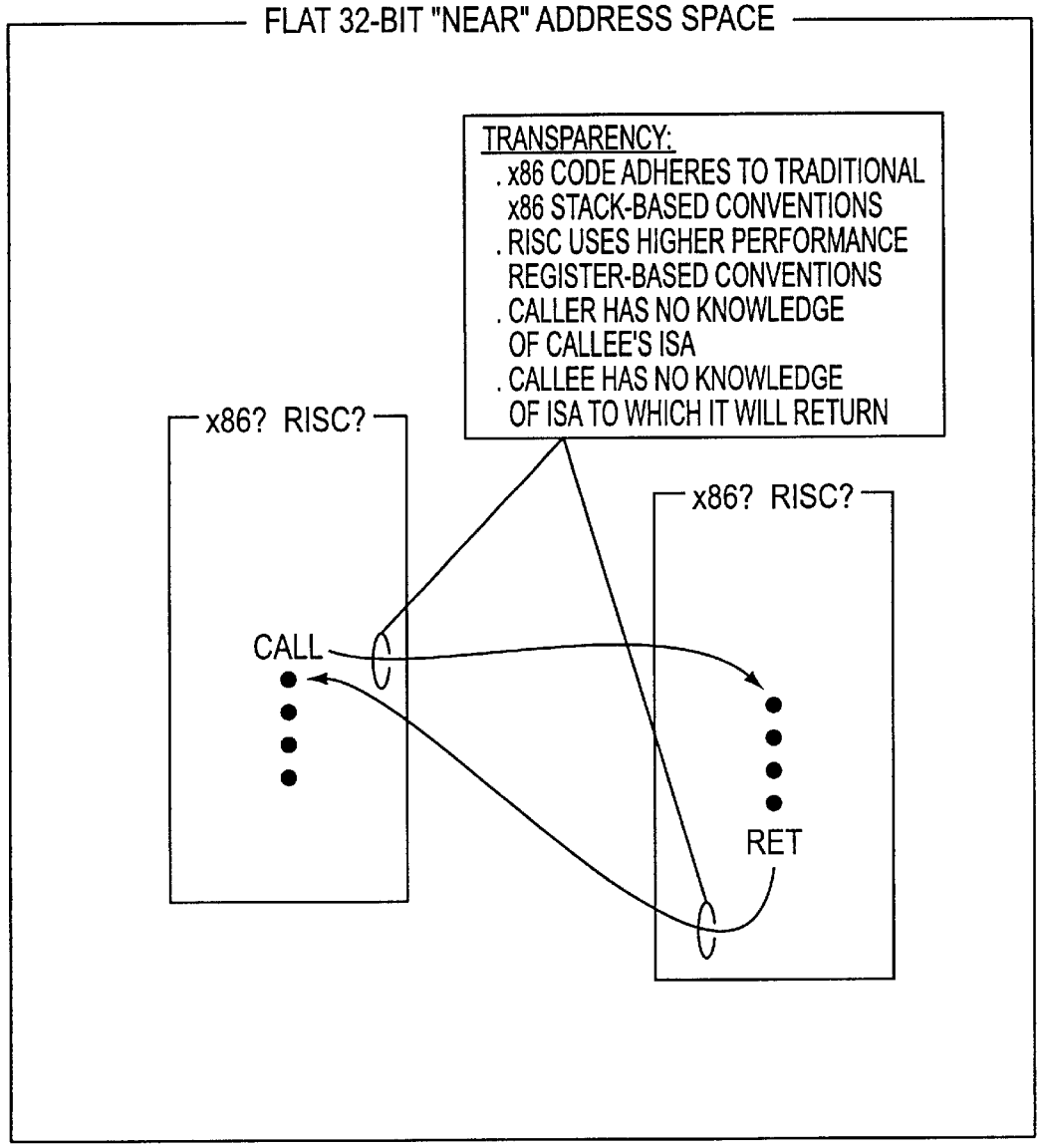
Figure 3C:
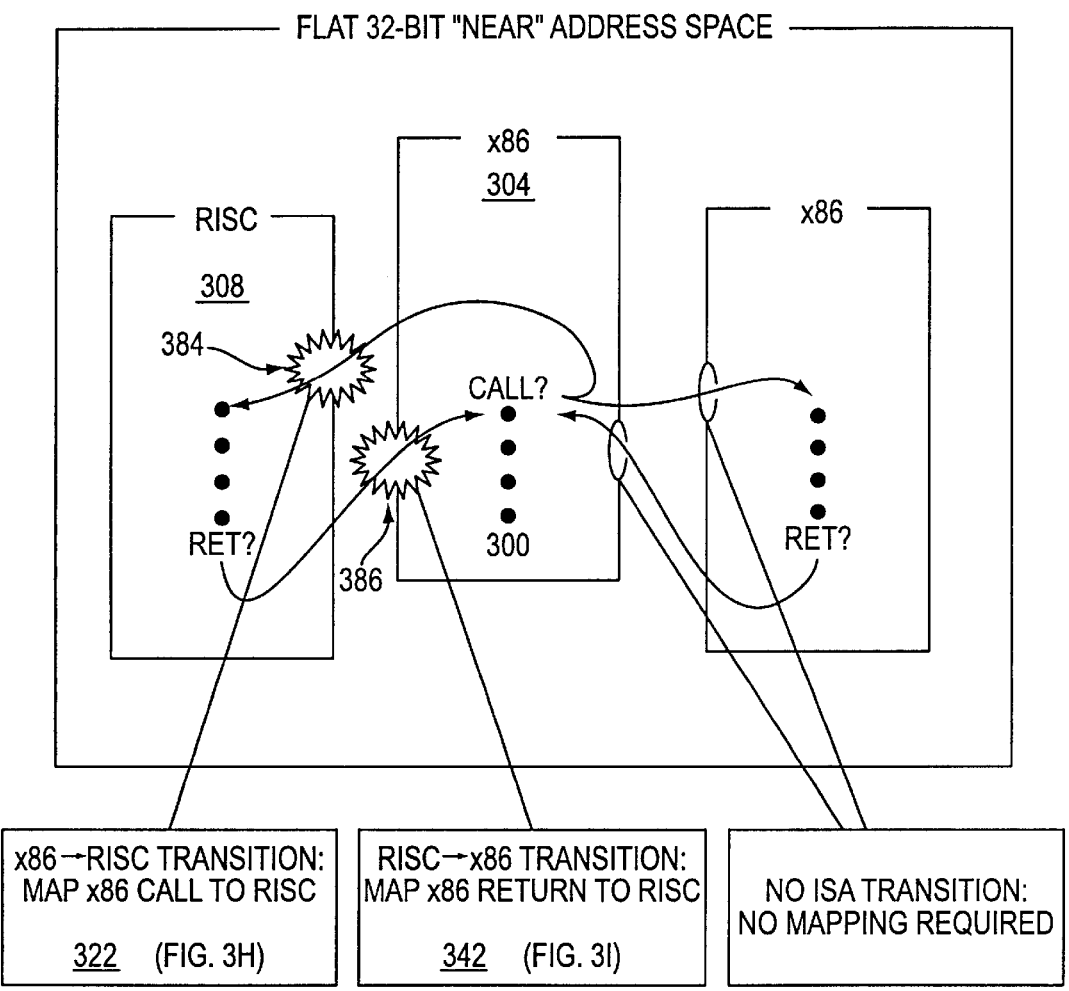
Figure 3D:
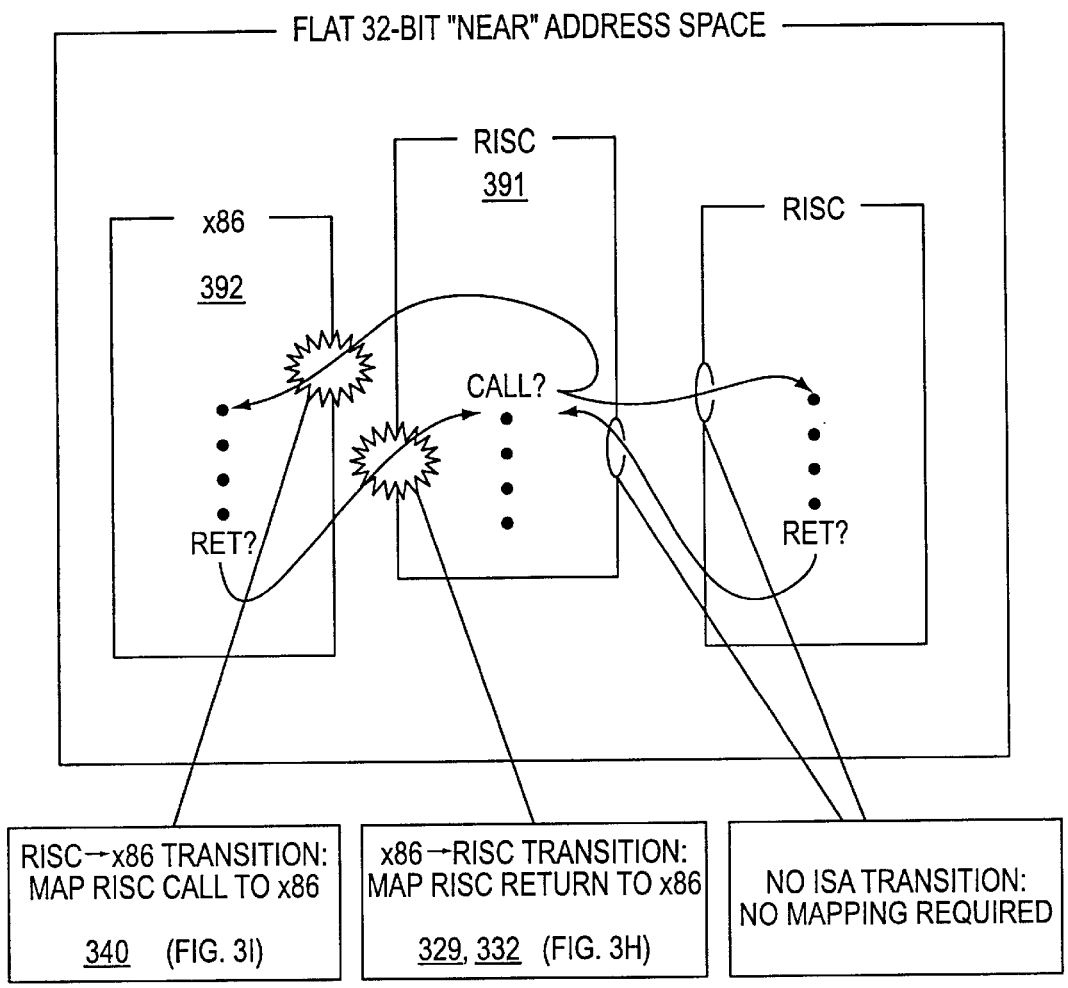
Figure 3E:
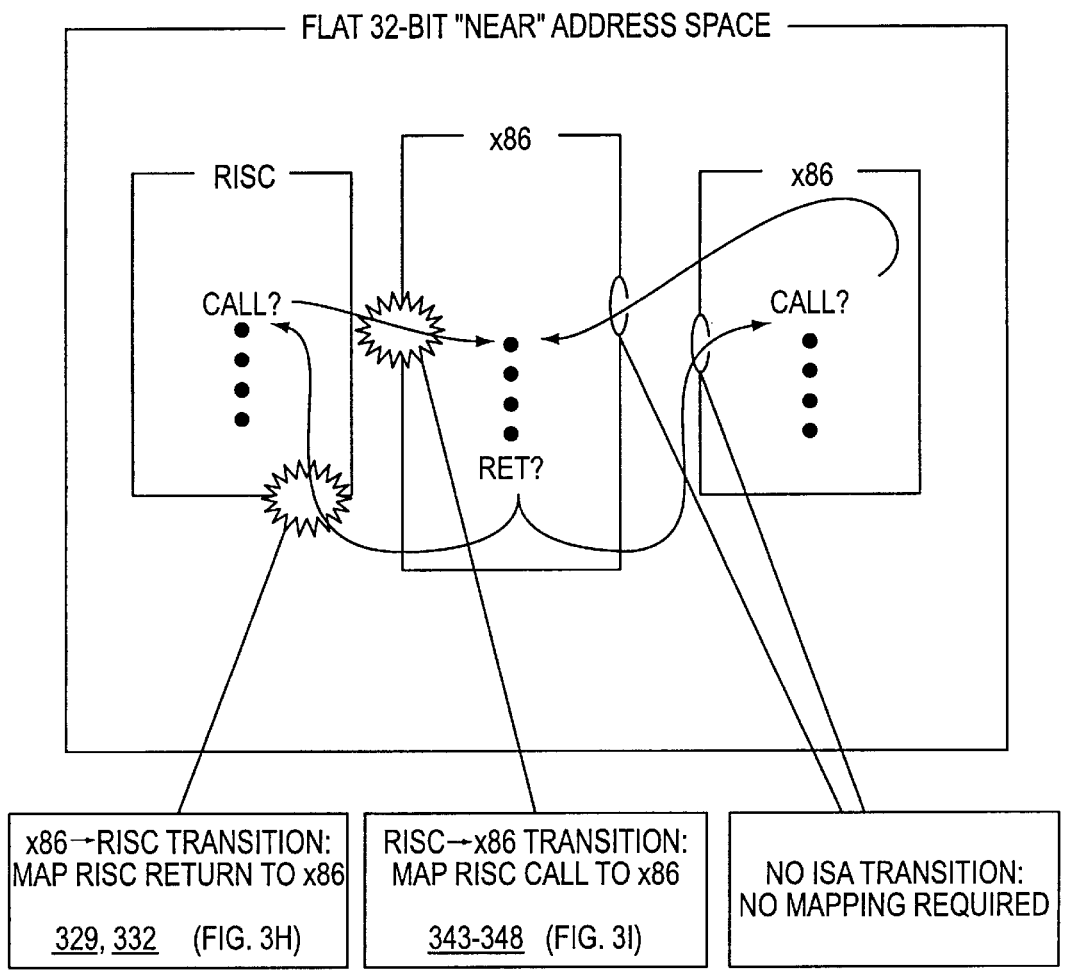
Figure 3F:
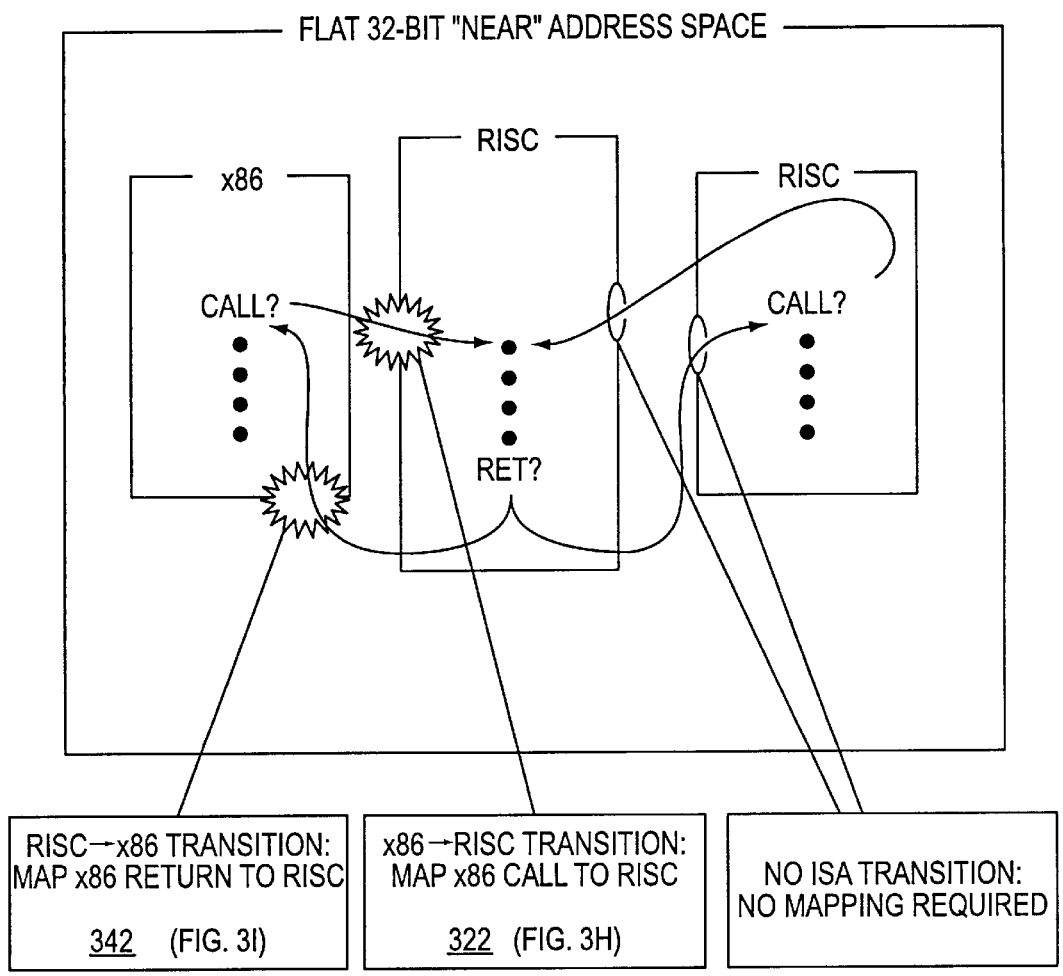

Referring to FIGS. 3a–3f, the ability to run programs in either of two instruction sets opens the possibility that a single program might be coded in both instruction sets. As shown in FIG. 3b, the Tapestry system provides transparent calls from caller to callee, without either knowing the ISA of the other, without either caller or callee being specially coded to work with the other. As shown in FIG. 3c, an X86 caller 304 might make a call to a callee subprogram, without being constrained to work with only callees coded in the X86 instruction set or the native Tapestry RISC instruction set 308. If the callee is coded in the X86 instruction set, the call will execute as a normal call. If the callee 308 is coded in the native Tapestry instruction set, then Tapestry processor 100 will take a transition exception 384 on entry to the callee 308, and another transition exception 386 on returning from the Tapestry callee 308 to the X86 caller 304. These transition exceptions 384, 386 and their handlers (320 of FIG. 3h and 340 of FIG. 3i) convert the machine state from the context established by the X86 caller to the context expected by the Tapestry callee 308.

Referring to FIGS. 3c–3f, analogous transition exceptions 384, 386 and handlers 320, 340 provide the connection between an X86 caller and its callees (FIG. 3c), a native Tapestry caller and its callees (FIG. 3d), between an X86 callee and its callers (FIG. 3e), and between a native Tapestry callee its callers (FIG. 3f), and provides independence between the ISA of each caller-callee pair.

Referring to FIGS. 3a and 31 and to Table 1, X86 threads (e.g., 302, 304) managed by X86 operating system 306, carry the normal X86 context, including the X86 registers, as represented in the low-order halves of r32–r55, the EFLAGS bits that affect execution of X86 instructions, the current segment registers, etc. In addition, if an X86 thread 302, 304 calls native Tapestry libraries 308, X86 thread 302, 304 may embody a good deal of extended context, the portion of the Tapestry processor context beyond the content of the X86 architecture. A thread's extended context may include the various Tapestry processor registers, general registers r1–r31 and r56–r63, and the high-order halves of r32–r55 (see Table 1), the current value of ISA bit 194, and in the embodiment of section IV, infra, the current value of XP/calling convention bit 196 and semantic context field 206.

The Tapestry system manages an entire virtual X86 310, with all of its processes and threads, e.g., 302, 304, as a single Tapestry process 311. Tapestry operating system 312 can use conventional techniques for saving and restoring processor context, including ISA bit 194 of PSW 190, on context switches between Tapestry processes 311, 314. However, for threads 302, 304 managed by an off-the-shelf X86 operating system 306 (such as Microsoft Windows or IBM OS/2) within virtual X86 process 311, the Tapestry system performs some additional housekeeping on entry and exit to virtual X86 310, in order to save and restore the extended context, and to maintain the association between extended context information and threads 302, 304 managed by X86 operating system 306. (Recall that Tapestry emulation manager 316 runs beneath X86 operating system 306, and is therefore unaware of entities managed by X86 operating system 306, such as processes and threads 302, 304.)

FIGS. 3a–3o describe the mechanism used to save and restore the full context of an X86 thread 304 (that is, a thread that is under management of X86 operating system 306, and thus invisible to Tapestry operating system 312) that is currently using Tapestry extended resources. In overview, this mechanism snapshots the full extended context into a memory location 355 that is architecturally invisible to virtual X86 310. A correspondence between the stored context memory location 355 and its X86 thread 304 is maintained by Tapestry operating system 312 and X86 emulator 316 in a manner that that does not require cooperation of X86 operating system 306, so that the extended context will be restored when X86 operating system 306 resumes X86 thread 304, even if X86 operating system 306 performs several context switches among X86 threads 302 before the interrupted X86 thread 304 resumes. The X86 emulator 316 or Tapestry operating system 312 briefly gains control at each transition from X86 to Tapestry or back, including entries to and returns from X86 operating system 306, to save the extended context and restore it at the appropriate time.

The description of the embodiment of FIGS. 3g–3k, focuses on crossings from one ISA to the other under defined circumstances (subprogram calls and returns and interrupts), rather than the fully general case of allowing transitions on any arbitrary transfer (conditional jumps and the like). Because there is always a Tapestry source or destination at any cross-ISA transfer, and the number of sites at which such a transfer can occur is relatively limited, the Tapestry side of each transition site can be annotated with information that indicates the steps to take to convert the machine state from that established in the source context to that expected in the destination context. In the alternative embodiment of section IV, the hardware supplements this software annotation, to allow the fully general ISA crossing.

The interaction between the native Tapestry and X86 environments is effected by the cooperation of an X86-to-Tapestry transition exception handler (320 of FIG. 3h), a Tapestry-to-X86 transition exception handler (340 of FIG. 3i), interrupt/exception handler (350 of FIG. 3j) of Tapestry operating system 312, and X86 emulator 316 (the software that emulates the portions of the X86 behavior that are not conveniently executed in converter hardware 136).

Because all native Tapestry instructions are naturally aligned to a 0 mod 4 boundary, the two low-order bits <1:0> of a Tapestry instruction address are always known to be Zero. Thus, emulator 316, and exception handlers 320, 340, 350 of Tapestry operating system 312, can pass information to each other in bits <1:0> of a Tapestry instruction address. To consider an example, the return address of a call from native Tapestry code, or the resume address for an interrupt of native code, will necessarily have two Zeros in its least significant bits. The component that gains control (either Tapestry-to-X86 transition handler 340 or Tapestry operating system 312) stores context information in these two low-order bits by setting them as shown in Table 2:

TABLE 2

00 default case, where X86 caller set no value of these bits - by elimination, this means the case of calling a native Tapestry subprogram
01 resuming an X86 thread suspended in a native Tapestry subprogram
10 returning from an X86 callee to a native Tapestry caller, result already in register(s)
11 returning from an X86 callee to a native Tapestry caller, where the function result is in memory as specified in the X86 calling convention, and is to be copied into registers as specified by the Tapestry calling convention.

Then, when control is to be returned to a Tapestry caller or to interrupted Tapestry native code, X86-to-Tapestry transition handler 320 uses these two bits to determine the context of the caller that is to be restored, and restores these two bits to Zero to return control to the correct address.

A second information store is the XD register (register R15 of Table 1). The Tapestry calling convention (see section III.B, infra) reserves this register to communicate state information, and to provide a description of a mapping from a machine state under the X86 calling convention to a semantically-equivalent machine context under the Tapestry convention, or vice-versa. The Tapestry cross-ISA calling convention specifies that a caller, when about to call a callee subprogram that may be coded in X86 instructions, sets the XD register to a value that describes the caller's argument list. Similarly, when a Tapestry callee is about to return to what may be an X86 caller, the calling convention requires the callee to set XD to a value that describes the return value returned by the function. From that description, software can determine how that return value should be converted for acceptance by the callee under the X86 calling convention. In each case, the XD value set by the Tapestry code is non-zero. Finally, X86-to-Tapestry transition handler 320 sets XD to zero to indicate to the Tapestry destination that the argument list is passed according to the X86 calling convention. As will be described further below, each Tapestry subprogram has a prolog that interprets the XD value coming in, to convert an X86 calling convention argument list into a Tapestry calling convention argument list (if the XD value is zero), and Tapestry-to-X86 exception handler 340 is programmed to interpret the XD value returned from a Tapestry function to convert the function return value into X86 form.

The Tapestry calling convention requires a callee to preserve the caller's stack depth. The X86 convention does not enforce such a requirement. X86-to-Tapestry transition handler 320 and Tapestry-to-X86 transition handler 340 cooperate to enforce this discipline on X86 callees. When Tapestry-to-X86 transition handler 340 detects a call to an X86 callee, transition handler 340 records (343 of FIG. 3*i*) the stack depth in register ESI (R54 of Table 1). ESI is half-preserved by the X86 calling convention and fully preserved by the native convention. On return, X86-to-Tapestry transition handler 320 copies ESI back to SP, thereby restoring the original stack depth. This has the desired side-effect of deallocating any 32 byte hidden temporary created (344 of FIG. 3*i*) on the stack by Tapestry-to-X86 transition handler 340.

B. Subprogram Prologs

A "calling convention" is simply an agreement among software components for how data are to be passed from one component to the next. If all data were stored according to the same conventions in both the native RISC architecture and the emulated CISC architecture, then a transition between two ISA environments would be relatively easy. But they do not. For instance, the X86 calling convention is largely defined by the X86 architecture. Subroutine arguments are passed on a memory stack. A special PUSH instruction pushes arguments onto the stack before a subprogram call, a CALL instruction transfers control and saves the return linkage location on the stack, and a special RET (return) instruction returns control to the caller and pops the callee's data from the stack. Inside the callee program, the arguments are referenced at known offsets off the stack pointer. On the other hand, the Tapestry calling convention, like most RISC calling conventions, is defined by agreement among software producers (compilers and assembly language programmers). For instance, all Tapestry software producers agree that the first subprogram argument will be passed in register 32, the second in register 33, the third in register 34, and so on.

Figure 3G:
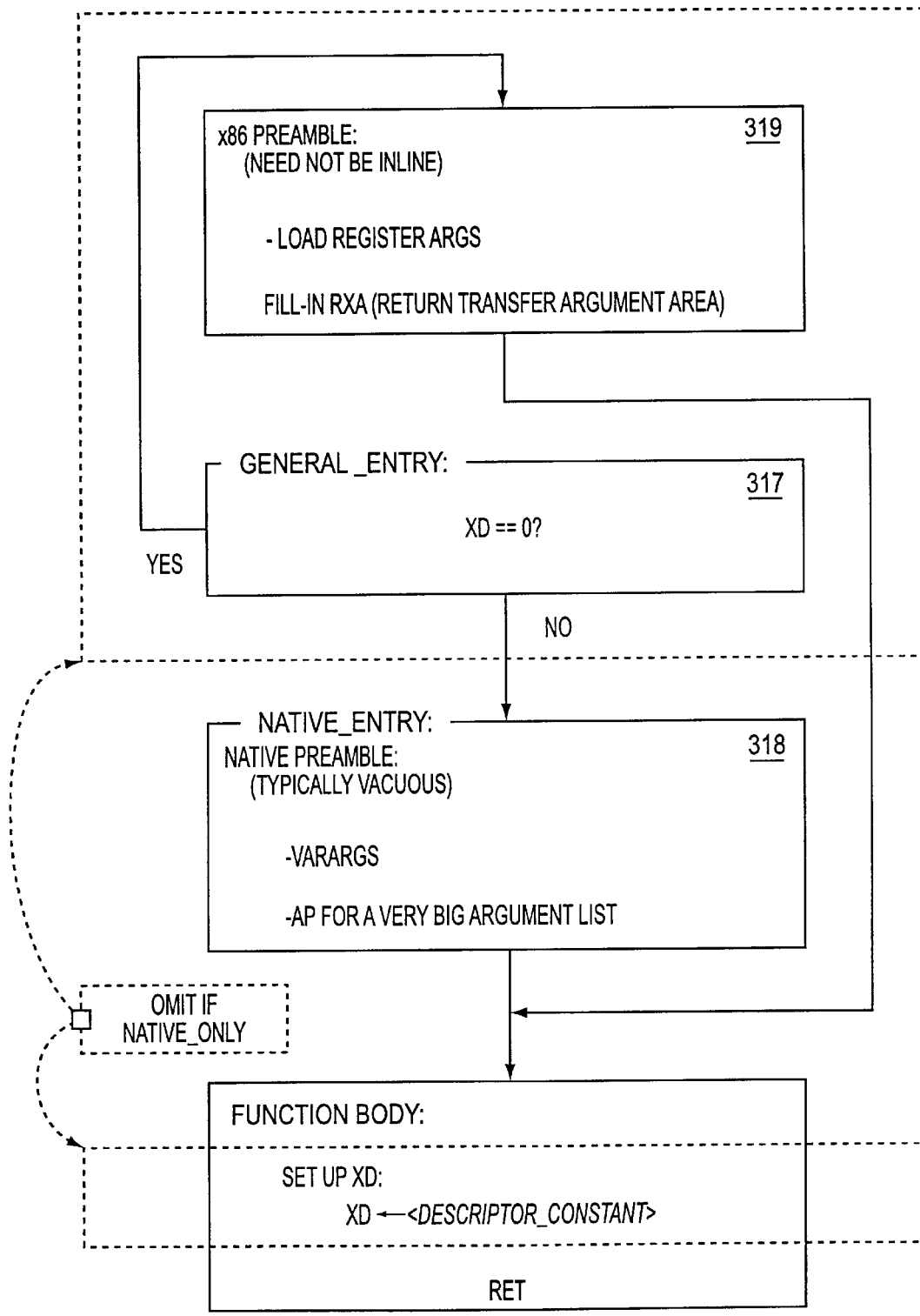
Figure 3L:
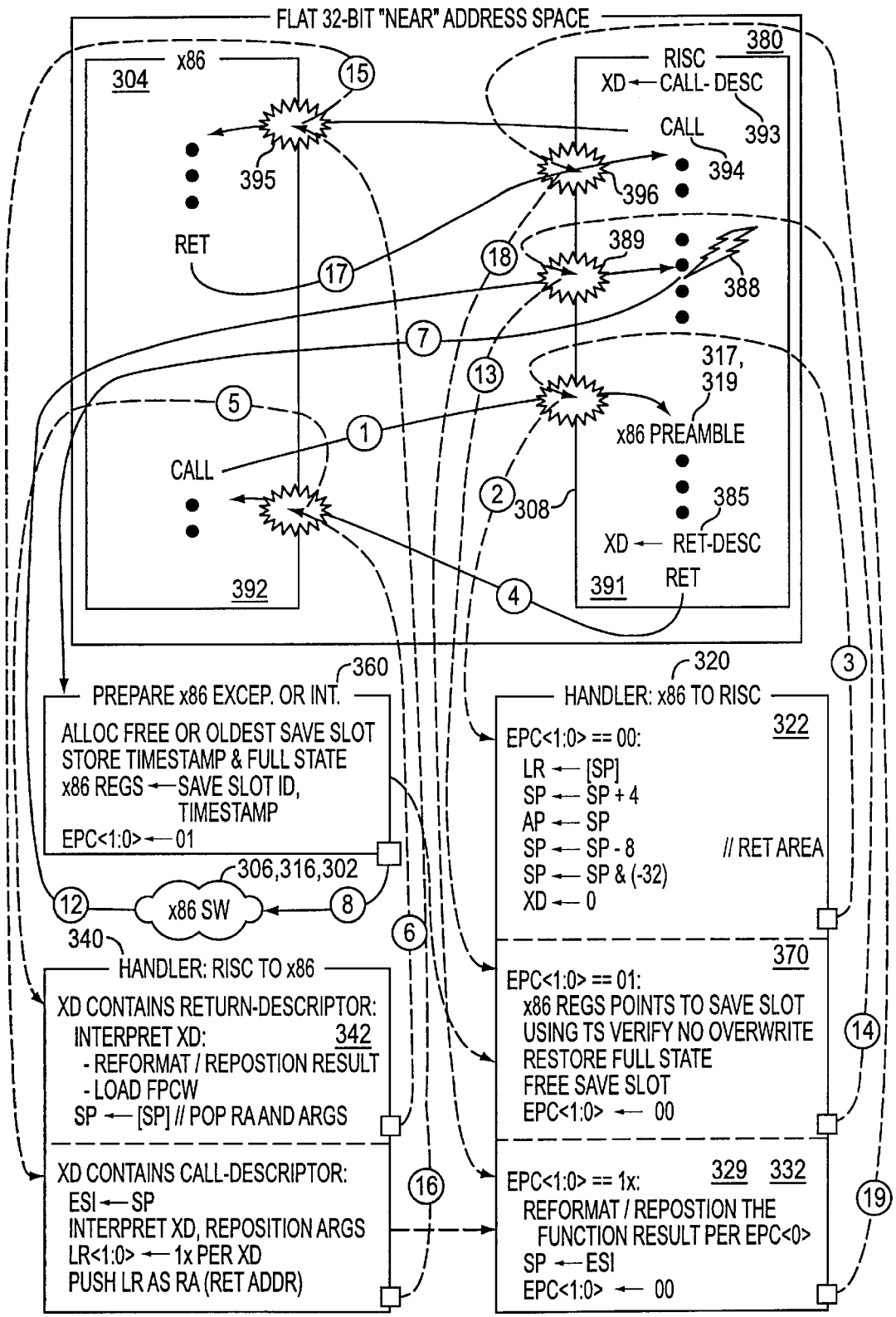

Referring to FIG. 3*g*, any subprogram compiled by the Tapestry compiler that can potentially be called from an X86 caller is provided with both a GENERAL entry point 317 and a specialized NATIVE entry point 318. GENERAL entry point 317 provides for the full generality of being called by either an X86 or a Tapestry caller, and interprets 319 the value in the XD register (R15 of Table 1) to ensure that its parameter list conforms to the Tapestry calling convention before control reaches the body of the subprogram. GENERAL entry point 317 also stores some information in a return transition argument area (RXA, 326 of FIG. 3*h*) of the stack that may be useful during return to an X86 caller, including the current value of the stack pointer, and the address of a hidden memory temp in which large function return values might be stored. NATIVE entry point 318 can only be used by Tapestry callers invoking the subprogram by a direct call (without going through a pointer, virtual function, or the like), and provides for a more-efficient linkage; the only complexities addressed by NATIVE entry point 318 are varargs argument lists, or argument lists that do not fit in the sixteen parameter registers P0-P15 (R32–R47 of Table 1). The value of GENERAL entry point 317 is returned by any operation that takes the address of the subprogram.

C. X86-to-Tapestry transition handler

Referring to FIG. 3*h*, X86-to-Tapestry transition handler 320 is entered under three conditions: (1) when code in the X86 ISA calls native Tapestry code, (2) when an X86 callee subprogram returns to a native Tapestry caller, and (3) when X86 operating system 306 resumes a thread 304 that was interrupted by an asynchronous external interrupt while executing native Tapestry code.

X86-to-Tapestry transition handler 320 dispatches 321 on the two-low order bits of the destination address, as obtained in EPC EIP to code to handle each of these conditions. Recall that these two bits were set to values reflected in Table 2, supra.

If those two low-order bits EPC<01:00> are "00," case 322, this indicates that this transition is a CALL from an X86 caller to a Tapestry callee (typically a Tapestry native replacement for a library routine that that caller expected to be coded in X86 binary code). Transition handler 320 pops 323 the return address from the memory stack into the linkage register LR (register R6 of Table 1). Pop 323 leaves SP (the stack pointer, register R52 of Table 1) pointing at the first argument of the X86 caller's argument list. This SP value is copied 324 into the AP register (the argument pointer, register R5 of Table 1). SP is decremented 326 by eight, to allocate space for a return transition argument area (the return transition argument area may be used by the GENERAL entry point (317 of FIG. 3*g*) of the callee), and then the SP is rounded down 327 to 32-byte alignment. Finally, XD is set 328 to Zero to inform the callee's GENERAL entry point 317 that this call is arriving with the machine configured according to the X86 calling convention.

If the two low-order bits of the return address EPC<01:00> are "10" or "11," cases 329 and 332, this indicates a return from an X86 callee to a Tapestry caller. These values were previously stored into EPC<01:00> by Tapestry-to-X86 transition handler 340 at the time the X86 callee was called, according to the nature of the function return result expected.

Low-order bits of "11," case 329, indicate that the X86 callee created a large function result (e.g., a 16-byte struct) in memory, as specified by the X86 calling convention. In this case, transition handler 320 loads 330 the function result into registers RV0–RV3 (registers R48–R51—see Table 1) as specified by the Tapestry calling convention. Low-order bits of "10," case 332, indicate that the function result is already in registers (either integer or FP).

In the register-return-value "10" case 332, X86-to-Tapestry transition handler 320 performs two register-based conversions to move the function return value from its X86 home to its Tapestry home. First, transition handler 320 converts the X86's representation of an integer result (least significant 32 bits in EAX, most significant 32 bits in EDX) into the native convention's representation, 64 bits in RV0 (R48 of Table 1). Second, transition handler 320 converts 334 the X86's 80-bit value at the top of the floating-point stack into the native convention's 64-bit representation in RVDP (the register in which double-precision floating-point results are returned, R31 of Table 1).

The conversion for 64-bit to 80-bit floating-point is one example of a change in bit representation (as opposed to a copy from one location to another of an identical bit pattern) that may be used to convert the process context from its source mode to a semantically-equivalent form in its destination mode. For instance, other conversions could involve changing strings from an ASCII representation to EBCDIC or vice-versa, changing floating-point from IBM base 16 format to Digital's proprietary floating-point format or an IEEE format or another floating-point format, from single precision to double, integers from big-endian to little-endian or vice-versa. The type of conversion required will vary depending on the characteristics of the native and non-native architectures implemented.

In the "01" case 370 of resuming an X86 thread suspended during a call out to a native Tapestry subprogram, transition handler 320 locates the relevant saved context, confirms that it has not been corrupted, and restores it (including the true native address in the interrupted native Tapestry subprogram). The operation of case 370 will be described in further detail in sections III.F and III.G, infra.

After the case-by-case processing 322, 329, 332, 370, the two low-order bits of return address in EPC<1:0> (the error PC) are reset 336 to "00" to avoid a native misaligned I-fetch fault. At the end of cases 329 and 332, Register ESI (R54 of Table 1) is copied 337 to SP, in order to return to the stack depth at the time of the original call. An RFE instruction 338 resumes the interrupted program, in this case, at the target of the ISA-crossing control transfer.

D. Tapestry-to-X86 transition handler

Referring to FIG. 3i, Tapestry-to-X86 handler 340 is entered under two conditions: (1) a native Tapestry caller calls an X86 callee, or (2) a native Tapestry callee returns to an X86 caller. In either case, the four low-order bits XD<3:0> (the transfer descriptor register, R15 of Table 1) were set by the Tapestry code to indicate 341 the steps to take to convert machine context from the Tapestry calling convention to the X86 convention.

If the four low-order bits XD<03:00> direct 341 a return from a Tapestry callee to an X86 caller, the selected logic 342 copies any function return value from its Tapestry home to the location specified by the X86 calling convention. For instance, XD may specify that a 64-bit scalar integer result returned in RV0 is to be returned as a scalar in EAX or in the EDX:EAX register pair, that a double-precision floating-point result is to be copied from RV0 to the top of the X86 floating-point stack as an 80-bit extended precision value, or that a large return value being returned in RV0–RV3 (R48–R51 of Table 1) is to be copied to the memory location specified by original X86 caller and saved in the RXA. The stack depth is restored using the stack cutback value previously saved in the RXA by the GENERAL entry point prolog 317.

If a Tapestry caller expects a result in registers but understands under the X86 calling convention that an X86 function with the same prototype would return the result via the RVA mechanism (returning a return value in a memory location pointed to by a hidden first argument in the argument list), the Tapestry caller sets XD<3:0> to request the following mechanism from handler 340. The caller's stack pointer is copied 343 to the ESI register (R54 of Table 1) to ensure that the stack depth can be restored on return. A naturally-aligned 32-byte temporary is allocated 344 on the stack and the address of that temporary is used as the RVA (R31 of Table 1) value. Bits LR<1:0> are set 345 to "11" to request that X86-to-Tapestry transition handler 320 load 32 bytes from the allocated buffer into RV0–RV3 (R48–R51 of Table 1) when the X86 callee returns to the Tapestry caller.

For calls that will not use the RVA mechanism (for instance, the callee will return a scalar integer or floating-point value, or no value at all), Tapestry-to-X86 transition handler 340 takes the following actions. The caller's stack pointer is copied 343 to the ESI register (R54 of Table 1) to ensure that the stack depth can be restored on return. Bits LR<1:0> are set 346 to "10" as a flag to X86-to-Tapestry transition handler 320, 332 on returning to the native caller. For calls, handler 340 interprets 347 the remainder of XD to copy the argument list from the registers of the Tapestry calling convention to the memory locations of the X86 convention. The return address (LR) is pushed onto the stack.

For returns from Tapestry callees to X86 callers, the X86 floating-point stack and control words are established.

Tapestry-to-X86 transition handler 340 concludes by establishing 348 other aspects of the X86 execution environment, for instance, setting up context for emulator 316 and profiler 400. An RFE instruction 349 returns control to the destination of the transfer in the X86 routine.

E. Handling ISA crossings on interrupts or exceptions in the Tapestry operating system Referring to FIG. 3j in association with FIGS. 3a and 31, most interrupts and exceptions pass through a single handler 350 in Tapestry operating system 312. At this point, a number of housekeeping functions are performed to coordinate Tapestry operating system 312, X86 operating system 306, processes and threads 302, 304, 311, 314 managed by the two operating systems 306,312, and the data configuration of those processes and threads that may need to be altered to pass from one calling convention to the other.

A number of interrupts and exceptions are skimmed off and handled by code not depicted in FIG. 3j. This includes all interrupts directed to something outside virtual X86 310, including all synchronous exceptions raised in other Tapestry processes, the interrupts that drive housekeeping functions of the Tapestry operating system 312 itself (e.g., a timer interrupt), and exceptions raised by a Tapestry native process 314 (a process under the management of Tapestry operating system 312). Process-directed interrupts handled outside FIG. 3j include asynchronous interrupts, the interrupts not necessarily raised by the currently-executing process (e.g., cross-processor synchronization interrupts). These interrupts are serviced in the conventional manner in Tapestry operating system 312: the full Tapestry context of the thread is saved, the interrupt is serviced, and Tapestry operating system 312 selects a thread to resume.

Thus, by the time execution reaches the code shown in FIG. 3j, the interrupt is guaranteed to be directed to something within virtual X86 310 (for instance, a disk completion interrupt that unblocks an X86 thread 302, 304, or a page fault, floating-point exception, or an INT software interrupt instruction, raised by an X86 thread 302, 304), and that this interrupt must be reflected from the Tapestry handlers to the virtual X86 310, probably for handling by X86 operating system 306.

Once X86 operating system 306 gains control, there is a possibility that X86 operating system 306 will context switch among the X86 processes 302, 304. There are two classes of cases to handle. The first class embraces cases 351, 353, and 354, as discussed further below. In this class of cases, the interrupted process has only X86 state that is relevant to save. Thus, the task of maintaining the association between context and thread can be handed to the X86 operating system 306: the context switch mechanism of that operating system 306 will perform in the conventional manner, and maintain the association between context and process. On the other hand, if the process has extended context that must be saved and associated with the current machine context (e.g., extended context in a Tapestry library called on behalf of a process managed by X86 OS), then a more complex management mechanism must be employed, as discussed below in connection with case 360.

If the interrupted thread was executing in converter 136, as indicated by ISA bit 194 of the EPC, then the exception is handled by case 351. Because the interrupted thread is executing X86 code entirely within the virtual X86, the tasks of saving thread context, servicing the interrupt, and selecting and resuming a thread can be left entirely to X86 operating system 306. Thus, Tapestry operating system 306 calls the "deliver interrupt" routine (352 of FIG. 3a) in X86 emulator 316 to reflect the interrupt to virtual X86 310. The X86 operating system 306 will receive the interrupt and service it in the conventional manner.

If an interrupt is directed to something within virtual X86 310, while TAXi code (a translated native version of a "hot spot" within an X86 program, see section I.D, supra, as indicated by the Taxi_Active bit 198 of the EPC) was running, then the interrupt is handled by case 353. Execution is rolled back to an X86 instruction boundary. At an X86 instruction boundary, all Tapestry extended context external to the X86 310 is dead, and a relatively simple correspondence between semantically-equivalent Tapestry and X86 machine states can be established. Tapestry execution may be abandoned—after the interrupt is delivered, execution may resume in converter 136. Then, if the interrupt was an asynchronous external interrupt, TAXi will deliver the appropriate X86 interrupt to the virtual X86 supplying the reconstructed X86 machine state, and the interrupt will be handled by X86 operating system 306 in the conventional manner. Else, the rollback was induced by a synchronous event, so TAXi will resume execution in converter 136, and the exception will be re-triggered, with EPC.ISA 194 indicating X86, and the exception will be handled by case 351.

If the interrupted thread was executing in X86 emulator 316, as indicated by the EM86 bit of the EPC, the interrupt is handled by case 354. This might occur, for instance, when a high-priority X86 interrupt interrupts X86 emulator 316 while emulating a complex instruction (e.g. far call through a gate) or servicing a low-priority interrupt. The interrupt is delivered to the emulator 316, which handles the interrupt. Emulator 316 is written using re-entrant coding to permit re-entrant self-interruption during long-running routines.

Case 360 covers the case where the interrupt or exception is directed to something within virtual X86 310, and the current thread 304, though an X86 thread managed by X86 operating system 306, is currently executing Tapestry code 308. For instance, an X86 program may be calling a native Tapestry library. Here, the interrupt or exception is to be serviced by X86 operating system 306, but the thread currently depends on Tapestry extended context. In such a case, X86 operating system 306 may perform a context switch of the X86 context, and the full Tapestry context will have to be restored when this thread is eventually resumed. However, X86 operating system 306 has no knowledge of (nor indeed has it addressability to) any Tapestry extended context in order to save it, let alone restore it. Thus, case 360 takes steps to associate the current Tapestry context with the X86 thread 304, so that the full context will be re-associated (by code 370 of FIG. 3h) with thread 304 when X86 operating system 306 resumes the thread's execution.

Referring briefly to FIG. 3k, during system initialization, the Tapestry system reserves a certain amount of nonpageable storage to use as "save slots" 355 for saving Tapestry extended context to handle case 360. The save slot reserved memory is inaccessible to virtual X86 310. Each save slot 355 has space 356 to hold a full Tapestry context snapshot. Each save slot 355 is assigned a number 357 for identification, and a timestamp 358 indicating the time at which the contents of the save slot were stored. Full/empty flag 359 indicates whether the save slot contents are currently valid or not. In an alternative embodiment, a timestamp 358 of zero indicates that the slot is unused.

Returning to FIG. 3j, case 360 is handled as follows. A save slot 355 is allocated 361 from among those currently free, and the slot is marked as in use 359. If no save slot is free, then the save slot with the oldest time stamp 358 is assumed to have been stranded, and is forcibly reclaimed for recycling. Recall that the save slots 355 are allocated from non-paged storage, so that no page fault can result in the following stores to the save slot. The entire Tapestry context, including the X86 context and the extended context, and the EIP (the exception instruction pointer, the address of the interrupted instruction) is saved 362 into the context space 356 of allocated save slot 355. The two low-order bits of the EIP (the address at which the X86 IP was interrupted) are overwritten 363 with the value "01," as a signal to X86-to-Tapestry transition handler 320, 370. The EIP is otherwise left intact, so that execution will resume at the interrupted point. (Recall that case 360 is only entered when the machine was executing native Tapestry code. Thus, the two low-order bits of the EIP will arrive at the beginning of handler 350 with the value "00," and no information is lost by overwriting them.) The current 64-bit timestamp is loaded 364 into the EBX:ECX register pair (the low order halves of registers R49 and R51, see Table 1) and redundantly into ESI:EDI (the low order halves of registers R54–R55) and the timestamp member (358 of FIG. 3k) of save slot 355. The 32-bit save slot number 357 of the allocated save slot 355 is loaded 365 into the X86 EAX register (the low order half of register R48) and redundantly in EDX (the low order half of register R50). Now that all of the Tapestry extended context is stored in the save slot 355, interrupt handler 350 of Tapestry operating system 312 now transfers control to the "deliver interrupt" entry point 352 of X86 emulator 316. X86 operating system 306 is invoked to handle the interrupt.

Interrupt delivery raises a pending interrupt for the virtual X86 310. The interrupt will be accepted by X86 emulator 316 when the X86 interrupt accept priority is sufficiently high. X86 emulator 316 completes delivery of the interrupt or exception to the X86 by emulating the X86 hardware response to an interrupt or exception: pushing an exception frame on the stack (including the interrupted X86 IP, with bits <1:0> as altered at step 363 stored in EPC), and vectoring control to the appropriate X86 interrupt handler.

Execution now enters the X86 ISR (interrupt service routine), typically in X86 operating system 306 kernel, at the ISR vectored by the exception. The X86 ISR may be an off-the-shelf routine, completely unmodified and conventional. A typical X86 ISR begins by saving the X86 context (the portion not already in the exception frame—typically the process' registers, the thread ID, and the like) on the stack. The ISR typically diagnoses the interrupting condition, services it, and dismisses the interrupt. The ISR has full access to the X86 context. X86 operating system 306 will not examine or rely on the contents of the X86 processor context; the context will be treated as a "black box" to be saved and resumed as a whole. As part of servicing the interrupt, the interrupted thread is either terminated, put to sleep, or chosen to be resumed. In any case, the ISR chooses a thread to resume, and restores the X86 context of that thread. The ISR typically returns control to the selected thread either via an X86 IRET instruction or an X86 JUMP. In either case, the address at which the thread is to be resumed is the address previously pushed in an X86 exception frame when the to-be-resumed thread was interrupted. The thread resumed by X86 operating system 306 may be either interrupted thread 304 or another X86 thread 302.

F. Resuming Tapestry execution from the X86 operating system

Referring again to FIG. 3h, X86 operating system 306 eventually resumes interrupted thread 304, after a case 360 interrupt, at the point of interruption. X86 operating system 306 assumes that the thread is coded in X86 instructions. The first instruction fetch will be from a Tapestry page (recall that execution enters case 360 only when interrupted thread 304 was executing Tapestry native code). This will cause an X86-to-Tapestry transition exception, which will vector to X86-to-Tapestry transition handler 320. Because the low-order two bits of the PC were set (step 363 of FIG. 3j).to "01," control dispatches 321 to case "01" 370.

In step 371, the save slot numbers in the X86 EAX and EDX registers are cross-checked (recall that the save slot number was stored in these registers by step 365 of FIG. 3j), and the timestamp stored 362 in EBX:ECX is cross-checked with the timestamp stored in ESI:EDI. If either of these cross-checks 371 fails, indicating that the contents of the registers was corrupted, an error recovery routine is invoked 372. This error routine may simply kill the corrupted thread, or it may bring the whole TAXi system down, at the implementer's option. If the time stamps pass validation, the timestamp from the EBX:ECX register pair is squirreled away 373 in a 64-bit exception handler temporary register that will not be overwritten during restoration of the full native context. The contents of register EAX is used as a save slot number to locate 374 the save slot 355 in which the Tapestry context is stored 362. The entire Tapestry native context is restored 375 from the located save slot 355, including restoration of the values of all X86 registers. Restore 375 also restores the two low-order bits EPC<1:0> to Zero. The save slot's timestamp 358 is cross-checked 376 against the timestamp squirreled away 373 in the temporary register. If a mismatch of the two timestamps indicates that the save slot was corrupted, then an error recovery routine is invoked 377. The save slot is now empty, and is marked 378 as free, either by clearing full/empty flag 359 or by setting its timestamp 358 to zero. Execution is resumed at the EPC.EIP value by RFE instruction 338, in the Tapestry code at the point following the interrupt.

Referring again to FIG. 3k, in an alternative embodiment, save slots 355 are maintained in a variation of a queue: hopefully-empty save slots to be filled are always allocated from the head 379a of the queue, full save slots to be emptied may be unlinked from the middle of the queue, and save slots may be entered into the queue at either the head 379a or tail 379b, as described below. A double-linked list of queue entries is maintained by links 379c. At step 361, a save slot is allocated from the head 379a of the allocation queue. After step 365, the filled save slot 355 is enqueued at tail 379b of the save slot queue. At step 377, the emptied save slot 355 is queued at the head 379a of the queue.

This alternative head-and-tail queuing protocol 361, 379a, 379b, 379c, 375 for save slots 355 has the following effects. The queue remains sorted into two partitions. The portion toward head 379a accumulates all save slots 355 known to be free. The portion toward the tail 379b holds all slots thought to be busy, in least-recently-used order. Over time, all stale slots (those thought to be busy but whose threads have disappeared) will accumulate at the boundary between the two partitions, because any time a slot with a timestamp older than that of a stale slot is resumed, the emptied slot is removed from the busy tail partition is moved to the free head partition. Normally, allocations will occur by intensively recycling the most recently freed slots at the head of the free partition while truly busy slots will cluster at the tail of the busy partition. When all known-free save slots 355 are exhausted and an apparently-busy save slot 355 is overwritten, the busy save slots 355 will be selected in least recently used to most recently busied.

In an alternative embodiment, a native Tapestry process would be allowed to call into an X86 library 308. Exceptions raised in the X86 code would be serviced by Tapestry operating system 312 filtered out in handler 350 of FIG. 3j before the decision point reaches the beginning of the code shown in FIG. 3j.

G. An example

Figure 3M:
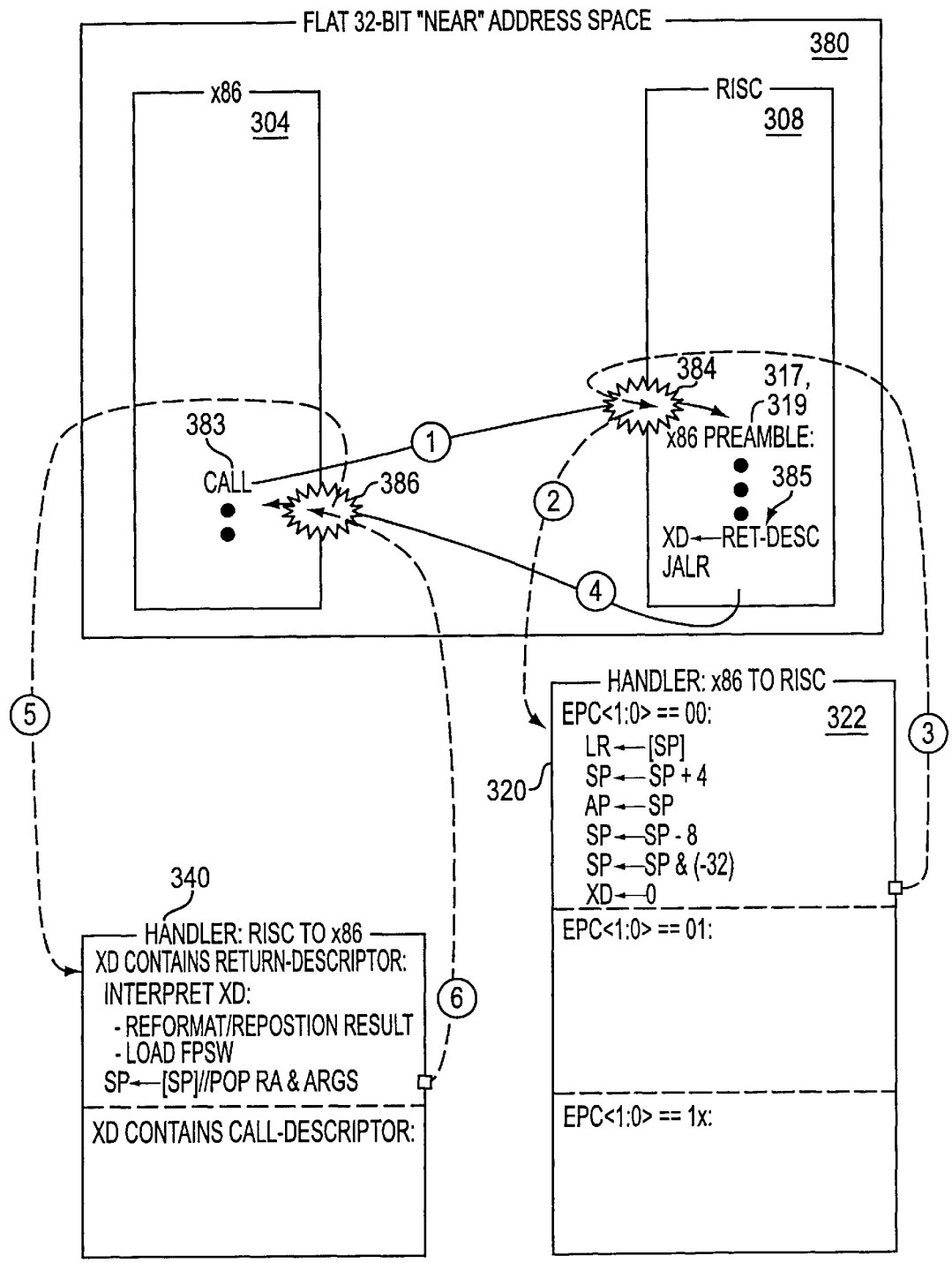

Referring to FIG. 3m in conjunction with FIGS. 3a, 3g, 3h, 3i, 3l and 3n, consider an example of a call by an X86 caller thread 304 to a Tapestry callee library 308, an interrupt 388 in the library that is serviced by X86 operating system 306, a context switch to another X86 thread 302 and a resumption of Tapestry callee 308, and a return to the X86 caller 304.

Tapestry library 308 is mapped 382 into a 32-bit flat address space 380. From the point of view of X86 caller thread 304, this is the process' address space. From the point of view of the Tapestry machine and operating system 312, the 32-bit address space is simply an address space that is mapped through page tables (170 of FIGS. 1a and 1d), and whose contents and meaning are left entirely to the management of X86 operating system 306.

Initially, thread 304 is executing on virtual X86 310. Thread 304 executes an X86 CALL instruction 383, seeking a library service. The binary code for thread 304 is conventional X86 code, not specially compiled for use in a Tapestry system. CALL instruction 383 transfers control (arrow ①) to the entry point of library 308. This is the GENERAL entry point (317 of FIG. 3g) for a Tapestry-binary replacement for the library. Fetching the first instruction from the entry preamble 317, 319 for Tapestry native library routine 308, induces a change from X86 ISA to Tapestry ISA. Processor 100 takes a transition exception 384, and vectors (arrow ②) to X86-to-Tapestry transition handler (320 of FIG. 3h). Because all Tapestry instructions are aligned to a 0 mod 4 boundary, the two low-order bits of the interrupt address are "00." Accordingly, transition handler 320 dispatches 321 to the "00" case 322 to establish the preconditions for execution in the Tapestry context (32-byte aligned stack, etc.). At the end of transition handler 320, execution resumes 338 (arrow ③) at GENERAL entry point 317. GENERAL entry point 317 begins by executing the X86 preamble (319 of FIG. 3g), which copies the parameter list into the P0–P15 parameter registers, and execution of the body of Tapestry library routine 308 begins.

Assume that Tapestry library routine 308 runs to completion without an interrupt or call back to X86 code.

When Tapestry library routine 308 completes 385, routine 308 loads a value describing the form of its return value into XD register (R15 of Table 1). This value will indicate a return value in RV0, RVFP, or a memory location, as appropriate. Routine 308 concludes with a Tapestry JALR instruction to return (arrow ④). As the first instruction is fetched from X86 caller thread 304, a transition 386 from Tapestry ISA to X86 ISA is recognized, and control vectors (arrow ⑤) to Tapestry-to-X86 transition handler (340 of FIG. 3i). Transition handler dispatches 341 on the value of XD<03:00> to one of the return cases 342, which copies the return value from its Tapestry home to its home under the X86 calling convention. When transition handler 340 completes, it returns control (RFE instruction 349 of FIG. 3i, arrow ⑥ of FIGS. 3a, 3l and 3m) to the instruction in thread 304 following the initial CALL 383.

Figure 3N:
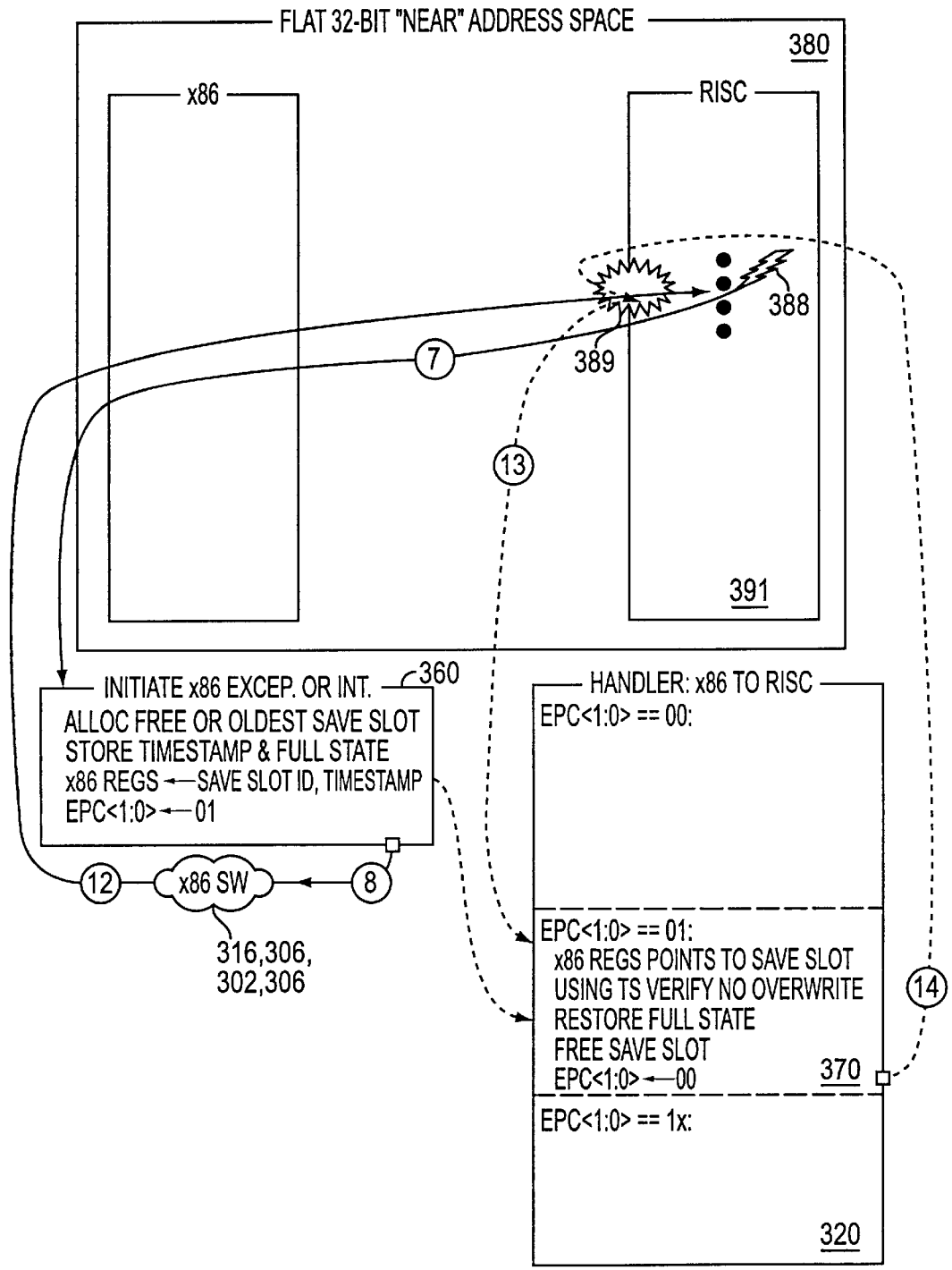
Figure 30:
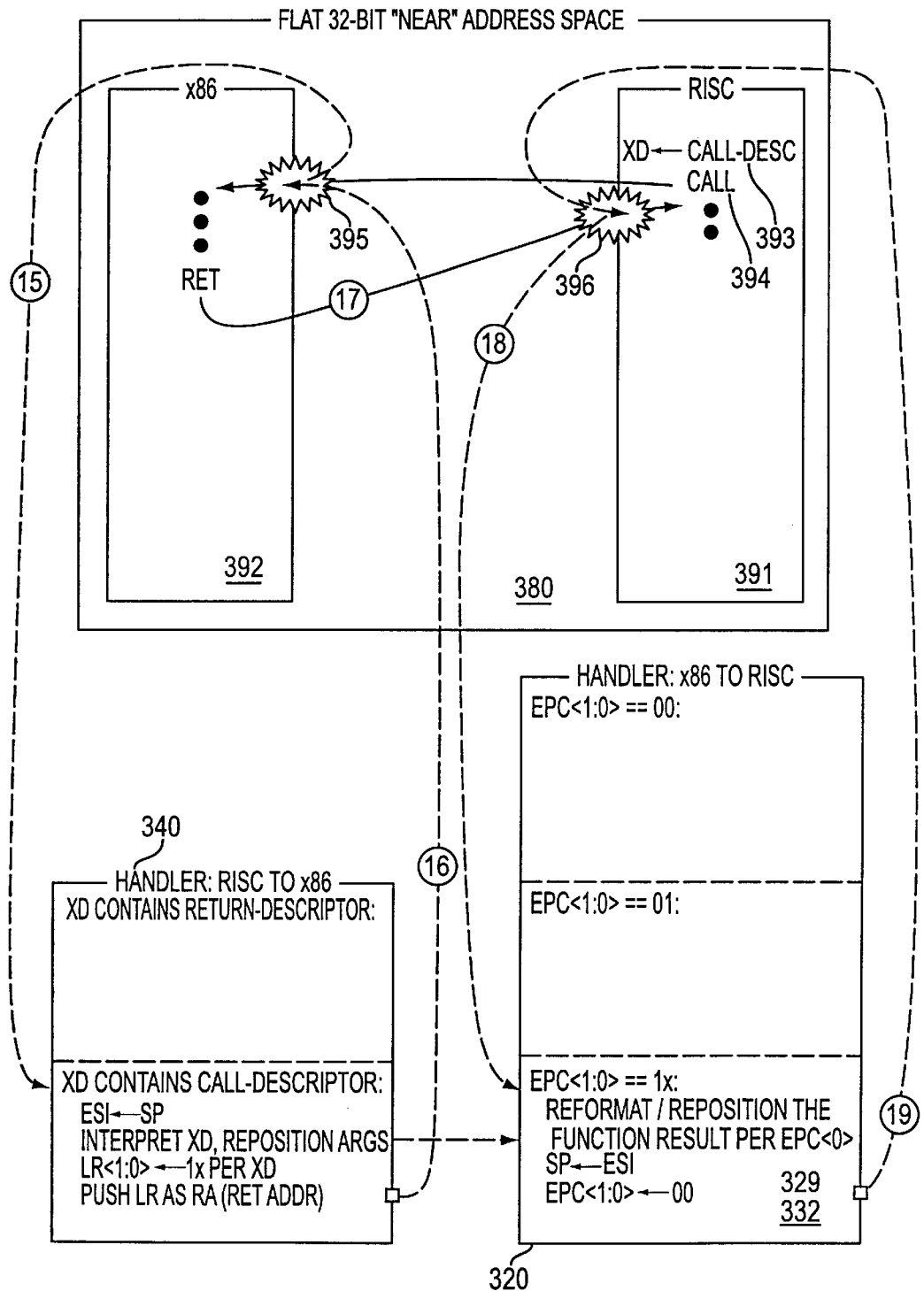

Referring now to FIG. 3n in conjunction with FIGS. 3a, 3h, 3j and 3l, assume that an external asynchronous interrupt 388 occurred midway through the execution of Tapestry library routine 308. To establish the example, assume that the interrupt is a disk-completion interrupt that unblocks a second, higher-priority X86 thread 302. The interrupt vectors (arrow ⑦) to the interrupt/exception handler (350 of FIG. 3*j*) of Tapestry operating system 312. After disqualifying cases 351, 353, 354, interrupt handler 350 selects case 360. The full processor context is saved 362 in a save slot 355, the two low-order bits EIP<01:00> are overwritten 363 with "01," as described in Table 2, and the save slot number and timestamp information are loaded 364, 365 into the X86 registers. The interrupt handler 360 delivers the interrupt (369 of FIG. 3*j*) to the interrupt entry point 352 of X86 emulator 316 (arrow ⑧). X86 emulator 316 passes control to X86 operating system 306 (arrow ⑨). X86 operating system 306 services the interrupt in the conventional manner. However, the context that X86 operating system 306 saves for thread 304 is the collection of timestamp and save slot number information with the EIP intact except for its two low-order bits, cobbled up by step 363 of Tapestry exception handler 360 to conform to Table 2. As assumed earlier in this paragraph, X86 operating system 306 selects thread 302 to be resumed (arrow ⑩).

After X86 thread 302 has executed for a time, it eventually cedes control (arrow ⑪) back to X86 operating system 306, for instance because its time slice expires, it issues a new disk request, or the like. Assume that the X86 operating system's scheduler now selects thread 304 to be resumed. The context restored by X86 operating system 306 is the timestamp and save slot number "context" cobbled up by exception handler 360. The EIP of this restored context points to the instruction following the interrupted 388 instruction, with "01" in the two low-order bits. X86 operating system 306 executes an IRET instruction to resume execution at this restored context (arrow ⑫). This instruction fetch will recognize the transition 389 from the X86 ISA of X86 operating system 306 to the Tapestry ISA of Tapestry library 308, and will vector (arrow ⑬) to X86-to-Tapestry transition handler 320 (FIG. 3*h*). Transition handler 320 dispatches 321 on the two low-order bits of the EIP address to case 370. The code of case 370 looks in the X86 registers to find the address of the save slot 355 corresponding to the process to be resumed. The content of the X86 registers and found save slot 355 are validated 371, 374, 376 by comparing the redundantly-stored timestamps and save slot numbers against each other. The content of save slot 355 restores 375 the full Tapestry processor context. Transition handler 320 resumes 378 execution of the Tapestry library routine 308 (arrows ⑭) at the point of the original external interrupt 388.

Referring to FIG. 3*o* in conjunction with FIGS. 3*a*, 3*h*, 3*j* and 3*l*, consider the case of a call from a Tapestry native caller 391 to an X86 callee 392. (Recall from the discussion of FIG. 3*b* that neither is specially coded to be tailored to this scenario—the X86 callee was generated by a conventional X86 compiler, and the Tapestry caller 391 is coded to work equally well whether the callee is an X86 callee 392 or a Tapestry callee.) Caller 391 sets 393 the value of the XD register (R15 of Table 1) to a value that describes the layout in the Tapestry registers (R32–R47 of Table 1) of its argument list. Then caller 391 issues a JALR instruction 394 to call to callee 392. On arrival at the first instruction of callee 392, processor 100 recognizes a Tapestry-to-X86 transition 395. Execution vectors (arrow ⑮) to Tapestry-to-X86 exception handler (340 of FIG. 3*i*). The four low-order bits XD<3:0> were set by instruction 393 to contain a basic classification of the XD descriptor, and execution is dispatched 341 according to those four bits, typically to code segment 343–345 or to segment 343, 346, 347. The dispatched-to code segment moves 347 the actual parameters from their Tapestry homes to their X86 homes, as directed by the remainder of the XD register. Handler 340 overwrites 345, 346 the two low-order bits of the return PC, LR<1:0> with either "10" or "11" to indicate the location in which caller 391 expects the return result, as described in Table 2. Handler 340 returns (arrow ⑯) to the first instruction of X86 callee 392, which executes in the conventional manner. When callee 392 completes, an X86 RET instruction returns control to caller 391 (arrow ⑰). The first instruction fetch from caller 391 will trigger a transition exception 396. The exception vectors (arrow ⑱) control to X86-to-Tapestry handler 320. Based on the two low-order bits of LR, handler 320 reformats and/or repositions 330, 333, 334 the function return value. The handler completes 336, 338, and returns control (arrow ⑲) to the instruction in caller 391 following the original call 394.

Referring again to FIGS. 3*a* and 3*l*, the complexity is confined to cases of cross-ISA calls. Complexity in handling cross-ISA calls is acceptable because transparent cross-ISA calling is not previously known in the art. In a case where caller, callee, and operating system all share a common ISA, no transition exceptions occur. For instance, when a Tapestry process 314 calls (arrow ⑳) the same Tapestry library routine 308, routine 308 enters through NATIVE entry point 318, or takes the Tapestry short path through GENERAL entry point 317. (Note that routine 308 will have to be separately mapped 397 into the address space of Tapestry process 314—recall that Tapestry process 314 is under the management of Tapestry OS 312, while the address space 380 of an X86 process is entirely managed by X86 operating system 306, entirely outside the ken of Tapestry operating system 312.) If the same external interrupt 388 occurs (arrow ㉑), the interrupt can be handled in Tapestry operating system 312 (outside the code of FIG. 3*j*), and control will directly resume (arrow ㉒) at the instruction following the interrupt, without tracing through the succession of handlers. When Tapestry library routine 308 completes, control will return to the caller (arrow ㉓) in the conventional manner. The only overhead is a single instruction 393, setting the value of XD in case the callee is in X86 code.

H. Alternative embodiments

In an alternative embodiment, a "restore target page" of memory is reserved in the operating system region of the X86 address space. In PFAT 172, ISA bit 180 for the restore target page is set to indicate that the instructions on the page are to be interpreted under the Tapestry instruction set. This restore target page is made nonpageable. At step 363 of FIG. 3*j*, the EPC.EIP value is replaced with an X86 address pointing into the restore target page, typically with byte offset bits of this replacement EPC.EIP storing the number of the save slot. In an alternative embodiment, the EPC.EIP is set to point to the restore target page, and the save slot number is stored in one of the X86 registers, for instance EAX. In either case, when X86 operating system 306 resumes the thread, the first instruction fetch will trigger an X86-to-Tapestry transition exception, before the first actual instruction from the restore target page is actually executed, because the restore target page has the Tapestry ISA bit set in its PFAT and I-TLB entries. X86-to-Tapestry transition handler 320 begins by testing the address of the fetched instruction. An address on the restore target page signals that there is extended context to restore. The save slot number is extracted from the instruction address (recall that the save slot number was coded into the EPC or EAX on exception entry, both of which will have been restored by X86 operating system 306 in the process of resuming the thread). The processor context is restored from the save slot, including the EPC.EIP value at which the thread was originally interrupted. In an alternative embodiment, only the extended context (not including the X86 context) is restored from the save slot, so that any alterations to the X86 context effected by Tapestry operating system 312 are left intact. X86-to-Tapestry transition handler 320 executes an RFE 338 to resume execution in the interrupted Tapestry code.

Note that no instruction from the restore target page is actually executed; the address is simply a flag to X86-to-Tapestry transition handler 320. All that is required is that the address of the restore target page be representable in the X86 address space, so that the address can pass through X86 operating system 306 and its thread scheduler. In alternative embodiments, a fetch from the restore target page could raise another exception—an unaligned instruction fault, or an access protection fault. It is desirable, however, that the fault raised be one not defined in the X86 architecture, so that no user program can register a handler for the fault.

In this alternative embodiment, the "01" case 370 of X86-to-Tapestry transition handler 320 may also save the X86 thread's privilege mode, and reset the privilege level to user, even if the X86 caller was running in privilege ring zero. The privilege mode is changed to protect system integrity, to disallow a Tapestry Trojan horse from subverting X86 security checks.

In an alternative embodiment, the correspondence between save slots and X86 threads is maintained by using thread-ID calls into X86 operating system 306. Each save slot 355 may be associated with a Windows thread number for the duration of that thread. A garbage collector may be used to recognize save slots that were filled a long time ago and are now apparently abandoned. The garbage collector reclaims save slots after a system-tunable time period, or on a least-recently-filled basis, on the assumption that the thread was terminated by X86 operating system 306.

In another alternative embodiment, when Tapestry takes an exception while in X86 converter mode, the extended context is snapshotted as well. If the operating system uses the X86 TSS (Task-State Segment) to implement multi-tasking, then the PSW portion of the extended context (ISA 194, XP/calling convention 196, and semantic class 206, see section IV, infra) can be snapshotted into unused parts of the X86 TSS. Otherwise the amount of data involved, five bits (ISA bit 194, calling convention/XP bit 196, and semantic context 206), is small enough that it can be squirreled away within the ten unused bits at the top of EFLAGS. In some embodiments, it may be possible to push the extended context as an additional word pushed onto the exception stack in X86 space.

In another alternative embodiment, the extended context can be stored in memory in Tapestry space, where it is inaccessible to the X86. A hash table (or an equivalent associative software structure) links a particular X86 exception frame to its associated snapshot of the extended Tapestry context, so that on exception exit or task rescheduling, when the processor reloads a particular X86 context into the EPC (error PC and program status word), in turn to be reloaded into the PSW by an RFE instruction (or when an X86 POPF instruction is emulated), the extended Tapestry context can be located and placed in the EPC as well.

IV. An Alternative Method for Managing Transitions from One ISA to the Other

A. Indicating the calling convention (CC) for program text

Sections IV.A and IV.B together describe an alternative mechanism used to determine the conventions under which data are passed to or from a subprogram, and thus the locations in which subprogram arguments or a function return value are stored before a control-transfer event, so that an exception handler can move the data to the locations expected by the code to be executed after the control-flow event.

In the alternative Tapestry emulation of the X86 CISC architecture, any particular extent of native code observes one of two different calling conventions (see section III.B, supra): one RISC register-based calling convention for calls from native Tapestry code to native Tapestry code, and another quasi-CISC memory-based convention that parallels the emulated CISC calling convention, for use when it is believed likely that the call will most frequently cross from one ISA to the other. The features described in sections IV.A and IV.B provide sufficient information about the machine context so that a transition from one ISA to the other can be seamlessly effected.

Referring again to FIG. 3a, programs coded in the native Tapestry instruction set, when calling a subprogram, may use either a register-based RISC calling convention, or a memory-based calling convention that parallels the X86 convention. In X86 converter mode, all subprogram calls use the memory-stack-based calling convention. In either mode, control may be transferred by an internal jump in which the data passes from source to destination simply by its location in certain memory or register locations.

Program text regions 176 are annotated with a bit 200 that indicates the calling convention used by the code in the region. When execution flows from a source observing one calling convention to a destination observing another, the difference in calling convention bits 200 will trigger a transition exception. The transition exception handler copies the subprogram arguments from the well-known location established by the source convention to the well-known location expected by the destination. This allows caller and callee subprograms to be compiled with no reliance on the calling convention used by the other, and allows for more seamless system operation in an environment of binaries and libraries of inhomogeneous ISA.

Referring to FIGS. 1d and 2a, calling convention bit 200 is stored in PFAT entries 174 and I-TLB 116 in a manner analogous to ISA bit 180, 182 with a record of the calling convention of the previous instruction available in PSW 190 calling convention bit 96, as discussed in section II, supra; the alternative embodiments discussed there are equally applicable here. (Because the calling convention property 200 is only meaningful for pages of Tapestry code, and the XP write-protect property 184, 186 (discussed in section I.F, supra) is only used for pages of X86 code, the two properties for a given page can encoded in a single physical bit, overlaying the XP write-protect bits 184, 186—this single bit has different meanings depending on the PSW.ISA bit 194.)

Referring to FIGS. 2b and 2c, when execution crosses (column 204) from a region of one calling convention 200 to a region of another calling convention 200, the machine takes an exception. Based on the direction of the transition (Tapestry-to-X86 or X86-to-Tapestry) and a classification (as shown in Table 3 and discussed in IV.B, infra) of the instruction that provoked the transition, the exception is vectored to an exception handler that corresponds to the direction and classification. The eight calling-convention transition exception vectors are shown in the eight rows 242–256 of FIG. 2c. (The eight exception vectors for calling convention transitions are distinct from the two exception vectors for ISA transitions discussed in section II, supra.) The exception vectoring is specific enough that arrival at a specific handler largely determines a mapping from the old machine context to a machine context that will satisfy the preconditions for execution in the new environment. The exception handler implements this mapping by copying data from one location to another. The exception handler operates during an exception interposed between the source instruction and the destination instruction, transforming the machine context from that produced by the last instruction of the source (for instance, the argument passing area established before a CALL) to the context expected by the first instruction of the destination (the expectations of the code that will begin to use the arguments).

Further information used to process the transition exception, and the handling of particular exception cases, is described in section IV.B, infra.

B. Recording Transfer of Control Semantics and Reconciling Calling Conventions

Merely knowing the direction of a transition (from X86 calling convention to Tapestry convention or vice versa) is insufficient to determine the actions that must be taken on a transition exception when the data storage conventions disagree. This section describes a further technique used to interpret the machine context, so that the appropriate action can be taken on a transition exception. In overview, as each control-transfer instruction is executed, the intent or semantic class of the instruction is recorded in the SC (semantic class) field 206 (PSW.SC) of PSW (the Program Status Word) 190. On a transition exception, this information is used to vector to an exception handler programmed to copy data from one location to another in order to effect the transition from the old state to the new precondition.

TABLE 3

| ISA of source | semantic class value | meaning | representative instructions |
|---|---|---|---|
| Tap | 00 | call | JAL, JALR |
| Tap | 01 | jump | conditional jump, J, JALR |
| Tap | 10 | return with no FP result | JALR |
| Tap | 11 | return with FP result | JALR |
| X86 | 00 | call | CALL |
| X86 | 01 | jump | JMP, Jcc |
| X86 | 10 | return with no FP result | RET |
| X86 | 11 | return with (possible) FP result | RET |

Figure 1E:
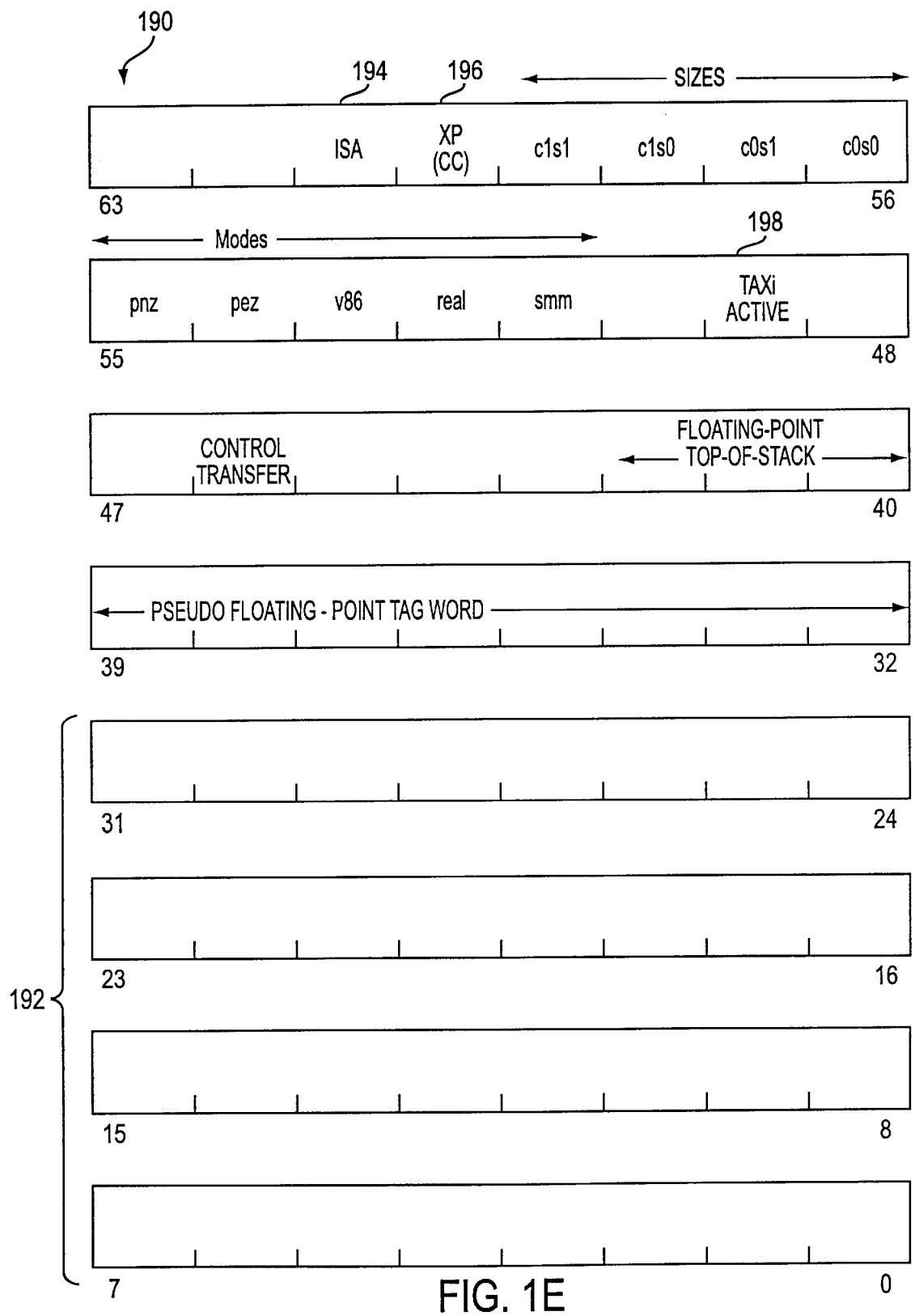
FIG. 1e is a diagram of a PSW (program status word) of a system as shown in FIGS. 1a–1d.

Referring to FIGS. 1e and 2c and to Table 3, the control-flow instructions of both the Tapestry ISA and the X86 ISA are classified into five semantic classes: JUMP, CALL, RETURN-NO-FP (return from a subprogram that does not return a double-precision floating-point result), RETURN-FP (return from a subprogram that definitely returns a double-precision floating-point result, used only in the context of returning from a Tapestry native callee), and RETURN-MAYBE-FP (return from a subprogram that may return or definitely returns either a 64-bit double-precision or 80-bit extended precision floating-point result, used only in the context of returning from an X86 callee). Because there are four possible transfers for each ISA mode, two bits 206 (combined with PSW.ISA bit 194) are sufficient to identify the five states enumerated.

Most of this semantic classification is static, by instruction opcode. Some instructions, e.g., the X86 Jump and CALL instructions, are semantically unambiguous. For instance, an X86 RET cannot be mistaken for a CALL or an internal control flow JUMP. Thus, even though the Tapestry system never examines the source code for the X86 binary, the X86 instruction contains sufficient information in its opcode to determine the semantic class of the instruction.

Referring to Table 3, some of the semantic classification is encoded into instructions by the compiler. For instance, the Tapestry JALR instruction (jump indirect to the location specified by the instruction's source register, and store the link IP (instruction pointer) in the destination register), may serve any of several roles, for instance as a return from subprogram (the link IP is stored into the read-zero register), a FORTRAN assigned go-to within a single routine, or a subprogram call. To resolve the ambiguity of a JALR instruction, bits that are unused in the execution of the instruction are filled in by the compiler with one of the semantic class codes, and that code is copied as an immediate from the instruction to PSW.SC 206 when the instruction is executed. In the case of Tapestry native binaries compiled from source code, this immediate field of the JALR instruction is filled in with the aid of semantic information gleaned either from the source code of the program being compiled. In the case of a binary translated from X86 to Tapestry, the semantic class of the X86 instruction is used to determine the semantic class of the corresponding Tapestry instruction. Thus, the Tapestry compiler analyzes the program to distinguish a JALR for a branch to a varying address (for instance a FORTRAN assigned or computed go-to, or a CASE branch through a jump table) from a JALR for a function return (further distinguishing the floating-point from no-floating-point case) from a JALR for a subprogram call, and explicitly fills in the two-bit semantic class code in the JALR instruction.

Some of the semantic classification is performed by execution time analysis of the machine context. X86 RET (return from subprogram) instructions are classified into two semantic context classes, RETURN-NO-FP (return from subprogram, definitely not returning a floating-point function result) and RETURN-MAYBE-FP (return, possibly or definitely returning a floating-point function result). The X86 calling convention specifies that a floating-point function result is returned at the top of the floating-point stack, and integer function results are returned in register EAX. The instruction opcode is the same in either case; converter 136 classifies RET instructions on-the-fly based on the X86 floating-point top-of-stack. If the top-of-stack points to a floating-point register marked empty, then the X86 calling convention unambiguously assures that the RET cannot be returning a floating-point value, and the semantic class is set to RETURN-NO-FP. If the top-of-stack register points to a full location, there may nonetheless be an integer return value; the semantic context is set to RETURN-MAYBE-FP to indicate this ambiguity.

On an exception, PSW 190 (including ISA bit 194, calling convention/XP bit 196, and SC field 206) is snapshotted into the exception PSW, a control register of the machine. The PSW bits in the exception PSW are available for examination and modification by the exception handler. When the exception handler completes, the RFE (return from exception) instruction restores the snapshotted exception PSW into the machine PSW 190, and machine execution resumes. Thus, PSW.SC 206 is preserved across exceptions, even though it is updated during execution of the exception handler (unless the exception handler deliberately modifies it by modifying the exception PSW).

FIGS. 2b and 2c show how calling convention transitions are vectored to the exception handlers. On a calling convention transition exception, five data are used to vector to the appropriate handler and determine the action to be taken by the handler: the old ISA 180, 182, the new ISA 180, 182, the old calling convention 196, the new calling convention 196, and PSW.SC 206. In FIG. 2b, the first column 204 shows the nature of the transition based on the first four, the transition of the ISA and CC bits. For instance, the third line 216 discusses a transition from native Tapestry ISA using native Tapestry register-based calling conventions (represented as the value "00" of the ISA and CC bits) to X86 code, which necessarily uses the X86 calling convention (represented as the value "1x," "1" for the X86 ISA, and "x" for "don't care" value of the CC bit). Table 3 shows that several different situations may vector to the same exception handler. Note, for instance, that lines 214 and 216 vector to the same group of four handlers, and lines 218 and 224 vector to the same group of handlers. These correspondences arise because the memory manipulation required to convert from native Tapestry calling convention to X86 calling convention, or vice versa, is largely the same, whether the X86 convention is observed by native Tapestry instructions or X86 instructions.

FIG. 2c shows how the machine vectors to the proper exception handler based on semantic class. For instance, lines 242, 244, 246, and 248 break out the four possible handlers for the 00=>01 and 00=>1x (native Tapestry code using native calling conventions, to X86 code using X86 conventions) ISA and CC transitions, based on the four possible semantic classes of control-flow instruction. Lines 250, 252, 254, and 256 break out the four possible handlers for the 01=>00 and 1x=>00 transitions, based on the four semantic classes of instruction that can cause this transition.

Referring to FIG. 2b, when crossing from one subprogram to another, if the source and destination agree on the convention used for passing arguments, either because they agree on ISA and calling convention (rows 212, 220, 228, 230), or agree on calling convention even though disagreeing on ISA (rows 222, 226), or because the data pass simply by virtue of being stored in the same storage location in the source and destination execution environments (rows 244, 252), then no intervention is required. For instance, when crossing from the X86 ISA using the X86 calling convention to the Tapestry native ISA using the X86 convention, or vice-versa, data passes from one environment to the other, without actually moving from one hardware element to another, using the fixed mapping between X86 virtual resources and Tapestry physical resources using the fixed mapping shown in Table 1 and discussed in section I.B, supra.

For instance, as shown in row 222, if a caller in Tapestry native code, using the memory based quasi-X86 calling convention, calls a routine in X86 code (or vice-versa, row 226), no arguments need be moved; only the instruction decode mode need be changed.

On the other hand, if the calling conventions 200 disagree, and the arguments are being passed under one calling convention and received under another, the calling-convention exception handler intervenes to move the argument data from the well-known locations used by the source convention to the well-known locations expected by the destination convention. For instance, a subprogram CALL from an X86 caller to a callee in native Tapestry code that uses the native Tapestry calling convention (rows 224, 250), or equivalently, from Tapestry code using X86 conventions to native Tapestry using the native convention (rows 218, 250), must have its arguments moved from the locations specified by the memory stack-based caller convention to the locations specified by the register-based callee convention.

Rows 214, 242 of FIGS. 2b and 2c show the case of a subprogram call where the caller is in Tapestry native code using the register-based native calling convention, and the callee is in Tapestry native code but uses the quasi-X86 calling convention. (Similarly, as shown in rows 216, if the caller is in Tapestry native code using the register-based native calling convention, and the callee is coded in the X86 ISA, then the same exception handler 242 is invoked, and it does the same work.) The exception handler will push the subprogram arguments from their register positions in which arguments are passed under the native convention, into their memory stack positions as expected under the X86 calling convention. If the arguments are of varying size, the X86 stack layout of the argument buffer may be rather complex, and the mapping from the arguments in Tapestry registers to that argument buffer will be correspondingly complex. The argument copying is specified by a descriptor, an argument generated by the compiler for annotation of the caller site. This is particularly important for "varargs" routines. Because the native caller was generated by the Tapestry compiler, the compiler is able to produce a descriptor that fully describes the data copying to be performed by the transition exception. The descriptor is analogous to the argument descriptors generated by compilers for use by debuggers. The data will then be in the locations expected by the callee, and execution can resume in the destination ISA mode.

When an X86 caller (or a Tapestry caller using the quasi-X86 calling convention), the data of the argument block established by the caller are copied into the locations expected by the Tapestry callee. For instance, the linkage return address is copied from the top of stack to r6 (the Tapestry linkage register, given the alias name of LR for this purpose). The next few bytes of the stack are copied into Tapestry registers, for quick access. A call descriptor (a datum that describes the format of the call arguments) is manufactured in register r51 (alias CD), set to indicate that the arguments are passed under the X86 convention. A null return value descriptor is manufactured on the stack; the return descriptor will be modified to specify the format of the return value, once that information is known.

When returning from a callee function, the calling convention 200 of the caller and callee and the semantic class 206 of the return instruction determine the actions needed to put the function return value in the correct location expected by the callee. As shown in Table 1, the X86 calling convention returns double-precision floating-point function return values in the floating-point register indicated by the top-of-floating-point-stack. The X86 calling convention returns other scalars of 32 bits or less in register EAX, results of 33 to 64 bits in the EAX:EDX register pair, and function return values of 65 bits or greater are returned in a memory location pointed to by an argument prepended to the caller's argument list. The native Tapestry calling convention returns double-precision floating-point values in r31 (for this purpose, given the alias name of RVDP), other return values of 256 bits or less in registers r48, r49, r50, and r51 (given the alias names of RV0, RV1, RV2, and RV3), and larger return values in a memory location pointed to by r31 (for this purpose, given the alias name of RVA).

The Tapestry calling convention, and the mapping between Tapestry and X86 resources, are co-designed, at least in part, to maximize common uses, thereby to reduce the amount of data copying required on a calling convention transition. Thus, the two registers used to return scalar function return values—r48 (RV0) in Tapestry, EAX in X86—are mapped to each other.

When returning from a native-convention callee to an X86 or a Tapestry-using-X86-convention caller, the semantic class of the return is unambiguously known (because whether the function returns a floating-point value or not was encoded in the semantic class bits of the JALR instruction by the compiler), and the semantic class distinguishes the two actions to take in the two cases that may arise, as discussed in the next two paragraphs.

When a native-convention function returns a double-precision (64-bit) floating-point value to an X86-convention caller (the RETURN-FP case of row 248), the function return value is inflated from an IEEE-754 64-bit representation in r31 (RVDP, the register in which Tapestry returns double-precision function results) to an 80-bit extended precision representation in the register pair to which the X86 FP top-of-stack currently points (usually r32–r33, the Tapestry register pair mapped to F0 of the X86). The top-of-floating-point stack register is marked full, and all other floating-point registers are marked empty. (Tapestry has a floating-point status register that subsumes the function of the X86 FPCW (floating-point control word), FPSW (floating-point status word), and FPTW (floating-point tag word), and the registers are marked full or empty in the tag bits of this status register.)

On a return from a non-floating-point Tapestry native callee function to an X86-convention caller (the RETURN-NO-FP case of row 248) to an X86-convention caller, the function return value is left alone in r48, because this single register is both the register in which the Tapestry function computed its result, and the register to which the X86 register EAX (the function-result return register) is mapped. The entire floating-point stack is marked empty.

If the native callee is returning a value larger than 64 bits to an X86-convention caller, a return descriptor stored on the stack indicates where the return value is stored (typically in registers r48 (RV0), r49 (RV1), r50 (RV2), and r51 (RV3), or in a memory location pointed to by r31 (RVA)); the return value is copied to the location specified under the X86 convention (typically a memory location whose address is stored in the argument block on the stack).

When returning from an X86 callee to a Tapestry-using-X86-convention caller, no action is required, because the register mapping of Table 1 implements the convention transformation.

When returning from an X86 callee to a native Tapestry caller, two cases are distinguished by the two semantic classes RETURN-MAYBE-FP and RETURN-NO-FP. For the RETURN-NO-FP case of rows 224 and 254, no action is required, because the return value was computed into X86 register EAX, which is mapped to r48, the Tapestry scalar return value register. For the RETURN-MAYBE-FP case, the exception handler conservatively ensures that any scalar result is left in r48, and also ensures that the value from the top of the floating-point stack is deflated from an 80-bit extended-precision representation to a 64-bit double-precision representation in r31 (RVDP).

When executing translated native code, Tapestry will not execute a JALR subprogram return unless the destination is also in native code. Because the semantic class codes on the present implementation only ambiguously resolve whether an X86 instruction does or does not return a floating-point result (RETURN-FP vs. RETURN-MAYBE-FP), and the native semantic class codes are unambiguous (RETURN-FP vs. RETURN-NO-FP), binary translator 124 does not translate a final X86 RET unless its destination is also translated.

An alternative embodiment may provide a third calling convention value, a "transition" value. The machine will not take an exception when crossing to or from a transition page—the transition calling convention "matches" both the X86 calling convention and the Tapestry calling convention. Typically, pages of transition calling convention will have a Tapestry ISA value. These transition pages hold "glue" code that explicitly performs the transition work. For instance, an X86 caller that wants to call a Tapestry callee might first call a glue routine on a transition calling convention page. The glue routine copies arguments from their X86 calling convention homes to their Tapestry homes, and may perform other housekeeping. The glue routine then calls the Tapestry callee. The Tapestry callee returns to the glue routine, where the glue routine performs the return value copying and performs other housekeeping, and returns to its caller, the X86 caller.

One of ordinary skill will understand the argument copying that implements each of the cases of transition exception shown in FIGS. 2b and 2c.

In an embodiment alternative to any of the broad designs laid out in sections II, III, or IV, the computer may provide three or more instruction set architectures, and/or three or more calling conventions. Each architecture or convention is assigned a code number, represented in two or more bits. Whenever the architecture crosses from a region or page with one code to a region or page with another, an appropriate adjustment is made to the hardware control, or an appropriate exception handler is invoked, to adjust the data content of the computer, and/or to explicitly control the hardware execution mode.

V. Profiling to Determine Hot Spots for Translation

A. Overview of profiling

Figure 4A:
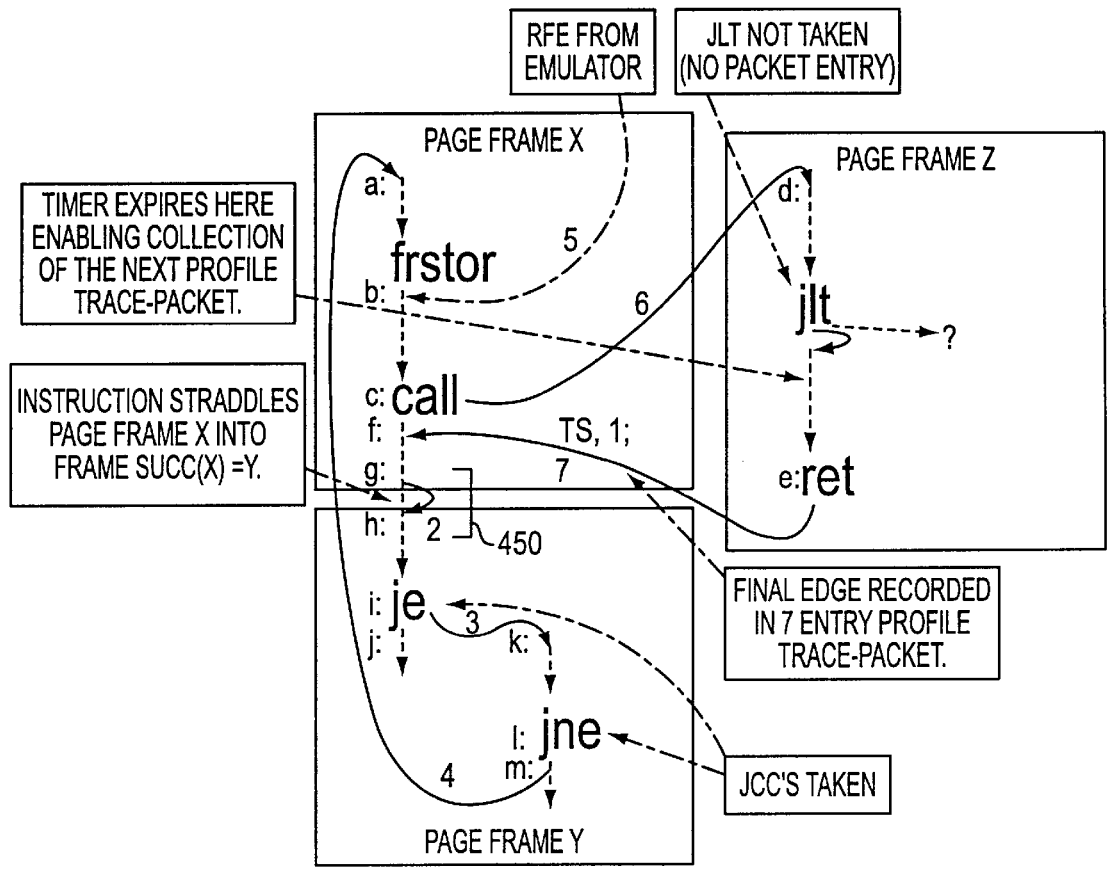
FIGS. 4a, 4e and 4f are block diagrams showing program flow through memory, and profile information describing that program flow.

Referring to FIGS. 1a, 1b and 4a, profiler 400 monitors the execution of programs executing in X86 mode, and stores a stream of data representing the profile of the execution. Because the X86 instruction text is typically an off-the-shelf commercial binary, profiler 400 operates without modifying the X86 binary, or recompiling source code into special-purpose profileable X86 instruction text. The execution rules for profiler 400 are tailored so that the right information will be captured at the right time. Hot spot detector 122 identifies hot spots in the programs based on the profile data. The data collected by profiler 400 are sufficiently descriptive to allow the application of effective heuristics to determine the hot spots from the profile data alone, without further reference to the instruction text. In particular, the profile information indicates every byte of X86 object code that was fetched and executed, without leaving any non-sequential flow to inference. Further, the profile data are detailed enough, in combination with the X86 instruction text, to enable binary translation of any profiled range of X86 instruction text. The profile information annotates the X86 instruction text sufficiently well to resolve all ambiguity in the X86 object text, including ambiguity induced by data- or machine-context dependencies of the X86 instructions. Profiler 400 operates without modifying the X86 binary, or recompiling source code into a special-purpose profileable X86 binary.

In its most-common mode of operation, profiler 400 awaits a two-part trigger signal (516, 522 of FIG. 5a) to start sampling events, and then records every profileable event 416 in a dense sequence, including every profileable event that occurs, until it stops (for instance, on exhaustion of the buffer into which profile information is being collected), as opposed to a conventional profiler that records every n$^{th}$ event, or records a single event every n microseconds. The profile information records both the source and destination addresses of most control flow transfers. Entries describing individual events are collected into the machine's general register file, and then stored in a block as a profile packet. This blocking of events reduces memory access traffic and exception overhead.

Referring again to FIGS. 1a and 1b, profiler 400 tracks events by physical address, rather than by virtual address.

Thus, a profileable event 416 may be induced by "straight line" flow in virtual address space, when two successive instructions are separated by a physical page boundary, or when a single instruction straddles a virtual page boundary. (As is known in the art, two pages that are sequential in a virtual address space may be stored far from each other in physical memory.) By managing the X86 pages in the physical address space, Tapestry operates at the level of the X86 hardware being emulated. Thus, the interfaces between Tapestry and X86 operating system 306 may be as well-defined and stable as the X86 architecture itself. This obviates any need to emulate or account for any policies or features managed by X86 operating system 306. For instance, Tapestry can run any X86 operating system (any version of Microsoft Windows, Microsoft NT, or IBM OS/2, or any other operating system) without the need to account for different virtual memory policies, process or thread management, or mappings between logical and physical resources, and without any need to modify X86 operating system 306 shares. Second, if the X86 operating system is sharing the same physical page among multiple X86 processes, even if at different virtual pages, the page will be automatically shared. There will be a single page. Third, this has the advantage that pages freed deleted from an address space, and then remapped before being reclaimed and allocated to another use, Referring to FIG. 4b, events are classified into a fairly fine taxonomy of about thirty classes. Events that may be recorded include jumps, subprogram CALL's and returns, interrupts, exceptions, traps into the kernel, changes to processor state that alters instruction interpretation, and sequential flow that crosses a page boundary. Forward and backward jumps, conditional and unconditional jumps, and near and far jumps are distinguished.

Figure 4E:
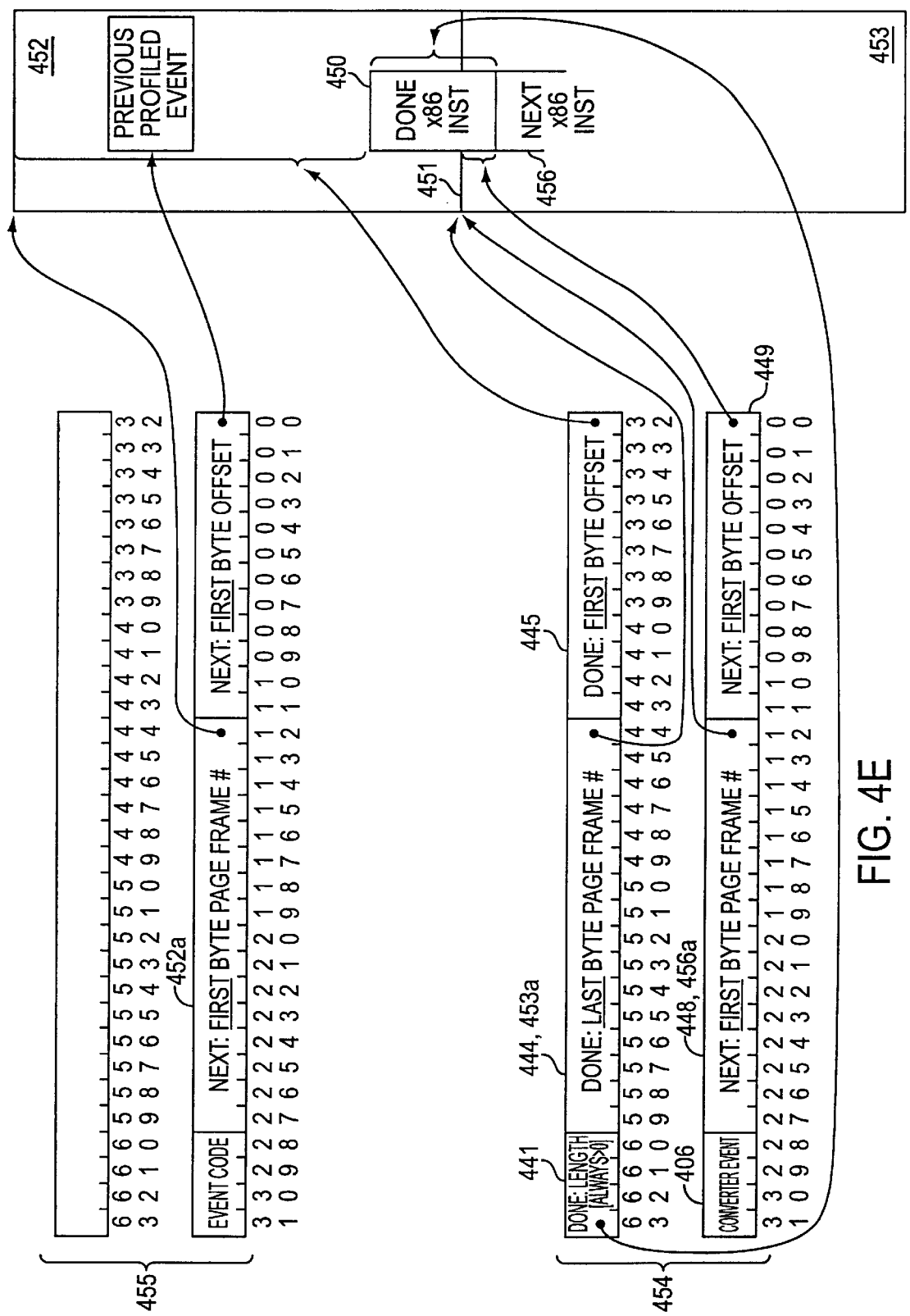
Figure 4F:
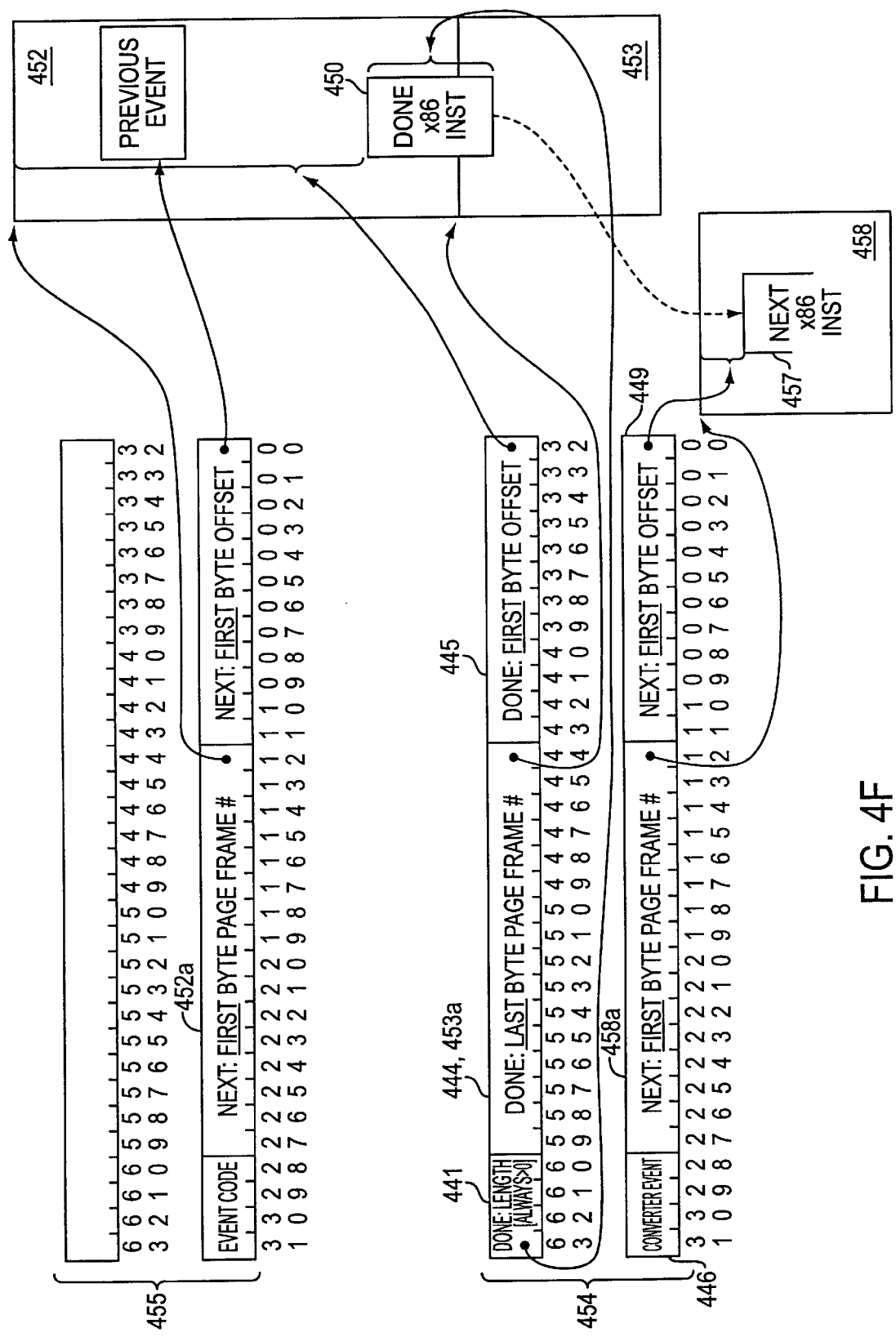
Figure 4G:
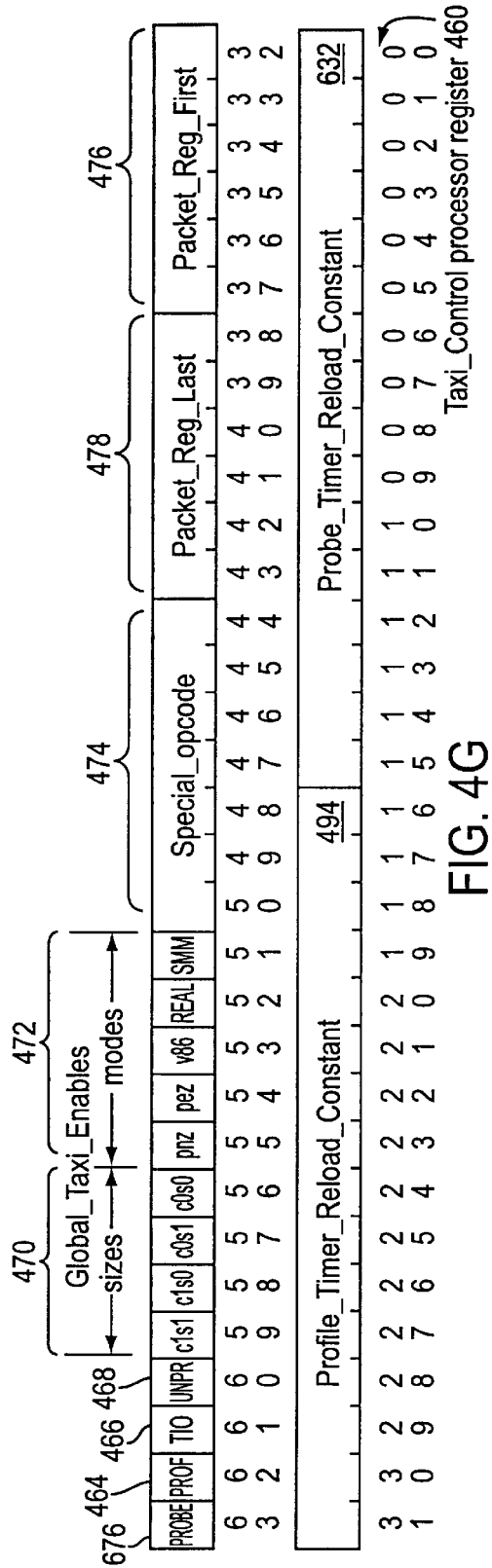
FIGS. 4g, 4h, and 4i show processor registers of the computer.
Figure 4H:
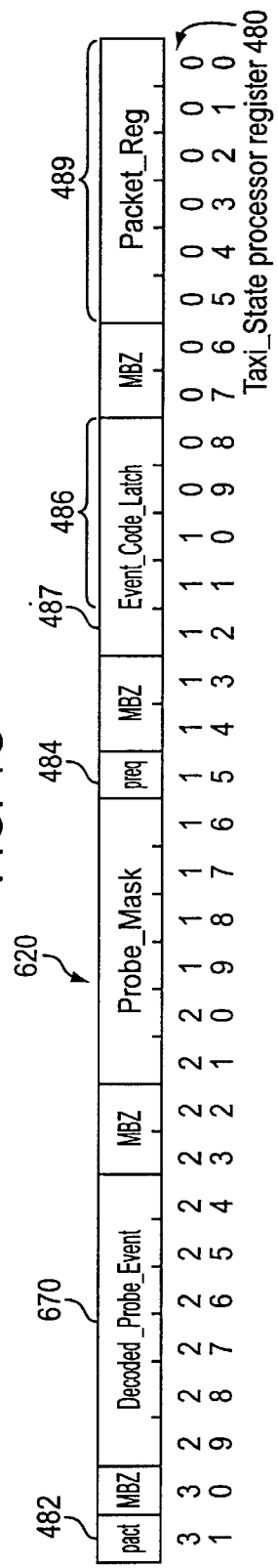

Referring to FIGS. 4g and 4h, profiler 400 has a number of features that allow profiling to be precisely controlled, so that the overhead of profiling can be limited to only those execution modes for which profile analysis is desired.

Figure 5A:
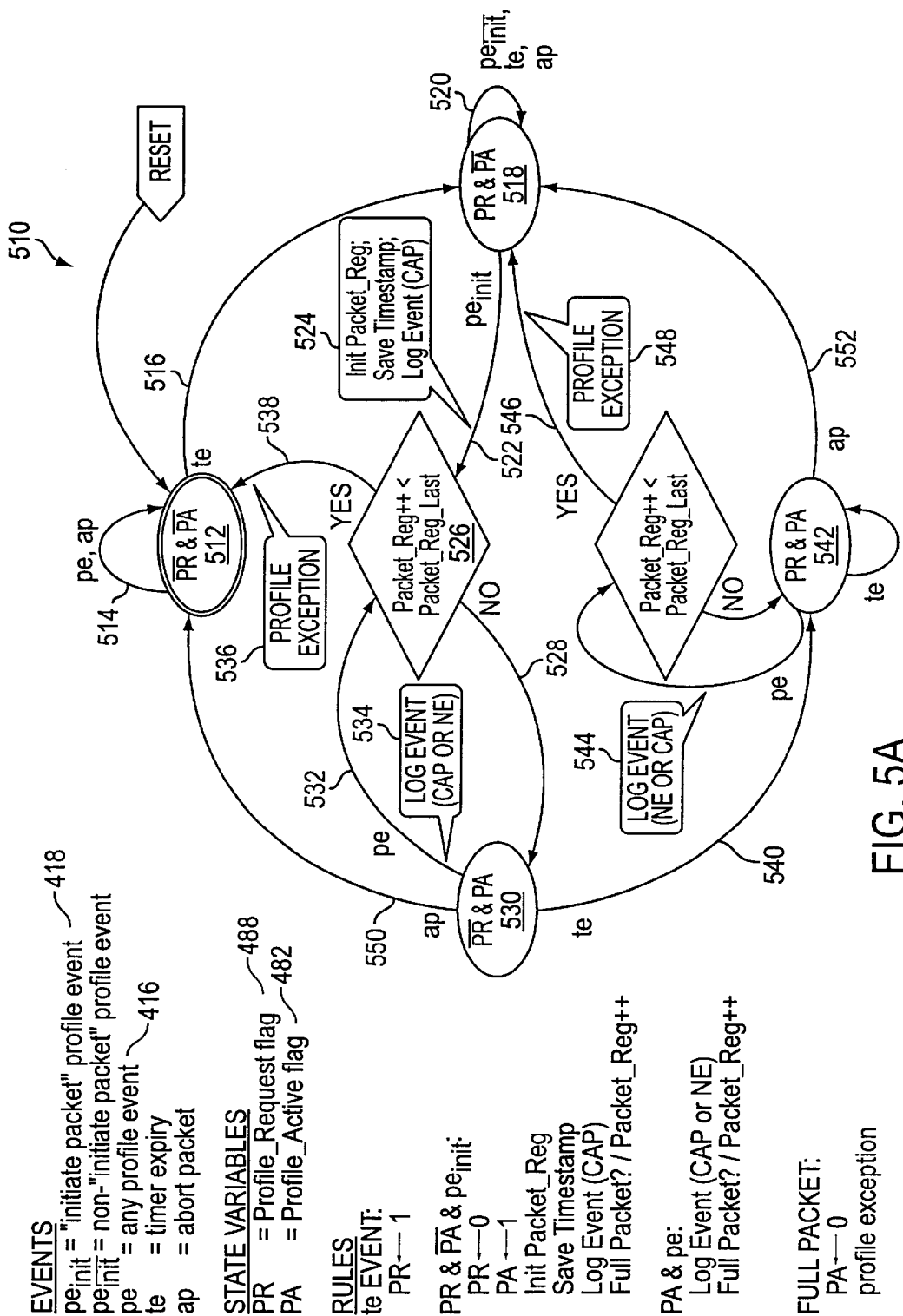
FIG. 5a shows a finite state machine for control of a profiler.
Figure 5B:
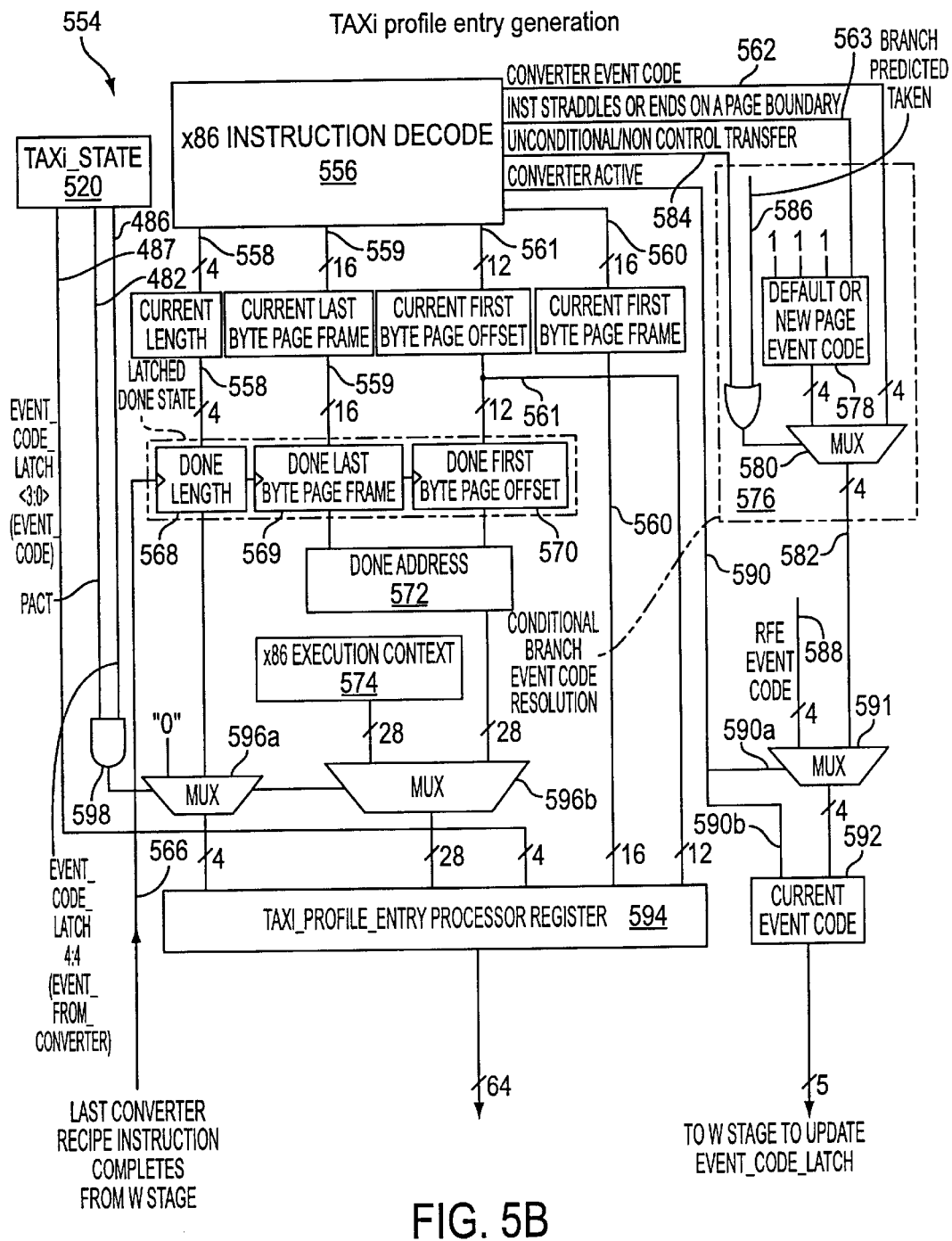
FIGS. 5b and 6b are circuit block diagrams.

Referring to FIGS. 5a and 5b, as each X86 instruction is decoded by the converter (136 of FIG. 1c), a profile entry is built up in a 64-bit processor register 594. During execution of the instruction, register 594 may be modified and overwritten, particularly if the instruction traps into Tapestry operating system 312. At the completion of the instruction, profiler 400 may choose to capture the contents of the profile entry processor register into a general register.

Hot spot detector 122 recognizes addresses that frequently recur in a set of profile packets. Once a hot spot is recognized, the surrounding entries in the profile may indicate (by physical address) a region of code that is frequently executed in correlation with the recurring address, and the path through the physical pages. Hot spot detector 122 conveys this information to TAXi translator 124, which in turn translates the binary.

B. Profileable events and event codes

Referring to FIG. 4b, profiler 400 recognizes and records about thirty classes of events, listed in the table. Each class of event has a code 402, which is a number between 0 and 31, represented as a five-bit number. The class of events is chosen to provide both the minimum information required to support the design, and additional information that is not strictly necessary but may provide additional hints that allow hot spot detector 122 to achieve better results.

The upper half 410 of the table lists events that are (in one embodiment) raised by software, and lower half 404 contains events raised by hardware. The lower half will be discussed first.

The lower half 404 of the table, the sixteen entries whose high-order bit is One, are events induced by converter 136. As each X86 instruction is decoded and executed, the events enumerated in lower half 404 are recognized. If profiler 400 is active when one of these events 404 occurs, a profile entry is recorded in a general register. The events in the lower half of the table fall into two classes: near transfers of control that are executed in converter 136, and sequential flows of execution across a physical page frame boundary.

Profiler 400 captures transfers of control, including IP-relative transfers, subroutine calls and returns, jumps through pointers, and many interrupt-induced transfers. Even though profiler 400 views the machine in its physical address space, the distinction between forward and backwards jumps can be determined for PC-relative jumps by looking at the sign bit of the PC-relative displacement in the X86 instruction. Once the branch is classified, the classification is encoded in event code 402 stored in the profile entry for the branch. There are event codes 402 to separately classify forward conditional branches, backward conditional branches, three separate classes of conditional jump predicates, etc., as shown by event codes 1.0000, 1.0001, 1.0010, 1.0011, 1.0100, 1.0101, and 1.0111.

Discussion of event code 1.1100 is deferred to the end of section V.B.

Event code 1.1110 406 indicates a simple sequential instruction with nothing of note. Event code 1.1111 408 denotes an instruction that either ends in the very last byte of a physical page or straddles a page boundary in virtual address space (and is likely separated into two distant portions in the physical address space).

The upper half 410 of the table, the top sixteen entries whose high-order bit is Zero, are events that are handled in software emulator 316, and recorded during execution of a Tapestry RFE (return from exception) instruction at the completion of the emulation handler. RFE is the Tapestry instruction that returns from Tapestry operating system 312 to a user program after a synchronous exception,(for instance a page fault or NaN-producing floating-point exception), an asynchronous external interrupt, or a trap into emulator 316 for simulation of a particularly complex X86 instruction that is not implemented in the hardware converter 136. Generally, the events in the upper half of the table fall into four classes: (1) far control transfer instructions executed in emulator 316, (2) instructions that update the x86 execution context (e.g. FRSTOR) executed in emulator 316, (3) delivery of x86 internal, synchronous interrupts, and (4) delivery of x86 external, asynchronous interrupts. In general the upper-half event codes are known only to software.

Each RFE instruction includes a 4-bit immediate field (588 of FIG. 5b) in which is stored the low-order four bits of the event code 402 associated with the event that invokes the returned-from handler. The fifth bit in an RFE event class is reconstructed (see section V.G, infra) as a Zero, even though the Zero is not explicitly stored. When the RFE is executed, the event code from the RFE is copied into Taxi_State.Event_Code_Latch (486, 487 of FIGS. 4h and 5b) and the temporary processor register (594 of FIG. 5b) that collects profile information (see section V.F, infra), overwriting the event code supplied by converter 136. From register 594, the event code will be copied into a general register if a profile entry is to be collected. This mechanism allows software to signal profiler 400 hardware 510 that a profileable instruction has been executed in emulator 316, or that an otherwise non-profileable instruction executed in emulator 316 caused a page crossing and should be profiled for that reason. (RFE's without X86 significance will set this field to zero, which will prevent the hardware from storing a profile entry—see the discussion of code 0.0000, below)

The "profileable event" column (416 of FIG. 4*b*) specifies whether an the event code is to be included in a profile packet. Events that are not profileable simply occur with no action being taken by profiler 400. The "initiate packet" column 418 specifies whether an event of this event code (402 of FIG. 4*b*) is allowed to initiate collection of a new profile packet, or whether this event class may only be recorded in entries after the first. "Initiate packet" 418 is discussed at length in sections V.F and V.G, infra, in connection with Context_At_Point profile entries, FIG. 4*c*, and the profiler state machine 510, FIG. 5*a*. The "probeable event" column 610 and "probe event bit" column 612 will be discussed in connection with Probing, section VI, infra. The "initiate packet" 418, "profileable event" 416, and "probeable event" 610 properties are computed by PLA (programmable logic array) 650, which is discussed in sections VI.C and VI.D, infra.

Discussion of event codes 0.0000, 0.0001, 0.0010 and 0.0011 is deferred for a few paragraphs.

An event code of 0.0100 is simply stored over the current value of Taxi_State.Event_Code_Latch (486, 487 of FIG. 4*h* and 5*b*), without further effect of the current state of the machine. The effect of this overwrite is to clear the previously-stored event code, ensuring that converter 136 can restart without any effects that might be triggered by the current content of Taxi_State.Event_Code_Latch 486, 487. For instance, if converter 136 takes a probe exception (see section VI, infra), and the first instruction of the translated TAXi code generates an exception (e.g., a floating-point overflow) that should be handled by returning control to converter 136 (rather than allowing execution to resume in the translated TAXi code), the exception handler will return with an RFE whose event code immediate field is 0.0100. This ensures that converter 136 will not restart with the event code pending in Taxi_State.Event_Code_Latch 486, 487 that triggered the probe exception in the first place.

Event code 0.0101 indicates an emulator completion of an instruction that changes the execution context, for instance, the full/empty state of the floating-point registers or floating-point top-of-stack. This will force the recording of Context_At_Point profile entry (see 430 of FIG. 4*c* and section V.C, infra) to capture the state change.

Events of event code 0.0110, 0.0111, 0.1000, 0.1001 are control-transfer instructions that are conveniently implemented in emulation software instead of hardware converter 134, 136 such as far call, far jump, far return, and X86 interrupt return. The event code taxonomy for these far transfers does not differentiate forward and backward jumps, in contrast to the taxonomy of IP-relative near jumps (event codes 1.0000–1.0101).

An RFE with an event code of 0.1010 causes Taxi_Control.special_opcode 474 (bits <50:44>) to be captured in the special_opcode 434 field (bits <50:43> of FIG. 4*c*) of a Context_At_Point profile entry (430 of FIG. 4*c*). This opens up a new seven-bit space of event codes that can be managed completely by software.

Event code 0.1011 is used to RFE from an exception handler, to force the current profile packet to be aborted. The Tapestry hardware recognizes the event code in the RFE immediate field and aborts the profile packet by clearing Taxi_State.Profile_Active (482 of FIGS. 4*h* and 5*a*). For instance, this event code might be used after a successful probe RFE's to TAXi code and aborts any packet in progress. This is because the TAXi code represent a break in the sequential interval of a profile packet, and an attempt to continue the packet would render it ill-formed. Similarly, when X86 single-step mode is enabled, the RFE from emulator 316 uses event code 0.1011 to abort a packet in progress. Profiling will resume at the next profile timer expiry.

Event codes 0.1100, 0.1101, 0.1110, and 0.1111 provide two pairs of RFE event codes associated with delivery of X86 exceptions from X86 emulator 316. This allows software to group exceptions into different categories for TAXi usage. By classifying interrupts into two groups, and further into probeable and non-probeable events (see section VI, infra), these four event codes provide a control framework for software to build upon. This classification exploits the fact that the X86 funnels all exceptions, external interrupts, and traps through a single unified "interrupt" mechanism.

Event codes 0.0000, 0.0001, 0.0010, and 0.0011 412 operate somewhat differently from the other events in upper half 410, as shown by the "reuse event code" column 414. Events of these classes (that is, RFE instructions with these four-bit codes in their event code immediate field) do not update Taxi_State.Event_Code_Latch (486, 487 of FIG. 4*h*) and related signals; the previously-latched event code is simply allowed to persist for the next X86 instruction. For example, event code 0.0000 is for "transparent" exceptions, exceptions that do not get recorded in the profile. As a specific example, the RFE's at the end of the handlers for TLB miss exceptions, interrupt service routines for purely-Tapestry interrupts, and other exceptions unrelated to the progress of an X86 program have event code 0.0000 (four explicit Zeros in the immediate field, and an assumed high-order Zero), which causes the hardware to resume execution at the interrupted location without storing a profile entry. These events are kept architecturally invisible to the currently-executing process and are not correlated to any hot spot in that process, and thus recording an event would be specious.

Event code 0.0001 is used in the software X86 emulator 316. Very complex X86 CISC instructions that are not implemented in hardware converter 136 are instead implemented as a trap into software, where the instruction is emulated. When X86 emulator 316 completes the instruction, it returns using an RFE with an event code of 0.0001 to indicate that "nothing special happened here," and so no profile entry is collected (unless the emulated instruction straddled a page).

Another use of the "reuse event code" feature of column 414 is illustrated by considering the case of a complex instruction, an instruction that is emulated in software, that does not affect any control flow, for instance a compare string instruction. When such a complex instruction is encountered, converter 136, non-event circuit 578, and MUX 580 of FIG. 5*b* in section V.F, infra, will have made a preliminary decode of the instruction, and supplied a preliminary event code (582, 592 of FIG. 5*b*): either the default event code 1.1110 406 or a new page event code 1.1111 408, depending on whether the instruction straddles a page break. (In some embodiments, converter 136 may in addition supply the event codes for far control transfers, far CALL, code 0.1000; far JMP, code 0.1001; far RET, code 0.0110; IRET, code 0.0111). This preliminary event code 582, 592 is latched into Taxi_State.Event_Code_Latch 486, 487 as part of trapping into X86 emulator 316. When X86 emulator 316 completes the complex instruction and RFE's back to converter 136, the RFE will have as its event code immediate field (588 of FIG. 5*b*) the simple X86 instruction-complete event code 0.0001. Because event code 0.0001 has "reuse event code" property 414, the event code from the RFE immediate field will simply be discarded, leaving intact the preliminary event code 582, 592 in Taxi_State.Event_Code_Latch 486, 487. On return from the exception, an event with the preliminary event code is then added to the profile packet.

Event codes 0.0010 and 0.0011 are used in the RFE from the probe exception handler (see section VI, infra). If a probe fails, that class of probe is disabled. Because probing and profiling are mutually exclusive (see section VI.G, infra), when there is a probe exception, profiling is not active. Thus, these event codes are never stored in a profile packet, but exist to control prober 600, as described in section VI.D, infra.

Event code 1.1100 records memory loads that are directed to I/O memory (memory that is not well-behaved, as discussed in section I.D, supra), to provide a good heuristic for the TAXi compiler to choose between generating aggressive, optimized code and generating conservative, in-order code. This could be accomplished by using a hardware facility analogous to branch prediction on load instructions. All loads would be predicted to be to well-behaved (address space zero) memory. When converter 136 and profile collection are active (PSW.ISA indicates X86 mode and Taxi_State.Profile_Active 482 is One, see section V.E and V.F, infra), load instructions to I/O memory (D-TLB.ASI not equal Zero) that complete would cause the current event code, the event code associated with each instruction in the converter recipe, to be updated to the special I/O load converter event code 1.1100 of FIG. 4b, and later instructions in the pipeline would be flushed. Taxi_State.Event_Code_Latch 486, 487 (see section V.E, infra) would be updated and the normal profile collection hardware would record an "I/O memory load" profile entry before resuming normal X86 instruction execution in converter 136.

C. Storage form for profiled events

Referring to FIGS. 4a, 4c, and 4d, profile events are collected and stored in groups called packets 420. Each profile packet 420 holds a programmable number of entries, initially collected into registers R16–R31, and then stored to memory. In a typical use, there will be sixteen entries per packet, beginning with a 64-bit time stamp, then fourteen event entries 430, 440, and an ending time stamp. Each event is described as a 64-bit entry, of one of two forms: a Context_At_Point entry 430, or a Near_Edge entry 440. The first entry in the packet is always a Context_At_Point entry 430, which gives a relatively complete snapshot of the processor context at the point that profiling begins, a point conceptually between two X86 instructions. Subsequent entries may be of either Context_At_Point or Near_Edge form. A Near_Edge entry 440 describes an intra-segment (i.e., "near") control transfer, giving the source and destination of the transfer. At a NearEdge entry 440, the remainder of the X86 processor context can be determined by starting at the most-recent Context_At_Point entry 430 and inferring the processor context by interpreting the instructions that intervened between that Context_At_Point and the Near_Edge transfer. Sufficient information is present in the profile so that the context can be inferred by binary translator 124 by reference only to the opcodes of those intervening instructions, without requiring any knowledge of the actual data consumed or manipulated by those instructions. The rules for emitting a Context_At_Point entry 430 preserve this invariant: processor context is inferable from the combination of the profile and the opcodes of the intervening instructions, without reference to any data consumed or manipulated by the instructions. If execution of an X86 instruction depends on memory data or the processor context bits in a manner not representable in a Near_Edge entry 440, then profiler 400 emits a Context_At_Point entry 430. Thus, Context_At_Point entries ensure that the TAXi binary translator 124 has sufficient information to resolve ambiguity in the X86 instruction stream, in order to generate native Tapestry code.

Referring to FIG. 4c, a Context_At_Point entry 430 describes an X86 instruction boundary context snapshot, a context in effect as execution of an X86 instruction is about to begin.

Bits <63:60> 431 of a Context_At_Point entry 430 are all Zero, to distinguish a Context_At_Point entry 430 from a Near_Edge entry 440. (As noted in the discussion of done_length 441, bits <63:60> of FIG. 4d, infra, in a Near_Edge 440 the first four bits record the length of an instruction, and there are no zero-length instructions. Thus, a zero value in field 431 unambiguously indicates a Context_At_Point 430.)

Bits <59:51> 432, 433 and <42:32> 435 capture the processor mode context of the X86 at the instruction boundary (before the start of the instruction described in next_frame 438 and next_byte 439, bits <27:00>). The bits of an X86 instruction do not completely specify the action of the instruction; the X86 architecture defines a number of state bits that define the processor context and the operation of instructions. These bits determine operand size (whether a given wide form instruction acts on 16 bits or 32), stack size (whether a PUSH or POP instruction updates 16 bits or 32 of the stack pointer), address size (whether addresses are 16 or 32 bits), whether the processor is in V86 mode, whether addressing is physical or virtual, the floating-point stack pointer, and the full/empty state of floating-point registers. The X86 scatters these bits around code and stack segment descriptors, the EFLAGS register, the floating-point status word, the floating-point tag word, and other places. The Tapestry machine stores these bits in analogs of the X86 structures to actually control the machine; when a Context_At_Point entry 430 is captured, a snapshot of these bits are captured into bits <59:51> 432, 433 and <42:32> 435 of the Context_At_Point entry 430.

Bits <59:56> 432 indicate the current state of the operand-size/address-size mode (encoded in the D bit of the X86 code segment descriptor), and the stack address size (encoded in the B bit of the stack segment descriptor). Bit <59>, "c1s1," indicates that the X86 is in 32-bit-code/32-bit-stack mode. Bit <58>, "c1s0," indicates that the X86 is in 32-bit-code/16-bit-stack mode. Bit <57>, "c0s1," indicates that the X86 is in 16-bit-code/32-bit-stack mode. Bit <56>, "c0s0," indicates that the X86 is in 16-bit-code/16-bit-stack mode. (The D and B bits render the X86 instruction set ambiguous. For instance, a given nine-byte sequence of the instruction stream might be interpreted as a single instruction on one execution, and three entirely different instructions on the next, depending on the values of the D and B bits. Very few architectures share this ambiguity.) Thus, whether or not to profile any particular combination of the four possible combinations of D and B modes can be individually controlled.

In field 433, bit <55>, "pnz," indicates that the X86 is in non-ring-zero (unprivileged) mode. Bit <54>, "pez," indicates that the X86 is in X86 ring-zero (privileged) mode. Bits <53>, <52>, and <51>, "v86," "real," and "smm," indicate respectively, that the X86 is in virtual-8086, real, and system management execution modes, as indicated by X86 system flag bits Bits <50:43>, special_opcode 434, are filled from Taxi_Control.special_opcode 474 whenever a Context_At_Point entry is generated. These bits are especially relevant to event code 0.1010.

In field 435, bits <42:40> are the floating-point top-of-stack pointer. Bits <39:32> are the floating-point register full/empty bits.

Field event_code 436, bits <31:28>, contains an event code 402, the four least significant bits from the most recently executed RFE or converter event code (from FIG. 4b). The four bits of the Context_At_Point event_code 436 are the four low order bits of the event code 402 of FIG. 4b. The high-order bit is derived from these four by a method that will be described in section V.G, infra. As will be described more fully there, a Context_At_Point entry 430 can describe any of the sixteen events from the upper half 410 of the table, or an event with the "initiate packet" property 418 from anywhere in the table of FIG. 4b.

Bits <27:00> describe the next X86 instruction, the instruction about to be executed at the time that the Context_At_Point context was snapshotted. Field next_frame 438, bits <27:12>, give a physical page frame number, and field next_byte 439, bits <11:00>, give a 12-bit offset into the page.

Referring to FIG. 4d, a Near_Edge entry 440 describes a completed X86 intra-segment "near" control transfer instruction. Bits <63:60> 441 of a Near_Edge entry 440 describe the length of the transfer instruction. The length 441 value is between one and fifteen (the shortest X86 instruction is one byte, and the longest is fifteen bytes). Because a zero length cannot occur, these four bits 431 distinguish a Near_Edge entry 440 from a Context_At_Point entry 430.

The instruction at the source end of the Near_Edge transfer is described by a page frame number in which the instruction begins, a page frame number in which the instruction ends, a byte offset into the page where the instruction begins, and an instruction length. The page frame number for the beginning of the instruction is not explicitly represented in the Near_Edge entry 440, but rather is inherited as the next_frame value 438, 448 from the immediately-preceding entry in the profile packet (recall that profile packet always start with a Context_At_Point entry 430, and that a Near_Edge entry 440 is never the first entry). The page frame in which the last byte of the instruction lies is represented in field done_frame 444, bits <59:44>. These two page frame numbers will differ if the instruction straddles a page boundary. The byte offset into the page where the instruction begins is represented in field done_byte 445, bits <43:32>. The length is recorded in field done_length 441, bits <63:60>. Thus, the source instruction ends at the byte found by summing (((done_byte 445+done_length 441)−1) mod 4096) (4096 because that is the size of an X86 page).

The destination of the Near_transfer is described by next_frame 448 and next—byte 449 fields in bits <27:00>, in the manner of the next_frame 438 and next_byte 439 fields, bits <27:00>, described supra for a Context_At_Point entry 430.

Field event_code 446, bits <31:28>, contains an event code, parallel to the event code 436 of a Context_At_Point entry 430. The four bits of the Near_Edge event_code 446 are the four low order bits of the bottom half of FIG. 4b; a leading One is assumed. (Thus a Near_Edge entry 440 can only describe one of the sixteen events in the lower half 404 of FIG. 4b.) Thus, all physical pages are mentioned in successive profile entries in their execution order. When execution crosses from one physical page to another because of an explicit branch, the branch is indicated by a Near_Edge entry 440. When execution crosses from one physical page to another because of sequential execution in virtual address space across a page boundary, a Near_Edge entry 440 will be generated either between the instruction that ended at the end of the page and the instruction that begins the next, or between the instruction that straddles the page break and the first full instruction of the next page. Alternatively, if control enters a page without a Near_Edge event, a Context_At_Point profile entry 430 will describe the arrival at the page. Together, these rules ensure that sufficient information exists in the profile entries that the flow of execution can be retraced, and a hot spot detected, without reference to the binary text. Allowing the hot spot detector to operate without examining the instruction text allows it to run without polluting the cache. Further, the guarantee that all physical pages are mentioned allows for profiling of the program as it exists in the physical memory, even though the X86 executes the instructions from the virtual address space. The guarantee ensures that control flow can be traced through the physical memory, without the need to examine the program text to infer adjacency relationships.

For a Near_Edge entry 440, the X86 processor context on arrival at the destination instruction is inferable from fields 432, 433 (bits <59:51>) and 435 (bits 42:32>) of the nearest-preceding Context_At_Point entry 430, by starting with the context 432, 433, 435 encoded in that Context_At_Point 430, and tracing forward through the opcodes of the intervening instructions to capture any updates.

D. Profile information collected for a specific example event—a page straddle

Referring to FIGS. 4e and 4f, consider two instances of instructions that straddle a page boundary. FIGS. 4e and 4f are drawn in virtual address space, though profiler 400 operates in physical address space.

In FIG. 4e, consider instruction 450 that straddles a page boundary 451 between pages 452 and 453, and is not a transfer-of-control instruction. The page-crossing is described by a Near_Edge entry 440, 454 with a sequential event code, code 1.1110 (406 of FIG. 4b). The instruction begins in the page 452 identified in the next_frame bits (bits <27:12>) 438, 448, 452a of the immediately previous profile entry 455, whether that previous entry is a Context_At_Point 430 or a Near_Edge 440. The instruction begins at a byte offset indicated by done_byte 445 (bits <43:32>) of current Near_Edge 454. The length of the instruction is indicated in done_length 441 (bits <63:60>) of current Near_Edge 454. The last byte of the instruction is in page 453, indicated by done frame (bits <27:12>) 444, 453a of current Near_Edge 454. The last byte of the instruction will fall at byte (((done_byte 445 (bits <43:32>)+done_length 441 (bits <63:60>)−1) mod 4096)), which will necessarily equal ((next_byte 449 (bits <11:00>)−1) mod 4096). The first byte of the next sequential instruction 456 falls in page 453, as indicated in next_frame 448, 456a (bits <27:12>) of current Near_Edge 440, 454, at byte next_byte 449 (bits <11:00>). Because the maximum length 441 of an instruction (fifteen bytes) is less than the length of a page, done_frame 453a of previous profile entry 455 will necessarily equal Next_Frame 456a of current Near_Edge 454 in the page-straddling-instruction case shown in FIG. 4e.

If instruction 450 is entirely within page 452 and ends exactly at the page boundary 451, and is not a control transfer (or is a control transfer that falls through sequentially), then a Near_Edge 440, 454 will be generated whose done_frame 453a will point to page 452, and whose next_frame 456a will point to the following page.

Referring to FIG. 4f, consider another example, a page-straddle control transfer instruction 450 that touches three pages, the two pages 452, 453 on which the source instruction itself is coded, and page 458 on which the destination instruction 457 begins. Event code 446 of current Near_Edge entry 454 records the nature of the control transfer, codes 1.0000 through 1.1100 (FIG. 4b). As in the sequential flow case of FIG. 4e, transfer instruction 450 begins in page 452, as indicated identified in next_frame field 438, 448, 452a of immediately previous profile entry 455, at a byte offset indicated by next_byte 439 (bits <43:32>) of current Near_Edge 455. The length of instruction 450 is indicated in done_length 441 of current Near_Edge 454. Instruction 450 ends in page 453, as indicated by done_frame 444, 453a (bits <59:44>) of current Near_Edge 440, 454, at byte ((done_byte 445 (bits <43:32>)+done_length 441 (bits <63:60>)–1) mod 4096), each taken from the current Near_Edge 440, 454. Destination instruction 457 begins in page 458, as indicated by next frame 448, 458a (bits <27:12>) of the current Near_Edge 454, at byte offset next_byte 449 (bits <11:00>). For a page-straddling branch 450, done_frame 444, 453a (bits <59:44>) of current Near_Edge 454 now disagrees with the next_frame 438, 448 of the previous entry, because of the page straddle.

If a profile packet is initiated on a control transfer instruction, the first entry will be a Context_At_Point entry 430 pointing to the target of the transfer instruction.

Referring to FIG. 4a, the Near_Edge 440 and Context_At_Point 430 entries together provide a compact, efficient description of even the most complex control flow, giving enough information to allow hot spot detector 122 and TAXi binary translator 124 to work, without overwhelming them with an overabundance of information that is not useful for these two tasks.

E. Control registers controlling the profiler

Referring to FIG. 4g, the TAXi hardware system is controlled by a 64-bit register called Taxi_Control 460. Taxi_Control 460 allows fine control over profiling. Because much of the system is driven by the profile, fine control over profiling gives fine control over the entire TAXi system. The various bits allow for enabling and disabling separate pieces of the TAXi mechanism, enabling and disabling profiling for code that meets or does not meet certain criteria, and timer controls that control rates of certain events. In any code region for which profiling is disabled, the TAXi resources will be quiescent, and impose no overhead.

In a typical embodiment, the contents of Taxi_Control register 460 will be written once during system initialization, to values determined by system tuning before shipment. In other embodiments, the values may be manipulated on the fly, to adapt to particular systems'0 usage patterns. The one exception is the special_opcode field 434, discussed infra.

Bit <63>, probe 676 is use to enable or disable the probe exception, and will be discussed in more detail in connection with probing, section VI, infra. Bit <62>, Profile_Enable 464, "prof," enables and disables profile trace packet collection and delivery of the profile trace-packet complete exception. The probe 676 and Profile_Enable 464 bits will typically be manipulated to disable TAXi operation any time the hardware debugging resources are active.

Bit <61>, to 820, indirectly controls the TAXi I/O exception, to provide one of the guards that implement the safety net introduced at section I.D, supra.

Bit <60>, unpr 468, enables and disables the unprotected exception, discussed in section I.F, supra. Unprotected exceptions are only raised when profiling on unprotected pages.

Field 470, bits <59:56> control the code segment/stack segment size combinations that will be profiled. Bit <59>, "clsl," enables profiling for portions of the program whose X86 code segment has its 32-bit default operand-size/address-size bit set, and uses a stack in a segment whose 32-bit stack bit is set. Bit <58>, "c1s0," enables profiling for 32-bit operand/address, 16-bit stack segments. Bit <57>, "c0s1," enables profiling for 16-bit operand/address, 32-bit stack segments. Bit <56>, "c0s0," enables profiling for 16-bit operand/address, 16-bit stack segments.

Bit <55>, "pnz," enables profiling for code in privilege rings one, two, and three (Not Equal to Zero).

Bit <54>, "pez," enables profiling for code in privilege ring zero (Equal to Zero).

Bits <53>, <52>, and <51>, "v86," "real,"and "smm" (with the size and mode controls of bits <59:54>, collectively known as the Global_Taxi_Enables bits 470, 472), enable and disable profiling for code in the virtual-8086, real, and system management execution modes of the X86 (these execution modes indicated by system flags and the IOPL field in the X86 EFLAGS register). If a given X86 execution mode is not supported by TAXi (in the sense that TAXi will not attempt to produce translated native Tapestry binaries for code of that X86 mode), the system is designed to impose no overhead on code in that mode. Thus, when the Global_Taxi_Enables 470, 472 bit for a mode is Zero and virtual X86 310 is executing in that mode, then execution is not profiled, the profile timer (492 of FIG. 4i) does not run, and the profile, unprotected, and probe exceptions are all inhibited.

Bits <50:44>, special_opcode 474 are used to set the contents of Context_At_Point profile entries 430. X86 emulator 316 sets special$_{13}$ opcode 474 to a desired value. When an RFE with event code 0.1010 (FIG. 4b) is subsequently executed, the contents of Taxi_Control.special_opcode 474 are copied unmodified into the special_opcode field 434 (bits <50:44>) of a Context_At_Point event 430.

Bits <43:38>, Packet_Reg_First 476, and <37:32>, Packet_Reg_Last 478, specify a range of the general registers to be used to accumulate profile trace packets. The first Context_At_Point entry 430 of a packet will be stored in the register pointed to by Packet_Reg_First 476, then the next entry in register Packet_Reg_First+1, and so on, until the last entry is stored in Packet_Reg_Last 478. Then a "profile full" exception will be raised (536, 548 of FIG. 5a), so that the profile registers can be spilled to memory. As shown in Table 1, typically Packet Reg_First 476 will be set to 17, and Packet_Reg_Last 478 to 31.

Bits <31:16>, Profile_Timer_Reload_Constant 494, and <15:00> Probe_Timer_Reload_Constant 632 (bits <15:00>) are used to control the rate of profile trace-packet collection and probing respectively. This is further discussed in connection with the Taxi_Timers register (490, 630 of FIG. 4i; see the discussion of FIG. 4i below, and the discussion of probing in sections VI.C and VI.D, infra).

Referring to FIG. 4h, the internal state of the TAXi system is available by looking at a register called Taxi_State 480. In the normal running of the system, the Taxi_State register 480 is read-only, though it is read-write during context switching or design verification.

Bit <15>, "preq" or "Profile_Request" 484, indicates that profile timer 492 has expired and posted the request to collect another packet, but either no event has yet been encountered to initiate the packet, or profile timer 492 expired while a packet was actively being collected.

Bit <31>, "pact" or "Profile_Active" 482, indicates that preq "Profile_Request" 484 was set and that an Initiate Packet event (418 of FIG. 4b) was encountered and a profile packet has been initiated and is in progress, but the profile registers are not yet filled.

The unused bits of the register are labeled "mbz" for "must be zero."

The "Decoded_Probe_Event" 680 and "Probe_Mask" 620 fields will be discussed in section VI, infra.

The "Event_Code_Latch" field 486, 487, bits <12:08>, records a 5-bit event code (the event codes of FIG. 4b, or the four-bit events of a Context_At_Point entry 430 of FIG. 4c or Near_Edge profile entry 440 of FIG. 4d), as a retrospective view of the last event that was generated in converter 136 or encoded as the immediate field in an RFE instruction (588 of FIG. 5b). Event_Code_Latch 486, 487 serves as an architecturally visible place to log the event code until the next logical cycle of this process. The four low order bits 486 are supplied by the RFE immediate field 588 or four bits from converter 136 (582 of FIG. 5b). The high-order bit 487 is supplied by context, either One for events from converter 136, or Zero for events from an RFE.

The "Packet_Reg" field 489, bits <05:00>, gives the number of the register into which the next profile entry will be written, as a post-increment direct address into the register file. When Taxi_State.Packet_Reg 489 exceeds Taxi_Control.Packet_Reg_Last 478, profile collection is terminated, a Profile Packet Complete exception is raised, and the value of Taxi_State.Packet_Reg is reset to Taxi_Control.Packet_Reg_First 476.

Figure 4I:
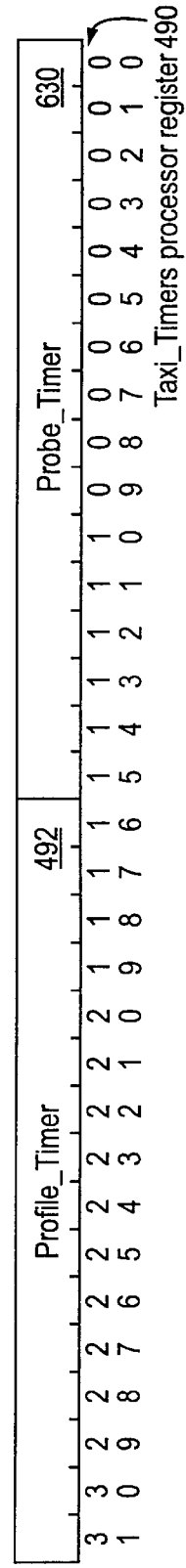

Referring to FIG. 4i, Taxi_Timers register 490 has two sixteen-bit countdown timers 492, 630.

Taxi_Timers.Profile_Timer 492 (bits <31:16>) counts down at the CPU clock frequency when profile collection is enabled as described in the following paragraph. Profile_Timer 492 is an unsigned value that counts down to zero. On expiry, hardware reloads profile timer 492 with the value Taxi_Control.Profile_Timer_Reload_Constant (494 of FIG. 4g). Profile_Timer 492 continually counts down and reloads. The transition to zero is decoded as timer expiration as defined in the profile exception state diagram (FIG. 5a).

Profile collection is enabled, and profile timer 492 runs, when these five conditions are met: (1) Taxi_Control.Profile_Enable 464 is One, (2) converter 136 is active (PSW.ISA bit 194 indicates X86, see section II, supra), (3) all bytes of the current instruction have 4K page I-TLB entries, (4) all bytes of the current instruction have I-TLB page attributes in well-behaved (address space zero) memory and (5) the machine is currently executing in a mode enabled in the Taxi_Control.Global_Taxi_Enables bits 470,472 (bits <59:51>). When X86 debugging or single-step operation is requested, software clears Taxi_Control.Profile_Enable 464 to disable profile collection.

Taxi_Timers.Probe_Timer 630 (bits <15:00>) is discussed in sections VI.C and VI.D,, infra.

F. The profiler state machine and operation of the profiler

Referring to FIG. 5a, profiler 400 operates according to state machine 510. The four states 512, 518, 530, 542 of state machine 510 are identified by the values of the Taxi_State.Profile_Active 482 and Taxi_State.Profile_Request 484 bits. The transitions of Taxi_State.Profile_Active 482 and Taxi_State.Profile_Request 484 bits, and thus of state machine 510, are triggered by timer expiry, profileable events, and packet aborts. Event "pe" indicates completion of a profileable event in the execution of the X86 program, one of the events enumerated as "profileable" 416 in table of FIG. 4b. Timer expiry is the countdown-to-zero-and-reset of timer Taxi_Timers.Profile_Timer 492, as described in connection with FIG. 4i, supra. Aborts are described further infra.

State 512 is the initial state, with Profile_Active 482 (PA) and Profile_Request 484 (PR) both equal to Zero. In state 512, profileable events 416 and abort events are ignored, as indicated by the loop transition 514 labeled "pe, ap." When the profile timer 492 expires, Taxi_State.Profile_Request 484 is set to One, which transitions 516 state machine 510 to state 518.

In state 518, Profile_Request 484 is One and Profile_Active 482 is Zero, indicating that the Profile_Timer 492 has expired, priming profiler 400 to begin collecting a profile packet. But that first profileable event 416, 418 has not yet occurred, so profiling is not yet in active progress. In state 518, further timer expirations are ignored (loop transition 520), rather than queued. Aborts are also ignored (loop transition 520), as there is no profile packet content to abort.

The first entry in a profile packet is always an event with the "Initiate Packet" property (418 of FIG. 4b). State 518 waits until the first "initiate packet" pe$_{init}$ event 418 occurs, initiating transition 522. Profileable events (416 of FIG. 4b) that are not "Initiate Packet" events (418 of FIG. 4b) are ignored, indicated by the "pe$_{init}$" label on loop transition 520. On transition 522, several actions 524 are initiated. Taxi_State.Packet_Reg 489 is initialized from Taxi_Control.Packet_Reg_First 476. The hardware captures a timestamp from the Global_Timestamp processor register into the Packet_Timestamp control register (or, in an alternative embodiment, into the general register preceding the first profile event capture register). A Context_At_Point profile entry 430 is captured into the general register indicated by Taxi_State.Packet_Reg 489. At decision box 526, Taxi_State.Packet_Reg 489 is incremented, and compared against Taxi_Control.Packet_Reg_Last 478. For the first profile entry, the packet registers will never be full, so control follows path 528. Taxi_State.Profile_Active 482 is set to One, and Taxi_State.Profile_Request 484 is cleared to Zero, putting state machine 510 in state 530.

This first entry in a packet is the only circumstance in which converter 136 can generate a Context_At_Point entry 430. For second-and-following entries in a profile packet, converter 136 only generates Near_Edge entries 440. Any subsequent Context_At_Point entry 430 in the packet is generated by the RFE mechanism.

In state 530, Profile_Request 484 is Zero and Profile_Active 482 is One. At least one profileable event (416 of FIG. 4b) has been recognized and recorded, a profile packet 420 is in progress, and profiler 400 is awaiting the next profileable event 416. When the next profileable event 416 occurs 532, the profileable event is recorded 534 in the general register indicated by Taxi_State.Packet_Reg 489. After the event is captured by a TAXi instruction (see discussion of FIG. 5b, infra), control reaches decision box 526. If the range of profile registers is not full (Taxi_State.Packet_Reg 489++<Taxi_Control.Packet_Reg_Last 478—the old value of Taxi_State.Packet_Reg 489 is tested and then Taxi_State.Packet_Reg 489 is incremented), then control returns 528 to state 530 to collect more profileable events 416. If the profile registers are full (Taxi_State.Packet_Reg 489 equals Taxi_Control.Packet_Reg_Last 478), then the machine takes a profile exception 536. Taxi_State.Packet_Reg 489 is incremented after the comparison. The profile exception handler stores the collected profile into a ring buffer in memory, along with the timestamp captured by action 524. The ring buffer write pointer, pointing to the next location in the ring buffer, is maintained in R15 ("RingBuf" of Table 1). After the collected profile packet is stored at the location indicated by R15, R15 is postincremented by the size of a profile packet. Taxi_State.Profile_Active 482 and Taxi_State.Profile_Request 484 are both cleared to Zero, and control returns 538 to start state 512.

If Taxi_Timers.Profile_Timer 492 expires while state machine 510 is in state 530, that is, while a profile packet was in progress, state machine 510 sets Taxi_State.Profile_Active 482 and Taxi_State.Profile_Request 484 both to One, and transitions 540 to state 542.

The behavior of state 542 is largely similar to state 530, in that a partially-complete packet is in progress, and new profileable events 416 are logged 544 as they occur. The difference between states 530 and 542 arises when the packet is complete. A profile-registers-full exception 548 from state 542 spills the profile registers to memory, just as profile exception 536, but then as part of transition 546, Taxi_State.Profile_Request 484 is set to One, to transition to state 518, instead of to Zero as in transition 538, which transitions into start state 512 to await the next timer expiry 516. From state 518, collection of the next packet can begin immediately on the next "initiate packet" event 418, rather than awaiting another timer expiry 516. This effects one level of queuing of pending timer expiries.

Collection of a profile packet may be aborted 550, 552 mid-packet by a number of events. For instance, an abort packet event code is provided (row 0.1011 of FIG. 4b)—an RFE with this event code clears Taxi_State.Profile_Active 482, which in turn discards the current profile packet and aborts profile collection until at least the next profile timer expiry. If the predicate for enabling profiling (from the discussion of Taxi_Control 460 in section V.E, supra) becomes unsatisfied, then the packet is aborted. For instance, a packet will be aborted if control passes to a page that is not well-behaved memory (for instance, a page on the I/O bus), or a byte of instruction lies on a page that does not have a 4K page I-TLB entry, or the X86 execution mode transitions to a mode for which profiling is not enabled in the Taxi_Control.Global_Taxi_Enables bits 470, 472. This abort protocol 550, 552 assures hot spot detector 122 that each packet describes an actual execution path of the X86 machine, without omission.

A transition from X86 code to Tapestry code (for instance, a successful probe exception, see section VI, infra) may be an abort 550, 552 event. Profiler 400 is configured to allow the choice between entirely discarding the aborted packet or padding out and then spilling the partial packet to the ring buffer before abort 550, 552 occurs. This choice is implemented in the code of the X86-to-Tapestry transition handler 320.

FIG. 5b is a block diagram of a portion of profiler 400, the logic 554 to collect and format a profile entry 430, 440 into a processor register. The inputs to logic 554 include Taxi_State register 480, and a number of lines produced by X86 instruction decode logic 556 within converter 136. The output of logic 554 is a profile entry in register 594. Logic 554 as a whole is analogous to a processor pipeline, with pipeline stages in horizontal bands of FIG. 5b, progressing from the top of the diagram to the bottom. The stages are clocked at X86 instruction boundaries 566. Recall from the discussion of FIG. 1c that Align stage 130 parsed the X86 instruction stream, to identify full X86 instructions, and the spatial boundaries in the stored form. Convert stage 134, 136 further decodes X86 instructions and decomposes the complex X86 CISC instructions into simple RISC instructions for execution by Tapestry pipeline 120. The temporal division between X86 instructions is marked by a tag 566 on the last instruction of the recipe of constituent Tapestry instructions emitted by converter 136. The temporal boundaries between X86 instructions are flagged in a bit of the Tapestry PSW, PSW.X86_Completed 566. The first native instruction in the converter recipe (which may be a TAXi instruction), resets PSW.X86_Completed 566 to Zero. The last native instruction in the converter recipe sets PSW.X86_Completed to One. If a converter recipe contains only one native instruction, then PSW.X86_Completed 566 is set to One. Since an emulator trap is guaranteed to be the last instruction in a converter recipe, upon normal completion of an emulated instruction recipe, PSW.X86_Completed will be One.

The Tapestry processor provides a special instruction for capturing a profile entry from processor register 594 into a general register. This special instruction is called the "TAXi instruction." The TAXi instruction is injected into the Tapestry pipeline when a profile entry is to be captured. Recall from the discussion of FIG. 1c, supra, that converter 136 decomposes each X86 instruction into one or more Tapestry instructions according to a "recipe" for the X86 instruction. The TAXi instruction is simply one more Tapestry instruction injected into the pipeline under the cooperation of profiler 400 and converter 136. Thus, profile generation is an integral part of the basic Tapestry instruction execution cycle. The TAXi instruction is typically injected into the pipeline at the beginning of the recipe for the instruction at the destination of a control transfer. At the choice of the hardware implementer, the TAXi instruction may be either a special move instruction not encodeable in the Tapestry instruction set, or it may be a move from a processor register. Depending on implementation choice, the instruction can take the form of a "move from register 594 to general register Taxi_State.Packet_Reg 489" or converter 136 can extract the contents of register 594 and inject a move-immediate of this 64-bit datum into the profile collection general register specified by Taxi_State.Packet_Reg 489.

Instruction decode logic 556 of the Align and Convert pipeline stages (130, 134, 136 of FIG. 1c) produces signals 558–562 describing the current instruction and certain other profileable properties of each instruction, and this description is latched. The information generated includes the instruction length 558 (which, if the instruction generates a profileable Near_Edge event 416, will end up as done_length 441 (bits <64:61>) of a Near_Edge entry 440), the page frame for the last byte of the instruction 559 (done_byte 445 (bits <59:44>) of a Near_Edge entry 440), and the page frame 560 and byte offset 561 of the first byte of the next instruction (bits <27:00>, the next_frame 438, 448 and next_byte 439, 449 of a Near_Edge 440 or Context_At_Point 430). Also generated by decode logic 556 is a raw event code 562 associated with the X86 instruction when that instruction is executed by converter 136, an indication of whether the instruction ends on or straddles a page boundary 563, whether the instruction is a control transfer (conditional or unconditional) 584, whether a PC-relative branch is forward or backward, and whether converter 136 is currently active (which in turn is copied from the PSW) 590.

At the next X86 instruction boundary 566, the information from the just-completed instruction is clocked from signals 558, 559, 561 to registers 568, 569, 570. Registers 568, 569, 570 are simply a buffer for time-shifting information about an X86 instruction to make it available during the next instruction, in case a profile event is to be captured. Because the native control transfer instruction is always the last instruction of the recipe for an X86 transfer instruction, the virtual-to-physical translation of the address of the destination of the transfer (especially in the case of a TLB miss) is not available until the transfer instruction itself is complete. If an event is to be captured, the TAXi profile capture instruction is injected into the pipeline as the first instruction in the recipe of the destination instruction. Thus, the time shifting defers the capture of the profile event until the address translation of the destination is resolved. Registers 569, 570 together drive a 28-bit bus 572 with the "done" part (bits <59:32>) of a Near_Edge profile entry 430.

Simultaneously, the X86 processor context for the current X86 instruction is made available on a 28-bit bus 574, in a form that parallels bits <59:32>of a Context_At_Point entry 440.

Event codes are generated by circuits 576, 591, and used to control capture of profile entries, as follows.

X86 instruction decode logic 556 generates a new raw event code 562 for each X86 instruction. This event code designates a control transfer instruction (event codes 1.0000–1.1011 of FIG. 4b), an instruction that straddles or ends on the last byte of a page frame (code 1.1111, 408 of FIG. 4b), or the default converter event code (1.1110, 406 of FIG. 4b) for all other cases. (For instructions executed in emulator 316, as converter 136 parses the instruction, logic 576, 578 generates the default event code 1.1110 406 or page-straddle event code 1.1111 408, and then this raw event code 562 is overwritten or selected by the event code immediate field 588 of the RFE instruction at the end of the X86 instruction's emulation routine.)

If the instruction is not a control transfer instruction, the two special "non-event" event codes 1.1110 406 and 1.1111 408 (sequential flow or page straddle) are manufactured by circuit 578, using the "straddles a page boundary" signal 563 to set the low-order bit.

MUX 580 generates final converter event code 582, selecting between the raw event code 562 generated by instruction decode logic 556 and the 1.111x non-event event code 406, 408 from circuit 578 by the following mechanism. If the current instruction is a "control transfer" (either an unconditional or a conditional transfer) as indicated by line 584, or the branch predictor predicts 586 that the branch is taken, then MUX 580 selects the raw event code 562 generated by decode logic 556, else MUX 580 selects the non-event event code from 1.1111x circuit 578.

When the branch is predicted 586 taken, MUX 580 selects the raw conditional branch event code 562 associated with the instruction. When the branch is predicted 586 not taken, MUX 580 selects the 1.1111x non-event event code (either the page boundary event code 1.1111 408 or the default event code 1.1110 406) from circuit 578. Recall that the native control transfer instruction is always the last instruction of the recipe for an X86 transfer instruction, and that the TAXi profile capture instruction is injected into the pipeline as the first instruction in the recipe of the destination instruction of a profileable transfer. Thus, if it turns out that the branch prediction 586 was incorrect, the entire pipeline (120 of FIG. 1c) downstream of converter 136 is flushed, including the TAXi instruction that would capture the contents of register 594 into the next general register pointed to by Taxi_State.Packet_Reg 489. (This is because the TAXi instruction is injected into the pipeline following the native branch instruction that ends the X86 recipe.) The instruction stream is rerun from the mispredicted branch. The branch prediction line 586, on rerun, will be asserted to the correct prediction value, and MUX 580 will thus select the correct event code, and the TAXi instruction will correctly be injected or not injected. This event code resolution allows the profile packet to correctly record taken branches or taken conditional branches that straddle (or end on) a page boundary, and to correctly omit capture of not-taken branches that do not cross a page boundary.

For emulated instructions, converter 136 always supplies an event code 582 that is either the default or new page event code 578. Since converter 136 completely decodes all instructions, it could supply the event code corresponding to far control transfer instructions (far CALL, far JMP, far RET or IRET) instead of the default or new page event code 578. This event code is latched as part of the emulator trap recipe. When the emulator completes an instruction that straddles a page frame and RFE's back to converter 136 with the simple X86 instruction complete event code 0.0001, the new page event 1.1111 408 in Event_Code_Latch (486, 487, bits <44:40> of FIG. 4i) will be used. Since the high-order bit is set, a reuse event code 414 RFE will result in a Near_Edge profile entry being captured; this is correct, because the RFE implies no data-dependent alteration of context that would require a Context_At_Point. If emulator 316 supplies an RFE event code that doesn't reuse 414 the Event_Code_Latch, then the RFE event code 588 will be latched. This convention allows the profile packet to record either interesting emulated instructions or simple emulated instructions that straddle a page frame.

Similarly, if an X86 instruction fails and must be restarted, the profile information 558, 559, 560, 561, 562, 563, 584 for the instruction is regenerated and runs down the profile pipeline 554 in parallel with the instruction. For instance, if an instruction fetch misses in the TLB, the TLB miss routine will run to update the TLB, and the instruction will be restarted with regenerated profile information in the profile pipeline.

When an event code comes from the immediate field 588 of an RFE instruction (410 of FIG. 4b), Converter_Active line 590 is used both as the select line 590a into MUX 591 to select between the converter event code 582 and the RFE-immediate event code 588 for the four low-order bits, and also supplies the high-order bit 590b of the event code 402, to form a five-bit event code 592. This event code 592 is latched into Taxi_State.Event_Code_Latch (486, 487, bits <44:40>0 of FIG. 4i). (The reader may think of Taxi_State.Event_Code_Latch 486, 487 as being part of the pipeline stage defined by registers 568, 569, 570.) Not shown in FIG. 5b is the effect of "reuse event code" 414 of FIG. 4b: when an RFE instruction completes with a "reuse event code" event code immediate (0.0000 through 0.0011), update of Taxi_State.Event_Code_Latch 486, 487 is suppressed, and the old event code is left intact.

Each X86 instruction materializes either a Context_At_Point entry 430 or a Near_Edge entry 440 into 64-bit register 594. The two possible sets of bits 568, 572, 574 are presented to MUXes 596a, 596b, and bit Taxi_State.Event_Code_Latch<4> 487 selects between them. Note, for instance, that Taxi_State.Profile_Active 482 must be True (states 530 and 542 of FIG. 5a) in order to generate a One from AND gate 598 to generate a Near_Edge entry 440; this enforces the rule that a Near_Edge entry 440 must always be preceded by a Context_At_Point entry 430. Thus, a Context_At_Point entry is always forced out if Taxi_State.Profile_Active 482 is Zero (states 512 and 518 of FIG. 5a) when a TAXi instruction is issued.

If profiler 400 decides that the entry in register 594 ought to actually be captured into a profile, converter 136 injects a TAXi profile capture instruction into the Tapestry pipeline 120 at the boundary 566 between the profiled X86 instruction and the next X86 instruction, in order to capture the profile information from register 594.

In some embodiments, it may be desirable to inject multiple TAXi instructions to capture different kinds of profile information. For instance, multiple TAXi instructions could capture a timestamp, a context (analogous to a Context_At_Point entry 430), a control flow event (analogous to a Near_Edge entry 440), or one injected instruction could compute the desired information, and the next instruction store that information to memory. It may be desirable to temporarily collect the profile information into a register that is not addressable in the architecture, to reduce contention for the storage resource. While register conflict scheduling hardware would have to be used to schedule access to this temporary register, the addition of this register would isolate the operation of profiler 400 from other portions of the processor.

The TAXi instruction is injected (and a "pe" event 416 triggers a transition in state machine 510 of FIG. 5a) when all of the following conditions are met: (1) the machine is currently executing in a mode enabled in the Taxi_Control bits <53:51> (that is, the AND of the current X86 instruction context and Taxi_Control.Global_Taxi_Enables 470, 472 is non-zero), (2) the machine is at an X86 instruction boundary, (3) all bytes of the current instruction have 4K page I-TLB entries, (4) all bytes of the current instruction have well-behaved (address space zero) memory I-TLB entries, and (5) at least one of these is true: (a) profile collection is enabled (Taxi_State.Profile_Active 482 is One) and Taxi_State.Profile_Request 484 is One and Taxi_State.Profile_Active 482 is Zero and the event code currently latched in Taxi_State.Event_Code_Latch 486, 487 has the "initiate packet" property (418 of FIG. 4b), or (b) Taxi_State.Profile_Active 482 is One and the event code of Taxi_State.Event_Code_Latch 486, 487 is "profileable" (416 in FIG. 4b), or (c) a TAXi probe exception will be generated (this is ancillary to profiling, but rather is a convenient mechanism to control probing, see sections VI.C and VI.D, infra).

During an interrupt of the orderly execution of X86 instructions, for instance during a TLB miss, page fault, disk interrupt, or other asynchronous interrupt, the machine queries X86 converter 136 and switches to native execution. During native execution, X86 instruction-boundary clock 566 is halted. Because X86 clock 566 is halted, the Near_Edge state of the previous X86 instruction is held in registers 568, 569, 570 until X86 execution resumes.

Note that in the embodiment of FIG. 5b, profiling is only active during X86 execution. In an alternative embodiment, profiler 400 is active during execution of native Tapestry instructions translated from X86 by TAXi translator 124, so information generated by profiler 400 can be fed back to the next translation to improve optimization the next time the portion is translated. The register usage of the Tapestry program is confined by the compiler, so that the profile entries can be stored in the remaining registers.

Taxi_Control.Profile_Timer_Reload_Constant (494 of FIG. 4g) can be tuned by this method. If hot spot detector 122 finds a that the working set of the program is changing slowly (that is, if a high proportion of hot spots detected overlap with previously-detected hot spots), then profiler 400 is running too often. In this case, Profile_Timer_Reload_Constant 494 can be increased, reducing the frequency of profiling. Similarly, if hot spot detector 122 is finding a large change in the working set between hot spot detector runs, then Profile_Timer_Reload_Constant 494 can be reduced.

An alternative tuning method for Taxi_Control.Profile_Timer_Reload_Constant 494 considers buffer overruns. When the range of profile collection registers is full, the profile registers are spilled (536 and 548 of FIG. 5a) to a ring buffer in memory. The hot spot detector 122 consumes the profile information from this ring buffer. If profiler 400 overruns hot spot detector 122 and the ring buffer overflows, then the value in Taxi_Control.Profile_Timer_Reload_Constant 494 is increased, to reduce the frequency at which profiling information is collected. Alternatively, on a buffer overrun, the frequency at which hot spot detector 122 runs can be increased.

G. Determining the five-bit event code from a four-bit stored form

Referring again to FIGS. 4b, 4c, and 4d, the event code field 436, 446 in a profile entry (either a Context_At_Point entry 430 or a Near_Edge entry 440) is four bits. Because the four bits can only encode sixteen distinct values, and thirty-two classes of events are classified in FIG. 4b, the high order bit is recovered as follows.

A Near_Edge entry 440 can never be the first entry in a packet. The elided high-order bit is always a One, and thus a Near_Edge entry 440 always records an event from the lower half 404 of the table of FIG. 4b. The event was always generated by converter 136 (or 1.111x non-event circuit 578), and was materialized at line 582 of FIG. 5b.

When a Context_At_Point 430 is not the first entry in a packet, the elided high-order bit is always a Zero, reflecting an event from the upper half 410 of the table of FIG. 4b. These non-initial Context_At_Point entries 430 were always generated by RFE events.

Every packet begins with a Context_At_Point entry 430, and that Context_At_Point is an event with the "initiate packet" property (418 of FIG. 4b). The event codes 402 are carefully assigned so that only one RFE event code (lower half 404 of FIG. 4b) and converter event code (upper half 410 of FIG. 4b) both share identical low-order four bits and are also have the "initiate packet" property 418. These two are event codes 0.0110 and 1.0110, near RET and far RET. Thus, the high-order fifth bit can be recovered from the four bit event code 436, 446 of the first event in a packet by a lookup:

| | |
|---|---|
| 0000 -> 1 | 1000 -> 0 |
| 0001 -> 1 | 1001 -> 0 |
| 0010 -> 1 | 1010 -> 1 |
| 0011 -> 1 | 1011 -> 1 |
| 0100 -> 1 | 1100 -> 0 |
| 0101 -> 1 | 1101 -> 0 |
| 0110 -> * | 1110 -> 0 |
| 0111 -> 1 | 1111 -> 0 |

Near and far returns (0.0110 and 1.0110) share the same four low-order bits, and either may appear at the beginning of a packet. An implementation may choose to recover either a 0 or 1. The ambiguity is an acceptable loss of precision.

H. Interaction of the profiler, exceptions, and the XP protected/unprotected page property Exceptions interact with profile collection in several ways.

A first class of exceptions are handled completely by the Tapestry Operating System (312 of FIG. 3a). These include TLB, PTE, and PDE exceptions and all native-only exceptions. After handling the exception, sequential execution resumes, with no profile entry collected. The RFE instruction at the end of these exception handlers uses the sequential 0.0000 unchanged event code.

A second class includes TAXi profiling exceptions, including the profile-register-full exception and unprotected exception (see section I.F, supra). Exceptions in this second class have special side effects defined by the TAXi environment. These exceptions resume instruction execution and use special RFE event codes to control the profiling environment.

A third class includes all emulator traps from converter 136 for x86 instruction emulator 316. Exceptions in the third category provide additional profile information. The emulator always uses a non-zero RFE event code to resume converter operation.

A fourth class includes asynchronous x86 transfers of control from hardware interrupts, page faults breakpoints, single step, or any other x86 exception detected in converter 136 or emulator 316 that must be manifest to the x86 virtual machine. Exceptions in the fourth class have special capabilities. When emulator 316 is about to cause a change of control flow through the x86 IDT, it uses one of four software defined event codes in the RFE. These event codes are divided into two categories. One category is used just for profiling and the other is used to allow emulator 316 to force a check for translated code on any x86 code page. The emulator maintains a private data structure to test that a probe check should be generated for a particular ISR address.

The "unprotected" exception (see section I.F, supra) and profiler 400 interact as follows. One of the effects of an unprotected exception is to issue a TAXi instruction to start a new profile packet. Recall that the unprotected exception is triggered when an X86 instruction is fetched from an unprotected, profileable page:

| | |
|---|---|
| Taxi_State.Profile_Active 482 = = 1 | // profiling |
| Taxi_Control.unpr 468 = = 1 | // exception enabled |
| Page's I-TLB.ISA 182 = = 1 and XP 186 = = 0 | // unprotected |
| Fetch page is 4 KB | // no abort . . . |
| Fetch page is ASI = = 0 | // no abort . . . |

Taxi_State.Profile_Active 482 is set to prime the collection of a packet in the cycle when an "initiate packet" (418 in FIG. 4b) event is recognized. A TAXi instruction is sent flowing down the pipe to update Taxi_State.Profile_Active 482 in the following cycle, after the translated fetch address is known and the next instruction has been successfully fetched. A TAXi instruction is issued when Taxi_State.Profile_Active 482 is clear, Taxi_State.Profile_Request 484 is set and Taxi_State.Event_Code_Latch 486, 487 contains an event_code for which Initiate_Packet 418 is true or the first instruction in a converter recipe is issued and Taxi_State.Profile_Active 482 is set. The unprotected exception handler may choose whether to preserve or discard the current profile packet, keeping in mind that profile collection on any page that is not protected is unsafe, since undetected writes to such a page could lead to an incorrect profile database. When Taxi_Control.unpr 468 is clear, no exception is generated and TAXi software is responsible for validating the profile packet and setting the "Protected" page attribute.

There are two narrow exceptions to the rule that all pages referenced in a profile packet must be protected—the boundary cases at the beginning and end of the packet. If a profile packet (e.g., 420 of FIG. 4a) ends with a control transfer instruction, the last byte of the transfer instruction, and thus the source of the transfer (the done_frame member 444), must be on a protected page, but the destination of the transfer (the next_frame member 438, 448 of the entry) need not be. Similarly, if a packet begins with a control transfer instruction (one having the "initiate packet" property, 418 of FIG. 4b), the destination of the transfer (next_frame 438, 448) must be on a protected page, but the source need not be. In the latter case, the source will escape mention in the profile packet as a matter of course, because a packet must begin with a Context_At_Point entry (430 of FIG. 4c), which does not mention the source of the event.

I. Alternative embodiments

To provide a good heuristic for when to generate aggressive out-of-order code and when to generate conservative in-order code, profile entries may record references to non-well behaved I/O memory. One mechanism is described above, converter event code 1.1100 that records accesses to I/O memory. In an alternative embodiment, a "profile I/O reference" exception traps into Tapestry operating system 312 on a reference to I/O memory, when executing from an X86 code page (PSW.ISA 194 equals One, indicating X86 ISA), and Taxi_State.Profile_Active (482 of FIG. 4h) is One. At the completion of the exception handler, the RFE immediate field (588 of FIG. 5b) will supply an event code to indicate an I/O memory reference.

A profile control register may be used to control profiling at a finer grain level. For instance, a register may have 32 bits, where each bit enables or disables a corresponding one of the event classes of FIG. 4b. Another control for profiling is discussed below, in connection with PLA 650.

VI. Probing to Find a Translation

A. Overview of probing

Profiler 400 generates a profile of an X86 program. Hot spot detector 122 analyzes the profile to identify often-executed sections of code. TAXi binary translator 124 translates the hot spot from X86 code to TAXi code (the Tapestry native code generated by TAXi binary translator 124, functionally equivalent to the X86 binary). Because the X86 binary is left unaltered, it contains no explicit control flow instruction to transfer control to the TAXi code. "Probing" is the process of recognizing when execution has reached a point in an X86 binary that has a corresponding valid entry point into TAXi code, seizing control away from the X86 binary, and transferring control to the TAXi code.

In one embodiment, each instruction fetch cycle queries of a table. Each entry of the table maps an X86 physical IP value to an address of a TAXi code entry point. For instance, a large associative memory may map X86 physical IP values to entry points into TAXi code segments. The number of segments of TAXi code will typically be, at most, on the order of a few hundred, and execution can only enter a TAXi code segment at the top, never in the middle. Thus, only a few hundred entries in the mapping will be live at any point in time. Such a sparse mapping can be implemented in an associative memory roughly the size of one of the caches. Conceptually, the other embodiments discussed below seek to emulate such an associative memory, using less chip real estate.

In another embodiment, the mapping from X86 physical IP value to Tapestry entry point is stored in memory in a table, and the most-accessed portions of this mapping table are kept in a cache, analogous to a TLB. The cached copy of this table is queried during each instruction fetch cycle. Again, the hit rate in this table will be extremely low.

In another embodiment, a bit vector has a bit corresponding to each byte (or each possible instruction beginning, or each basic block) that indicates whether there is an entry point to TAXi code corresponding to that byte of X86 instruction space. Each entry in a mapping table includes a machine state predicate, indicating the X86 machine state assumptions that are coded into the TAXi code associated with the entry, and the address for the TAXi entry point. In this embodiment, probing is implemented as a three step process: query the bit vector to see if a mapping translation exists, and if so, look in the mapping table, and if that succeeds, verify that the X86 machine state currently satisfies the preconditions listed in the table entry. The bit vector is quite large, potentially taking ⅛ of the entire memory. Further, the bit vector and table queries tend to pollute the cache. In this embodiment, an exception is raised after the bit vector query succeeds, and the table query is performed by the exception handler software; thus, an exception is only raised for addresses that have their corresponding bits in the bit vector set, addresses that have valid TAXi code entry points.

In another embodiment, each bit in the bit vector corresponds to a page of X86 code. If there is an X86 instruction somewhere on the page with a corresponding translation, then the corresponding bit in the bit vector is set. Then, at each event that may be followed by entry to a TAXi code segment, the mapping table is probed to see if such a translation exists. Thus, this implementation takes less memory to hold the bit vector than the embodiment of the previous paragraph, but generates an exception for every instruction fetch from the pages to query the table, not just the instructions that have corresponding TAXi entry points. This embodiment works especially well if translation is confined to a relatively small number of infrequent events, for instance, subroutine entries, or loop tops.

A bit associated with a page can be cached in the TLB.

In the embodiment discussed at length in the following sections, TAXi divides the possible event space by space (pages), time (using the Probe timer), and event code (the same event code 402 used in profiling).

B. Overview of statistical probing

TAXi prober 600 uses a set of statistical heuristics to help make a profitable set of choices about when a TAXi translation is highly likely to exist in the TAXi code buffer. Rather than probe for a translation on every occurrence of an event, for instance at every routine call, TAXi prober 600 probes on a larger class of events, including simple control transfers, conditional jumps, near call, far call and delivery of an X86 interrupt, and uses a statistical mechanism to throttle the number of probes on the expanded number of classes down to a number likely to succeed. The statistical probe mechanism is designed to have a high correlation between probe exceptions and actual opportunities to execute TAXi code.

TAXi divides the space of possible program events spatially, logically, and temporally, and then forms a statistical association between the X86 code space/logic/time that is not always correct, but that is well correlated with the existence of TAXi code. As in the embodiments described in section VI.A, a table maps X86 physical IP values to entry points in TAXi code segments. This table is called the PIPM (Physical IP Map) 602. Each physical page has associated properties. The properties are associated with several logical event classes (a subset 612 of the event classes laid out in FIG. 4*b* and discussed in section V.B, supra). Binary translator 124 maintains five bits 624 of properties per page in PFAT (page frame attribute table) 172—when a binary translation is created, the bit 624 corresponding to the entry event is set in the X86 page's PFAT entry 174 to indicate the existence of the translation, and an entry in PIPM 602 is created that maps the X86 physical IP address to the address of the TAXi code segment. The five PFAT bits are loaded into the TLB 116 with the page translation from the page tables. Enablement of the feature that queries these bits is gated by a time-varying probe mask, whose bits correspond to the five PFAT/TLB bits.

A probe occurs in several stages, as will be described in detail in connection with FIG. 6*c*. When a stage fails, the rest of the probe is abandoned. The first stage is triggered when an X86 instruction is executed, and that instruction generates an event code that is one of the probeable event codes, and the corresponding probe property for the page is enabled, and the corresponding bit in the current probe mask is enabled. The first stage is essentially an implementation of the associative memory search described for the previous embodiments, but on a memory page granularity. This first stage gives a reasonable-but-imperfect evaluation of whether it is likely to be profitable to generate an exception, so that software can actually probe PIPM 602. If this first stage test succeeds, then the processor generates a probe exception. A software exception handler probes PIPM 602 to discover whether there is a current translation of the current IP value, and to find the address of that translation.

This implementation uses no large hardware structures on the Tapestry microprocessor chip; for instance, it avoids a large associative memory. The implementation reduces the overhead associated with unsuccessful probes of PIPM 602, while providing a high likelihood that execution will be transferred to the TAXi code that is translated to replace a hot spot of the X86 program.

Recall also that probing is an optimization, not a condition for minimum correctness. If prober 600 generates too many probe exceptions, the excess probes of PIPM 602 will fail because there is no translation to which to transfer control, and correct execution will resume in converter (136 of FIGS. 1*a* and 1*c*). The cost of an error is one execution of the probe exception handler. If the mechanism generates too few probes, then control will not be transferred to the TAXi code, and execution will simply continue in converter 136. The cost of the error is the opportunity foregone (less the cost of the omitted exception). Because errors do not induce any alteration in the result computed, a heuristic, not-always-correct approach does not violate any architectural correctness criteria. This goal is sought by finding fine-grained ways of slicing up time, space, and classes of events, and associating a well-correlated indicator bit with each slice.

C. Hardware and software structures for statistical probing

A number of the structures discussed in section V, supra, in connection with profiling are also used in probing.

Referring again to FIG. 4*b*, the event code taxonomy 402 for profiling is also used for probing. Column 610 designates a number of events as "probeable." The events designated probeable 610 are all transfers of control by an X86 instruction or interrupt. The code at the destination of the transfer is a candidate for a probe. Hot spot detector 122 is designed with knowledge of the probeable event classes, and will only translate a detected X86 hot spot when the control transfer that reaches the hot spot is one of the probeable events 610. Thus, when an X86 program executes a transfer of control, and the transfer is one of the probeable 610 transfers, there is at least the theoretical possibility of the existence of TAXi code, and the rest of the probe circuitry is activated.

The probeable events 610 are further classified into six classes, in column 612. The six classes are "far call," "emulator probe," "jnz," "conditional jump," "nearjump," and "near call."

Referring again to FIG. 4*h*, probe mask 620 is a collection of six bits, one bit corresponding to each of the six probeable classes 612 of FIG. 4*b*. When a probe mask bit is One, probes for the corresponding class 612 are enabled—when an event of that class occurs (and certain other conditions are satisfied, see the discussion of FIGS. 6*a*–6*c*, infra), the hardware will trigger a probe exception and a probe of PIPM 602. When a probe mask 620 bit is Zero, probes for the corresponding class 612 are disabled—even if a translation exists for the destination of the event, the hardware will not initiate a probe of PIPM 602 to find the translation.

Referring again to FIG. 1*d*, a PFAT entry 174 has five bits 624 of properties for each physical page. These five bits 624 correspond to the "far call," "jnz," "conditional jump," "near jump," and "near call" probeable properties (612 of FIG. 4*b*, 620 of FIGS. 4*h* and 6*b*, and 660, 661, 662, 663, 664 of FIG. 6*b*—the "emulator probe" probe is raised by software, rather than being maintained on a per page basis). The corresponding bit of PFAT probe properties 624 is set to One when hot spot detector 122 has detected a hot spot and binary translator 124 has generated a native Tapestry translation, and the profile for the translation indicates the class of events that lead to entry of the X86 hot spot that is detected and translated. The five bits 624 of a given page's PFAT entry are AND'ed together with the five corresponding bits of probe mask 620 to determine whether to probe, as described below in connection with FIGS. 6*b*–6*c*.

Referring again to FIGS. 4*g*, 4*h* and 4*i*, Taxi_Timers.Probe_Timer 630 is an unsigned integer countdown timer that counts down at the CPU clock frequency, used to control the average rate of failed probe exceptions on a per-event-class basis. When Probe_Timer 630 counts down to zero, Taxi_State.Probe_Mask 620 is reset to all One's, and Probe_Timer 630 is reset to the value of Taxi_Control.Probe_Timer_Reload_Constant 632. An RFE with event code 0.0011 forces an early reset of Probe_Timer 630 from Probe_Timer_Reload_Constant 632.

Together, Probe_Mask 620 and Probe_Timer 630 synthesize the following behavior. As long as probes of a class 612 are successful, the machine continues to probe the class. When a probe fails, the class 612 of the failed probe is disabled for all pages, by setting the class' bit in Probe_Mask 620 to Zero. At the next expiry of Probe_Timer 630, all classes are re-enabled.

Recall that TAXi code segments are created asynchronously to the execution of the X86 binary, after a hot spot is detected by hot spot detector 122. Translated code segments are retired when they fall into disuse. On a round-robin basis, TAXi native code segments are marked as being in a transition state, and queued as available for reclamation. The code segment, while in transition state, is removed from all address spaces. If the TAXi code segment is invoked while in transition state, it is dequeued from the transition queue, mapped into the invoking address space, and re-set into active state. If the TAXi code segment is not invoked while in transition state, the storage is reclaimed when the segment reaches the tail of the queue. This reclamation policy is analogous to the page replacement policy used in Digital's VAX/VMS virtual memory system. Thus, because the reclamation policy is somewhat lazy, PFAT 172 may be somewhat out of date.

Figure 6A:
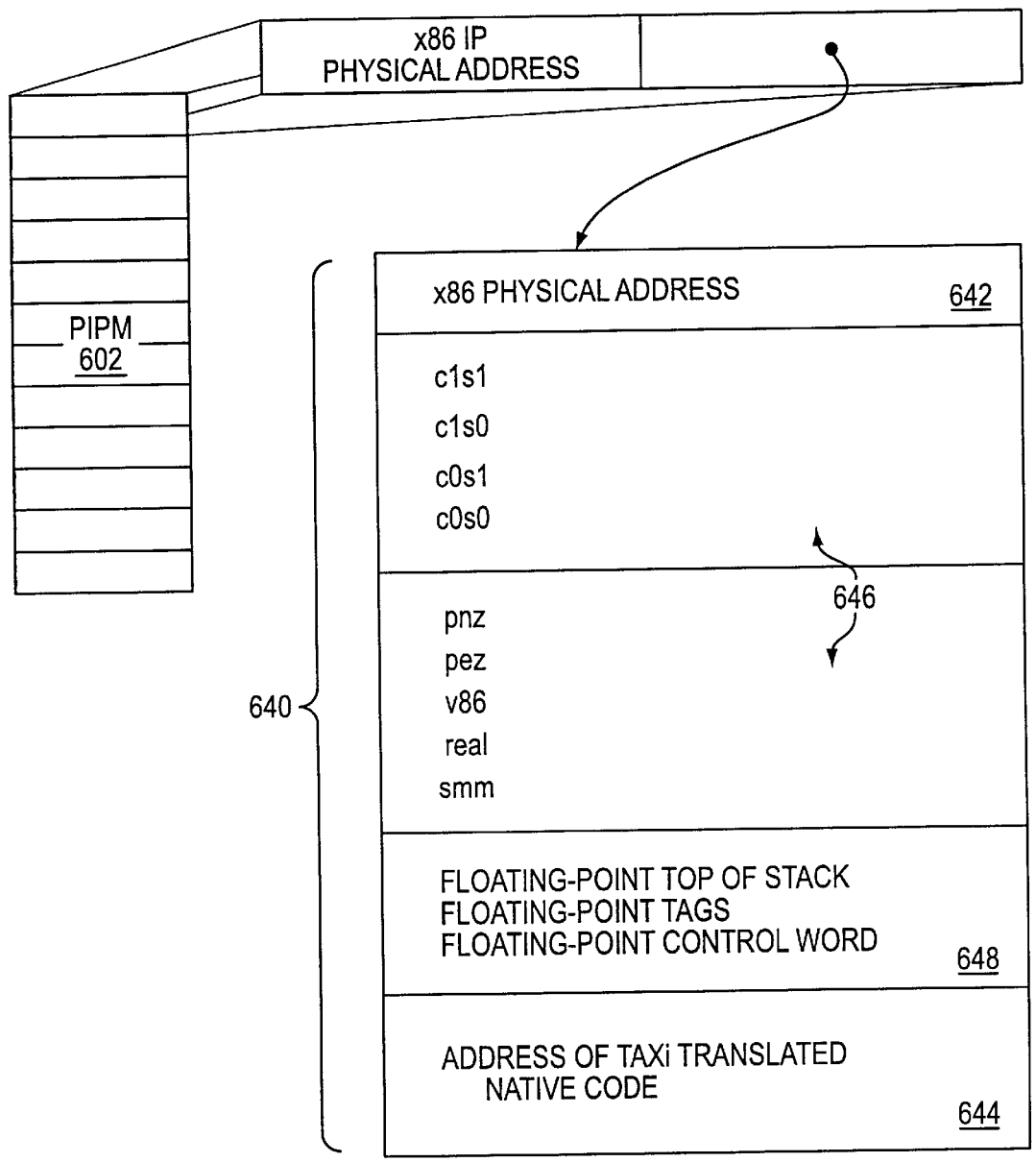

Referring to FIG. 6*a* in conjunction with FIGS. 1*c*, 1*d*, 3*a* and 4*b*, PIPM 602 is a table of PIPM entries 640. Each PIPM entry 640 has three classes of information: the X86 physical address 642 that serves as an entry point into a translated hot spot, X86 machine context information 646, 648 that was in effect at the time of previous executions and which now serves as a precondition to entry of a translated TAXi code segment, and the address 644 of the translated TAXi code segment. The integer size and mode portion 646 of the context information is stored in a form that parallels the form captured in a Context_At_Point profile entry (430 of FIG. 4*c*), and the form used to control profiling in the Taxi_Control.Global_Taxi_Enables bits (470, 472 of FIG. 4*g*). If the current size and mode of virtual X86 310 does not match the state saved in the size and mode portion 646 of PIPM entry 640, the probe fails. The floating-point portion 648 of PIPM entry 640 parallels the floating-point state 435 captured in a Context_At_Point profile entry 430. If, at the conclusion of an otherwise successful probe, the floating-point state of virtual X86 310 does not match the state saved in the floating-point portion 648 of PIPM entry 640, then the probe does not fail—the floating-point context of the machine is unloaded, and then reloaded to conform to the state specified in PIPM entry 640, 648.

Referring to FIG. 6*a* in combination with FIG. 1*b*, PIPM 602 is kept up-to-date, reflecting the current catalog of translations available, and tracking TAXi code translations as they are created, marked for reclamation, and actually reclaimed and invalidated. The probe bits in PFAT 172 may lag slightly, and the probe bits in TLB 116 are allowed to lag slightly further. Further, the probe bits in TLB 116 only convey information to page granularity. Thus, the probe bits in TLB 116 indicate that at some recent time there has been TAXi code with that entry point class on this page. A Zero bit in TLB 116 suggests that there is no such entry point, and that a probe of the PIPM 602 on this event class would very likely fail, and thus should not be attempted. A One suggests a high likelihood of success. The One may be somewhat stale, still indicting the presence of a TAXi code translation that has since been invalidated and reclaimed.

Recall from section V.G, supra, that a fifth high-order bit is needed to disambiguate the four-bit event code stored in Taxi_State.Event_Code_Latch 486, 487 and Context_At_Point profile entries 430. The event codes 402 of FIG. 4*b* are carefully assigned so that no probeable 610 RFE event code (top half 410) shares four low-order bits with a probeable 610 converter event code (bottom half 404). Probeable 610 RFE events 410, 610 are always even, and probeable 610 converter events 404 are always odd. Thus, the least significant four bits of the current event code uniquely identify the probe event, the probe exception handler can always determine whether the probe event came from a RFE instruction or converter execution. (This non-overlap of probeable events 610 is an additional constraint, on top of the non-overlap of "initiate packet" event codes 418 discussed in section V.G, supra.)

Referring again to FIG. 6*b*, probing is controlled by a PLA (programmable logic array) 650 and several AND gates. PLA 650 generates several logic functions of event code 592 from event code latch 486, 487. PLA 650 computes the "initiate packet" 418, "profileable event" 416, and "probeable event" 610 properties as described in FIG. 4*b*. In addition, the probeable event codes are decoded into single signals as described in column 612 of FIG. 4*b*. For instance, "jnz" bit 660, corresponding to bit <0> of the probe properties 624 of FIG. 1*d*, is asserted for event code 1.0001. "Conditional jump" bit 661, corresponding to bit <1> of probe properties 624, is asserted for event code 1.0011. "Near jump" bit 662, corresponding to bit <2> of probe properties 624, is asserted for event code 1.0101. "Near call" bit 663, corresponding to bit <3> of probe properties 624, is asserted for event codes 1.0111 and 1.1011. "Far call" bit 664, corresponding to bit <4> of probe properties 624, is asserted for event code 0.1000. "Emulator probe" bit 665 is asserted for event codes 0.1100 and 0.1110.

D. Operation of statistical probing

Figure 6B:
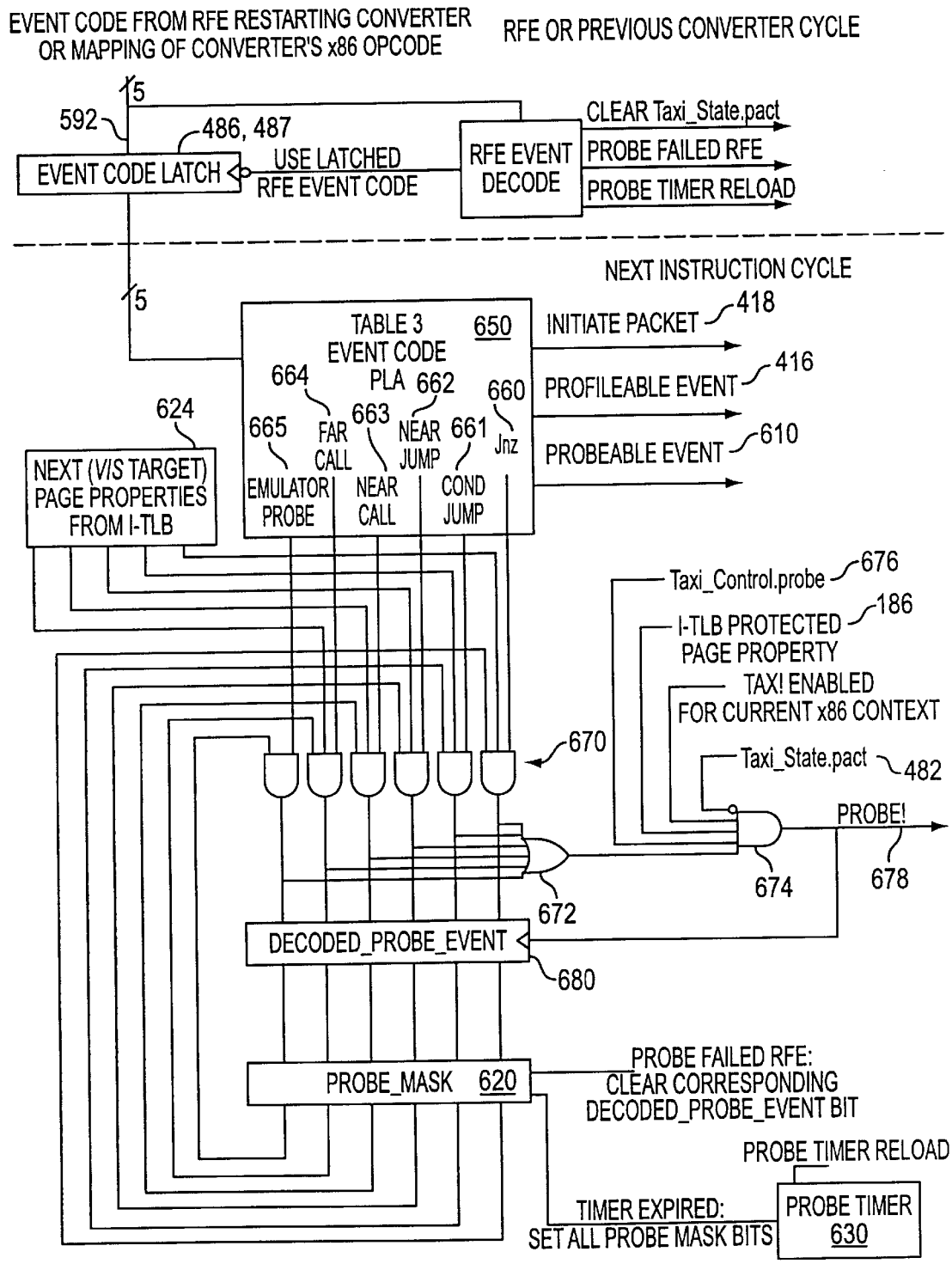
Figure 6C:
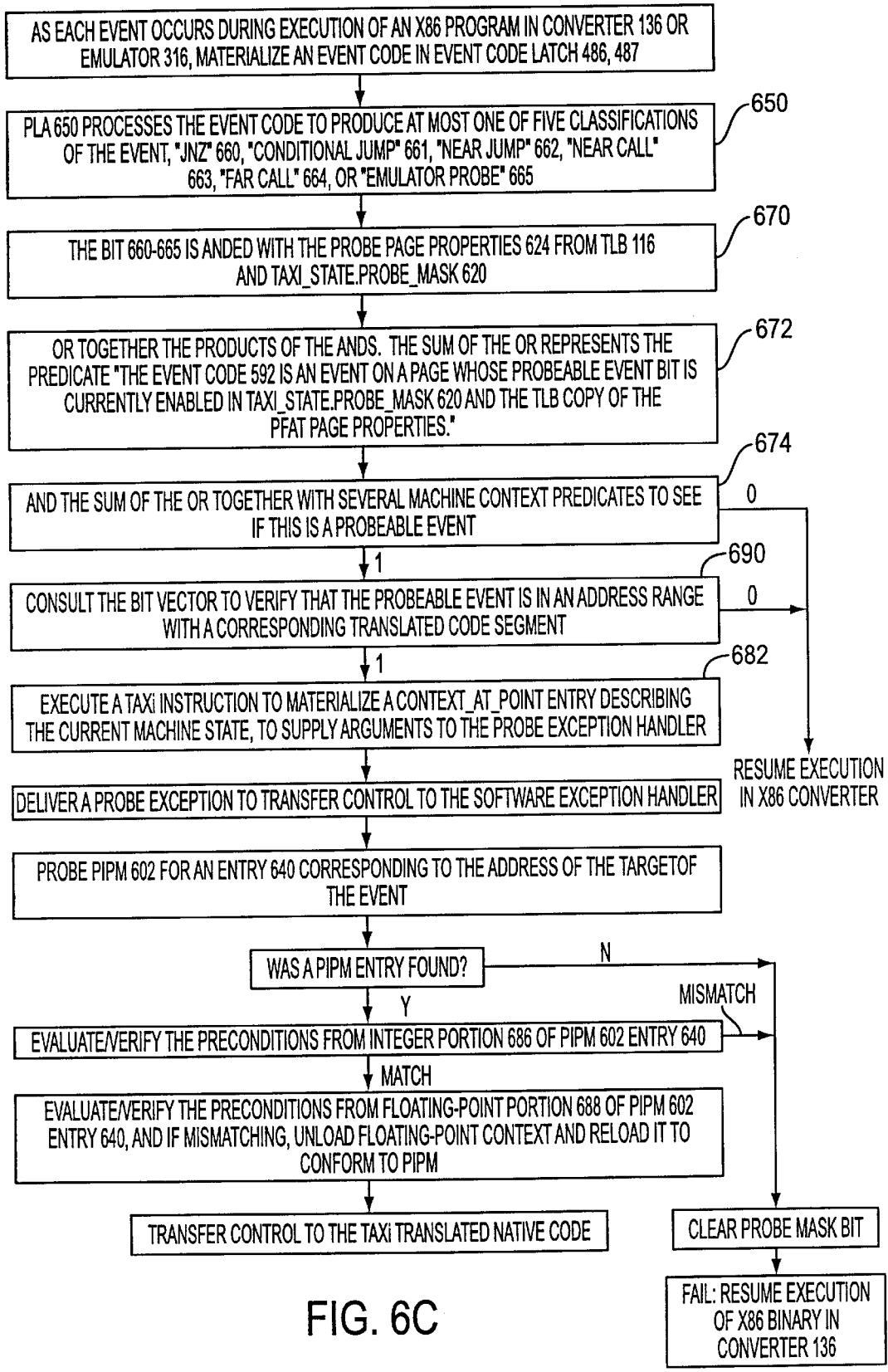

Referring to FIGS. 6b and 6c, for an X86 transfer of control instruction (either a simple instruction executed in converter 136 or a complex instruction executed in emulator 316), the instruction fetch of the transfer target ensures that TLB 116 is updated from PFAT 172 with the current probe page properties 624 for the page of the target instruction—either the information was already current in TLB 116, or it is refilled as part of the I-TLB miss induced by the instruction fetch. Thus, as part of the instruction fetch, the TLB provides both an address translation and the probe page properties 624 for the target instruction (though, as discussed in section VI.C, supra, the probe properties in TLB 116 may be slightly stale).

Further, these control transfer instructions generate an event code 402, as described in section V.F, supra. At the conclusion of the instruction, either converter 136 or an RFE instruction generates a 5-bit event code 592. The event code is stored in latch 486, 487. As the target instruction is fetched or begins execution, event code latch 486, 487 is fed to PLA 650.

Six 3-input AND gates 670 AND together the probeable event signals 660, 661, 662, 663, 664, 665 with the corresponding page properties from the TLB (624 of FIG. 1d) and the current value of Probe_Mask 620. The six AND terms are OR'ed together in OR gate 672. Thus, the output of OR gate 672 is One if and only if the current instruction generated an event 592 whose current Probe_Mask 620 is One and whose probe property bit 624 for the current page is One. The "emulator probe" signal 665 is generated by PLA 650 when RFE event code equals 0.1100 or 0.1110, as indicated by "Emulator Probe" in column 612 of FIG. 4b. This class of probe is raised when emulator 316 believes that probe success is likely and the Emulator Probe bit (bit <5>) of Probe Mask 620 is One.

The sum of OR gate 672 is AND'ed 674 with several more terms. Probing as a whole is controlled by Taxi_Control.probe 676 (see also FIG. 4g); if this bit is Zero, probing is disabled. To ensure that control is only transferred to TAXi code whose underlying X86 code is unmodified since the translation was generated, probing is only allowed on protected pages of X86 instruction text, as controlled by XP bit 184, 186 for the page (see also FIG. 1d, and sections I.F, supra, and section VII, infra); if XP bit 184, 186 is Zero, no probes are taken on the page. Probing is controlled for X86 contexts by Taxi_Control.Global_Taxi_Enables.sizes 470 and .modes 472 bits, which are set by TAXi system control software. Probing is only enabled for current X86 modes whose Taxi_Control.Global_Taxi_Enables 470, 472 is set to One. Probing and profiling are mutually exclusive (see section VI.G, infra); thus probing is disabled when Taxi_State.Profile_Active (482 of FIGS. 4h, states 530 and 542 of FIG. 5a, see section V.E and V.F, supra) is One. If the output 678 of AND gate 674 is One, then the processor continues to the next step of determining whether to probe PIPM 602, as discussed further below.

Taxi_Control.probe 676 was cleared by software when the X86 processor entered a mode that TAXi is not prepared to handle, e.g., X86 debugging, single-step or floating point error conditions. When operating in "page property processing disabled" mode (with PROC_CTRL.PP_Enable deasserted, see section I.A, supra), Taxi_Control.probe 676 is deasserted.

The output 678 of AND gate 674 latches the single bit of the probe event class into Decoded_Probe_Event latch 680.

An intermediate step 690 to be performed in hardware, discussed in detail in section VI.E, infra, may optionally be performed here.

If all of the hardware checks described above pass, then the processor takes a probe exception before completing execution of the instruction at the target of the control transfer. The probe exception transfers control to software that continues to further test whether control should be transferred to the TAXi code.

As part of generating a probe exception, converter 136 writes (step 682) a Context_At_Point profile entry (430 of FIG. 4c) to the register indicated by Taxi_Control.Packet_Reg_First (476 of FIG. 4g) defined for profile collection. (as will be explained further in section VI.G, infra, profiling and probing are mutually exclusive, and the X86 does not use the profile collection registers, so the three uses cannot conflict.) The event code (436 of FIG. 4c) of the profile entry 430 is set to the least significant 4 bits of the current event code (592 of FIG. 5b).

On entry to the probe exception handler the following information is available from the converter:

A Context_At_Point profile entry 430, containing the X86 physical IP (page frame number and page offset) in low half 438, 439

X86 execution context, from high half 432, 433, 435 of Context_At_Point 430 probe event code in the event code field 436 of Context_At_Point 430

X86 virtual IP (offset into the CS segment) from EPC.EIP

The exception handler consults PIPM 602. PIPM 602 is a table that maps X86 instruction addresses (their physical addresses, after address translation) to addresses of TAXi code segments. The table entry in the PIPM is indexed by X86 physical address, typically using a conventional hashing technique or other table lookup technique. The probe exception handler looks up the physical address of the target instruction in the Physical IP to TAXi code entry point Map (PIPM) 602.

If no PIPM entry 640 with a matching X86 address is found, then the probe has failed, with consequences discussed below.

Once a table entry with an address match is located, the translation must be further qualified by the current X86 mode. Recall that the full execution semantics of an X86 instruction is not fully specified by the bits of the instruction itself; execution semantics depend on whether the processor is in V86 mode, whether addressing is physical or virtual, the floating-point stack pointer, and the full/empty state of floating-point registers, and operand sizes are encoded in segment descriptors, the EFLAGS register, the floating-point status word, the floating-point tag word, etc. The translation into Tapestry native code embeds assumptions about these state bits. These state bits were initially captured in bits <59:51> of a Context_At_Point profile entry 430 (see section V.C, supra) and then hot spot detector 122 and binary translator 124 generated the translation based on the profiled values of the mode bits. The corresponding PIPM entry 640 for the translation records the mode bit assumptions under which the TAXi code segment was created. Thus, once PIPM entry 640 is found, the current X86 mode is compared against the X86 mode stored in PIPM entry 640.

The exception handler makes three general classes of checks of the mode information in PIPM 602.

First, the current execution mode and the value of the CS.D (code and operand size) and SS.D (stack segment size) bits assumed by TAXi translator 124 must be compatible. This is determined by comparing the decoded "sizes" information 432 from the Context_At_Point argument with the mask of acceptable contexts provided in PIPM entry 640, 646.

If the current floating-point state does not match the floating-point state 648 in PIPM entry 640, then the probe fails. In some cases, disagreements can be resolved: the floating-point unit can be unloaded and reloaded to conform to the floating-point state in PIPM entry 640, for instance, to get the floating-point registers into the canonical locations specified by the current X86 floating-point map. Execution control is tendered to the TAXi code. If the modes mismatch, the probe fails.

Second, the current virtual IP value must be such that (a conservative approximation of) the transitive closure of the TAXi code points reachable by invoking this TAXi fragment would not trigger a CS limit exception. This is determined from the virtual IP at the time of the exception and normalized CS limit, and comparing them to values stored in PIPM entry 640.

Third, because the TLB copy of the XP bit 186 may be slightly stale, the master copy of the XP bit 184 in PFAT 172 is checked to ensure that all cached information (the profile and TAXi code) associated with the X86 page is still valid.

If the current X86 mode satisfies the mode checks, then the probe has succeeded. PIPM entry 640 contains the address of the TAXi code corresponding to the address of X86 code at which the probe exception occurred. If the modes mismatch, the probe fails.

When a probe exception succeeds, the handler modifies the EPC by setting EPC.Taxi_Active, clearing EPC.ISA to set the ISA bit to native Tapestry mode, setting EPC.EIP to the address of the TAXi code, and setting EPC.ESEG to the special TAXi code segment. The RFE instruction completes the transfer of execution to the TAXi code by loading the EPC into the actual processor PSW. A successful probe leaves the Probe_Mask 620 unaltered. Thus, classes of probeable events remain enabled as long as each probe in the class is successful.

By resetting EPC.EIP to point to TAXi translated code, the RFE instruction at the end of the probe exception handler effects a transition to the TAXi code. Because the TAXi code was transliterated from X86 code, it follows the X86 convention, and thus the argument copying that would have been performed by the transition exception handler (see sections II, III and IV, supra) is not required. Further, because both the probe exception handler and the TAXi code are in Tapestry ISA, no probe exception occurs on this final transition.

When a probe exception is triggered, and the software probe fails to find a translation, several steps are taken. The bit in Probe_Mask 620 that corresponds to the event that triggered the probe is cleared to Zero, to disable probes on this class of event until the next expiry of Probe_Timer 630. This is accomplished by the Probe_Failed RFE signal and the remembered Decoded_Probe_Event latch 680. The interrupt service routine returns using an RFE with one of two special "probe failed" event codes of FIG. 4b. Event code 0.0011 forces a reload of Taxi_Timers.Probe_Timer 630 with the Probe_Timer_Reload_Constant 632. Event code 0.0010 has no side-effect on Probe_Timer 630. It is anticipated that when a probe on a backwards branch fails, Probe_Timer 630 should be reset, by returning from the probe exception with an RFE of event code 0.0011, in order to allow the loop to execute for the full timer value, with no further probe exceptions. On the other hand, it is anticipated that when a probe on a "near call" fails, testing other near calls from the same page should be allowed as soon as Probe_Timer 630 expires, and thus this probe exception will return with an event code of 0.0010. The RFE returns to the point of the probe exception, and execution resumes in converter 136.

If an RFE instruction that modifies Probe_Mask 620 is executed at the same time that the probe timer expiry attempts to reset Probe_Mask 620, then the RFE action has higher priority and the reset request is discarded.

E. Additional features of probing

In the intermediate step 690 mentioned briefly above, a bit vector of bits indicates whether a translation exists for code ranges somewhat finer than the page level encoded in the PFAT probe bits. After a probeable event occurs, and the class of that event is screened against the PFAT probe bits and the probe mask, the hardware tests the bit vector (in an operation somewhat reminiscent of a page translation table walk) before actually raising the probe exception and transferring control to the software interrupt handler.

Only the slices of the bit vector that correspond to pages with non-zero PFAT probe bits are actually instantiated by software, again similar to the way only the relevant portions of a full page table tree are instantiated by a virtual memory system. The bit vector itself is hidden from the X86 address space, in an address space reserved for the probe bit vector and other structures for managing the X86 virtual machine. The bit vector may be cached in the d-cache—because of the filtering provided by the earlier steps, the number of unsuccessful queries of the probe bit vector will be relatively small.

The density of the bit vector can be tailored to the operation of the system. In some embodiments, there may be a bit for every byte in the physical memory system. In other embodiments, the effectiveness of the bit vector would most likely be only marginally reduced by having one bit for a small power of two bits, for instance, one bit for every 2, 4, 8, 16, or 32 bytes of physical memory. The block size guarded by each bit of the bit vector may be software configurable.

Thus, where the probe properties 624 in PFAT 172 give a fine-grained filter by event code (the five probeable event classes), but are spatially coarse (on a page basis), the bit vector gives a coarse map on event code (all events grouped in a single bit), but is finely grained (a few bytes) by space.

A One bit in the bit vector is not a guarantee that translated code exists and should be activated. As with the PFAT probe bits, the bit vector is somewhat over-optimistically heuristic, and may on occasion lag the actual population of translated code segments. Even after testing the bit vector, the mode predicates in PIPM 602 are still to be verified.

The quasi-microcoded hardware used for table walking is readily modified to issue the loads to memory to fetch the appropriate slices of the bit vector.

The logic of PLA 650 is programmable, at least during initial manufacture. Reprogramming would alter the contents of columns 414, 416, 418, 610, 612 of table at FIG. 4b. Though the five-bit event codes generated by converter 136 are relatively fixed, the interpretation given to those bits, and whether to profile or probe on those events, is reconfigurable within PLA 650. In alternative embodiments, PLA 650 may be made programmable at run time, to control operation of profiling and probing by altering the contents of the columns of FIG. 4b. The five bits of input (event code latch 486, 487) to PLA 650 give $2^5=32$ possible inputs. There are nine bits of output (probeable event signals 660, 661, 662, 663, 664, 665, profileable event 416, initiate packet 418, and probeable event 610). Thus, PLA 650 could be replaced by a 32×9 RAM, and the outputs of PLA 650 would then be completely software configurable. With that programmability, both profiling (section V, above) and probing (this section VI) become completely configurable. In a programmable embodiment, the overhead of profiling and probing can be controlled, and strategies can be adapted to experience.

Most of the attributes required for a probe are associated with pages (stored in the PFAT and TLB), or with individual translated code segments (stored in PIPM 602), a structure queried by converter 136 as simple X86 instructions are executed in hardware. For complex instructions that are executed in the emulator (316 of FIG. 3a) the decision to probe or not to probe is made in software. A side table annotates the X86 IVT (interrupt vector table) with probe attributes, much as the PFAT is a side annotation table to the address translation page tables. After emulating an X86 instruction, emulator 316 queries the IVT side table, and analyzes these bits in conjunction with the machine state determined during the course of the emulation. On the basis of this query, emulator 316 decides whether to return to converter 136 using an RFE with an event code that induces a probe, or an RFE with an event code that does not. Event codes 0.1100 and 0.1110 induce a probe (see column 610 of FIG. 4b), and event codes 0.1101 and 0.1111 do not.

F. Completing execution of TAXi code and returning to the X86 code

Once a probe exception activates some translated TAXi code within an X86 process, there are only three ways to leave that TAXi code, either a normal exit at the bottom of the translated segment, a transfer of control out of the code segment, or an asynchronous exit via an exception.

The fall-out-the-bottom case is handled by epilog code generated by the TAXi translator 124. A trap instruction transfers control to an exception handler, which in turn sets the ISA to X86 and returns control to the X86 code. In the alternative embodiment of section IV, epilog code returns data to their X86 homes, and sets the IP to point to the point following the end of the portion of the X86 code that was translated.

The transfer of control case may be handled by the state saving mechanism described in section III, supra, or may be handled by code essentially similar to the epilog code discussed above.

Asynchronous exits are handled by exception handlers, using the safety net mechanism introduced in section I.D, supra, and discussed in more detail in section VII, infra.

G. The interaction of probing and profiling

Probing and profiling are mutually exclusive. Probing only occurs when there is a probeable event (column 610 of FIG. 4b) while Taxi_State.Profile_Active (482 of FIG. 4h and 5a) is Zero. These constraints are enforced by AND gate 674 of FIG. 6b. On the other hand, profiling is only enabled while Taxi_State.Profile_Active 482 is One. Thus, when the processor takes a probe exception, the mutual exclusion guarantees that the resources used by profiling are quiescent. In particular, the general registers in which profile packets accumulate are guaranteed to be available for use to service the exception.

Every probeable event 610 is also an "initiate packet" event 418. This reflects a practical design consideration: the class of probeable events 610 are the most important events in the flow of a program, and "initiate packet" events 418 are a somewhat broader set of important events. If a probeable event 610 occurs in a class for which probing is enabled, and Taxi_State.Profile_Active (482 of FIG. 4h and 5a) is Zero, then the event is also an "initiate packet" event 418. If, further, Taxi_State.Profile_Request 484 is One, then profiler 400 would naturally trigger a transition of TaxiState.ProfileActive (482 of FIG. 4h and 5a) and Taxi_State.Profile_Request 484, transition 522 of FIG. 5a. This would violate mutual exclusion. However, the probe exception is higher priority than any activity of profiler 400. Thus, on a successful probe, control is transferred to the TAXi code, and any profiler action is suppressed. If the probe fails, the probe class is disabled, and profiler 400 is allowed to take its normal course, as described in FIGS. 5a and 5b and section V.F, supra.

The content of a profile packet, and in particular, a Context_At_Point profile entry (430 of FIG. 4c), is tailored to efficiently represent the information required by hot spot detector 122 (to precisely identify the ranges of addresses at which frequently-executed instructions are stored), binary translator 124 (to capture the X86 semantic mode information that is not represented in the code text itself), and prober 600 (the information required to qualify a probe, to ensure that the semantic mode assumptions under which the binary was translated are met by the current X86 semantic mode, before transferring control to the TAXi code), in the sense that the representation is not optimal for any one of the three, but very good for all three.

The fact that probeable events 610 are a subset of "initiate packet" events 418 has a further desirable side effect: the hardware to capture information for the first profile entry 430 in a packet can be reused to capture the information needed by the probe exception handler. When a decision is made in hardware to deliver a probe exception, the exception handler is provided with information about the physical address to which control was being passed and the context of the machine. The information for a probe exception is gathered in register 594 of FIG. 5b, in a form that mirrors the form captured in a Context_At_Point profile entry 430. In the process of either generating a probe exception in hardware, or servicing it in software, the content of register 594 is captured into a general register. This capture (when supplemented with the CS limit (code segment length), as stored in an X86 segment descriptor register) supplies the information needed by the probe exception handler: the physical address of the next instruction, used to index PIPM 602 and find a possible candidate entry, and the X86 mode information needed to qualify that entry. The address captured in the Context_At_Point 430 has the physical page number, ready for use to index into PIPM 602. Since all probeable events are "initiate packet" events, the mode information is readily available in the Context_At_Point profile entry 430 that initiates the packet identifying the hot spot. The various snapshots can be compared to each other for compatibility by AND'ing the appropriate bits together.

Unlike profile collection, which operates by periodic sampling, probing is always enabled when the converter is active, the Taxi_Control.probe flag is One, and the probe mask has at least one surviving One bit.

VII. Validating and Invalidating Translated Instructions

The TAXi system as a whole represents a very complex cache, where the X86 code represents the slower memory level and the translated TAXi code represents the faster memory level. TAXi begins caching information at the time of profiling, because profiling records knowledge about what events occurred at what addresses, where the instruction boundaries were, etc. Further caching occurs when binary translator 124 translates X86 code into semantically equivalent Tapestry native code. In order not to violate the X86 architectural model, TAXi protects against execution of translated Tapestry native code that corresponds to stale X86 code, X86 code that has either disappeared or been modified. The first stage of this protection is provided by validity checks in PIPM 602, as discussed in sections VI.C and VI.D, supra, and the XP protected bit, discussed at section I.F, supra. The master copy 184 of the XP bit is maintained in PFAT 172 and is cached in I-TLB 116—PFAT 172 is used to augment the X86 PTE during TLB miss handling.

When a page is protected, when its XP protected bit is true, there are two classes of event that could invalidate the code. First, a Tapestry processor could do a store into one of the X86 pages. Second, a DMA device could write onto the page. In either case, Tapestry generates an interrupt, and a handler for the interrupt resets the valid bit by ensuring that probes check the master copy of the valid bit.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

The following volumes are incorporated by reference. Intel Architecture Software Developer's Manual, Vol. 1–3, Intel Corp (1997); Gerry Kane, PA-RISC 2.0 Architecture, Hewlett-Packard Professional Books, Prentice-Hall (1996); Richard L. Sites and Richard T. Witek, The Alpha AXP Architecture Reference Manual, 2d ed., Digital Press, Boston (1995); David A. Patterspn and John L. Hennessey, Computer Architecture: A Quantitative Approach, Morgan Kaufman Publ., San Mateo, Calif. (1990); Timothy Leonard, ed., VAX Architecture Reference Manual, Digital Equipment Corp. (1987); Peter M. Kogge, The Architecture of Pipelined Computers, Hemisphere Publ., McGraw Hill (1981); John Mick and James Brick, Bit-Slice Microprocessor Design, McGraw-Hill (1980).

We claim:

1. A multiprocessor computer, comprising
a first CPU, comprising:
   a general register file of general registers;
   an instruction pipeline comprising an arithmetic unit and configured to execute instructions fetched from a memory cache of the computer, the pipeline being in data communication with the registers for the general register file for storage of instruction results; and
   profile circuitry operatively interconnected and under common hardware control with the instruction pipeline, the profile circuitry and instruction pipeline cooperatively interconnected to detect the occurrence of profileable events occurring in the instruction pipeline, the profile circuitry operable without software intervention to effect recording of profile information describing the profileable events into the general register file, without first capturing the information into a main memory of the computer, the recording being essentially concurrent with the occurrence of the profileable events; and
a second CPU, configured to analyze the recorded profile information, while the execution and profile data generation continue on the first CPU, and to control the execution of the program on the first CPU based at least in part on the analysis of the collected profile information.

2. A method, comprising the steps of:
on a first CPU of a multiprocessor computer, executing a program, and collecting profile data describing the execution of the program;
on a second CPU of the multiprocessor, while the collecting of profile data describing the execution of the program continues, analyzing the collected profile data;
controlling the execution of the program on the first CPU based at least in part on the analysis of the collected profile data.

3. The method of claim 2, wherein at least one of the collected profile data indicates the address of the last byte of an instruction executed by the computer during a profiled execution interval.

4. The method of claim 2:
wherein the program has been compiled, without special consideration for execution profiling, into an instruction set in which an interpretation of an instruction depends on a processor mode not expressed in a binary representation of the instruction;
and further comprising recording profile data describing a processor mode during a profiled execution interval, the profile data being efficiently tailored to annotate code profiled during the execution interval with sufficient processor mode information to resolve mode-dependency in the binary coding.

5. The method of claim 2, wherein:
at least one of the items of recorded profile data notes the source and destination of a control flow event in which control flow of the program execution diverges from sequential execution.

6. The method of claim 2, wherein:
the profile data is recorded into general registers of the computer under hardware control, without software intervention, and without first storing the profile data into main memory.

7. The method of claim 2, wherein the recorded profile data includes physical memory references, the recorded physical memory references including addresses of binary instructions referenced by an instruction pointer, and at least one of the recorded instruction references records the event of a sequential execution flow across a page boundary in the address space.

8. A multiprocessor computer, comprising
a first CPU, configured to execute a program and generate profile data describing the execution of the program;
a second CPU, configured to analyze the generated profile data, while the execution and profile data generation continue on the first CPU, and to control the execution of the program on the first CPU based at least in part on the analysis of the generated profile data.

9. The computer of claim 8, wherein:
the profile data is recorded into general registers of the first CPU, without software intervention, and without first storing the profile data into main memory.

10. The computer of claim 8, further comprising:
profile control bits of the first CPU implemented in the computer hardware, values of the profile control bits controlling a resolution of the operation of profile circuitry of the first CPU;
a binary translator configured to translate programs coded in a first instruction set architecture into instructions of a second instruction set architecture;
a profile analyzer configured to analyze the profile data generated by the profile circuitry, and to set the profile control bits to values to improve the operation of the binary translator.

11. A computer, comprising:
an instruction pipeline configured to execute instructions of the computer;
profile circuitry implemented in the computer hardware, configured to detect, without compiler assistance for execution profiling, the occurrence of profileable events occurring in the instruction pipeline, and to direct recording of profile information describing the profileable events occurring during an execution interval of the program;

profile control bits implemented in the computer hardware, values of the profile control bits controlling a resolution of the operation of the profile circuitry;

a binary translator configured to translate programs coded in a first instruction set architecture into instructions of a second instruction set architecture;

a profile analyzer configured to analyze the recorded profile information, and to set the profile control bits to values to improve the operation of the binary translator.

12. The computer of claim 11, wherein the profile information indicate the address of the last byte of an instruction executed by the computer during a profiled execution interval.

13. The computer of claim 11, wherein:

the instruction pipeline is configured to execute instructions of an instruction set in which an interpretation of an instruction depends on a processor mode not expressed in a binary representation of the instruction; and the profile circuitry is configured to record profile information describing a processor mode during a profiled execution interval of the program, the profile information being efficiently tailored to annotate binary code profiled by the profile circuitry with sufficient processor mode information to resolve mode-dependency in the profiled binary code.

14. The computer of claim 11 wherein:

during a profile-quiescent interval of execution of a program that has been compiled without special consideration for execution profiling and that induces events that match time-independent criteria of profileable events to be profiled, the profile circuitry is configured to record no profile information in response to the occurrence of profileable events; and after a triggering event is detected, the triggering event being one of a predefined class of triggering events, the profile circuitry is configured to commence the profiled execution interval and to record profile information describing every event that matches the profileable event selection criteria induced during the profiled execution interval, the recording continuing until a predetermined stop condition is reached.

15. The computer of claim 11, wherein:

the profile circuitry is configured to record at least one physical memory reference noting the source and destination of a control flow event in which control flow of the program execution diverges from sequential execution.

16. The computer of claim 11:

wherein the binary translator is configured to operate concurrently with execution of a program coded in the first instruction set, being an instruction set non-native to the computer, and the second instruction set is the native instruction set of the computer, the binary translator being configured to translate the program on a portion-by-portion basis;

and further comprising circuitry and software to transfer execution from a version of the program in the first instruction set to a portion translated into the native instruction set generated by the binary translator during execution of the version in the non-native instruction set.

17. The computer of claim 16:

further comprising circuitry and/or software designed to render the translated version invalid for future execution while the program is in execution;

and wherein after the native translated version is deleted, the binary translator is configured to re-translate the portion of the non-native program into the native instruction set of the computer, the re-translation of the portion differing from a previous translation based on profile information recorded by the profile circuitry.

18. The computer of claim 16, wherein:

the profile circuitry and binary translator are jointly configured to identify and translate frequently-executed portions of the non-native version of the program.

19. The computer of claim 16, wherein:

the non-native program is stored in a memory under control of a virtual memory manager; and a page management table entry of the virtual memory manager includes a mark indicating whether a page associated with the entry contains instructions of the non-native program.

20. The computer of claim 11, further comprising:

circuitry and/or software to transfer control from the executing program to the instructions of the second instruction set architecture translated by the binary translator.

21. The method of claim 2:

wherein the execution on the first CPU proceeds by interpreting a non-native version of the program;

and further comprising the steps of:

translating a portion of the non-native version of the program into the native instruction set of the computer;

during interpretation of the non-native version, transferring execution from the non-native version to the translated native portion.

22. The method of claim 21, further comprising the step of:

selecting the portion of the non-native program to translate to native instruction set based on the analysis of the collected profile data and a determination that the portion is frequently executed.

23. The method of claim 21, further comprising:

while the program is still in execution, rendering at least a portion of the native translation invalid for future execution; and re-translating the invalidated portion of the non-native program into the native instruction set of the computer, the re-translation differing from the invalidated translation by translation optimization based on a profile of the execution of the portion.

24. The method of claim 21, wherein the non-native program is coded in a binary instruction set for a computer of an architectural family different from the architectural family of the computer on which the program is executed.

25. The method of claim 24, further comprising the steps of:

with the translated native portion, recording a predicate to test a machine state of an architecture of the non-native version of the program; and testing the machine state predicate as part of a determination of whether to transfer execution to the translated native portion.

26. The method of claim 21, further comprising the steps of:

during interpretation of the non-native program, querying for the existence of a native translation of non-native code about to be interpreted; and if a native translation is determined to exist, transferring control from the non-native execution mode to the native translation.

27. A method, comprising the steps of:

while executing a first executable binary of a program on a computer, generating profile information describing the execution of the program;

concurrently with the execution of the program, analyzing the generated profile information;

concurrently with the execution of the program, generating a second executable binary for the program, with optimization based on a result of the analysis; and while the execution of the first executable binary in progress, transferring control from the first executing binary to the second executable binary.

28. The method of claim 27, wherein:

the computer is a multiprocessor, and the analyzing and executing are concurrently performed on separate processors of the multiprocessor in a memory shared by the processors.

29. The method of claim 27, wherein:

the computer is a multiprocessor, and the optimizing and executing are concurrently performed on separate processors of the multiprocessor in a memory shared by the processors.

30. The method of claim 27, wherein:

the program executing on the computer and the second executable binary are coded in two different binary instruction sets.

31. The method of claim 27, wherein:

the profile information is recorded into general registers of the first CPU, without software intervention, and without first storing the profile information into main memory.

32. The method of claim 27, wherein:

the profile information is generated into general registers of the computer under hardware control, without software intervention, and without first storing the profile information into main memory.

33. The method of claim 27, wherein the profile information includes physical memory references, the recorded physical memory references include addresses of binary instructions referenced by an instruction pointer, and at least one of the recorded instruction references records the event of a sequential execution flow across a page boundary in the address space.

34. The method of claim 27, further comprising the step of:

the optimization includes binary translation of a portion of the program from a non-native binary instruction set to an instruction set native to the computer, the portion being selected based on an analysis of the generated profile information.

35. The method of claim 34, wherein:

the re-translation of the portion differs from the original translation, incorporating translation optimization based on a profile of the execution of the portion.

36. The method of claim 34, further comprising the steps of:

during interpretation of the non-native program, querying for the existence of a native translation of non-native code about to be executed; and if a native translation is determined to exist, transferring control from the non-native execution mode to the native translation.

* * * * *